(12) United States Patent

Shimizu et al.

(10) Patent No.: US 7,386,930 B2
(45) Date of Patent: Jun. 17, 2008

(54) METHOD FOR MANUFACTURING A MAGNETOSTRICTIVE TORQUE SENSOR

(75) Inventors: Yasuo Shimizu, Wako (JP); Yoshito Nakamura, Wako (JP); Shunichiro Sueyoshi, Wako (JP); Nobuhiko Yoshimoto, Sayama (JP); Koji Kobayashi, Sayama (JP); Yuichi Fukuda, Sayama (JP); Mizuho Doi, Sayama (JP); Hitoshi Harada, Sayama (JP); Tomohiro Hoshi, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/983,085

(22) Filed: Nov. 7, 2007

(65) Prior Publication Data

US 2008/0066295 A1    Mar. 20, 2008

Related U.S. Application Data

(62) Division of application No. 10/844,824, filed on May 12, 2004, now Pat. No. 7,310,870.

(30) Foreign Application Priority Data

May 12, 2003  (JP) .............................. 2003-133478
May 15, 2003  (JP) .............................. 2003-137592
Jun. 16, 2003  (JP) .............................. 2003-170191

(51) Int. Cl.
    *H04R 31/00*    (2006.01)

(52) U.S. Cl. ...................... 29/594; 29/592.1; 29/602.1; 73/862.331; 73/862.335; 205/119; 205/122; 427/129; 427/130

(58) Field of Classification Search ............... 29/592.1, 29/594, 602.1, 855; 73/862.331–862.335, 73/762; 205/119, 122; 427/129, 130
See application file for complete search history.

(56) References Cited

U.S. PATENT DOCUMENTS 3,762,217 A * 10/1973  Hagen ...................... 73/862.28
3,823,608 A *  7/1974  Pantermuehl et al. .. 73/862.322

FOREIGN PATENT DOCUMENTS

JP    62179626 A  *  8/1987

* cited by examiner

*Primary Examiner*—Paul D Kim
(74) *Attorney, Agent, or Firm*—Hamre, Schumann, Mueller & Larson, P.C.

(57) ABSTRACT

For forming an annular magnetostrictive coat on an outer peripheral surface of a rotational shaft associated with a magnetostrictive torque sensor, a magnetostrictive coat forming method comprises a step of fitting a cylindrical masking jig over the outer peripheral surface of the rotational shaft and securing the masking jig to the outer peripheral surface, a step of placing the rotational shaft in a plating tank to thereby form the magnetostrictive coat by plating on the outer peripheral surface, and a step of detaching the masking jig from the rotational shaft.

4 Claims, 49 Drawing Sheets

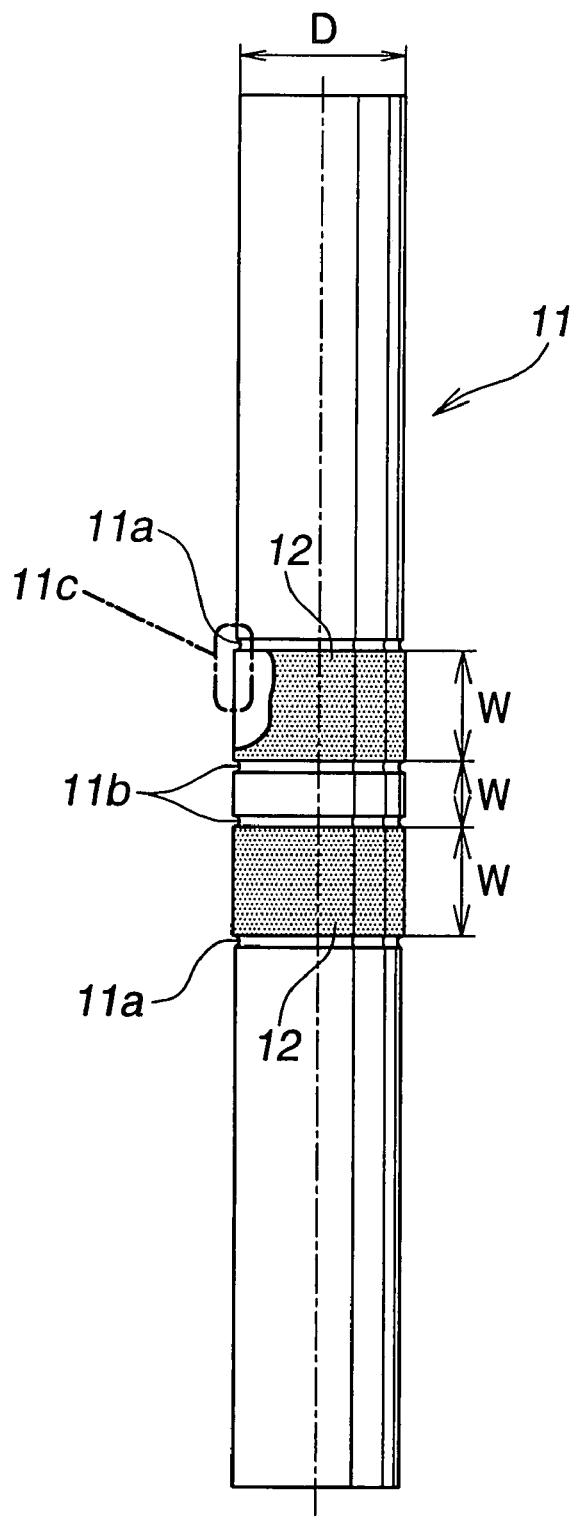
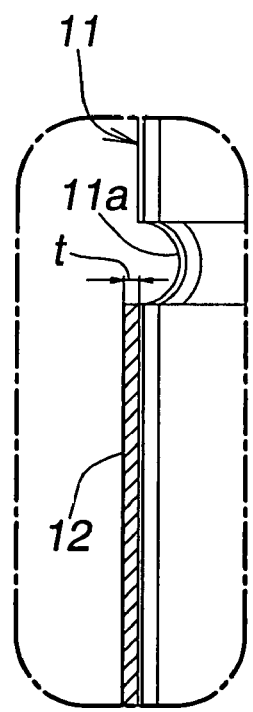

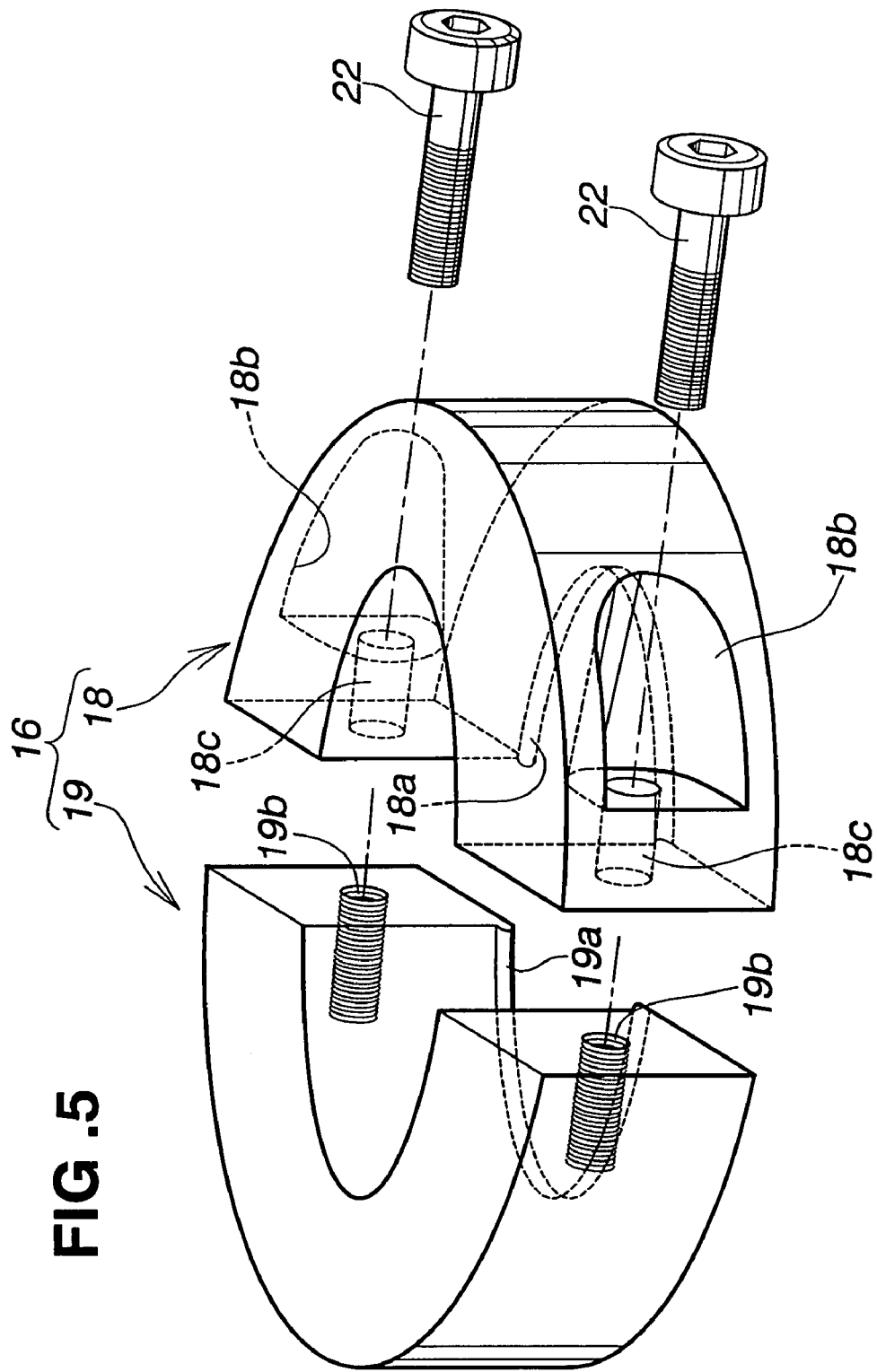

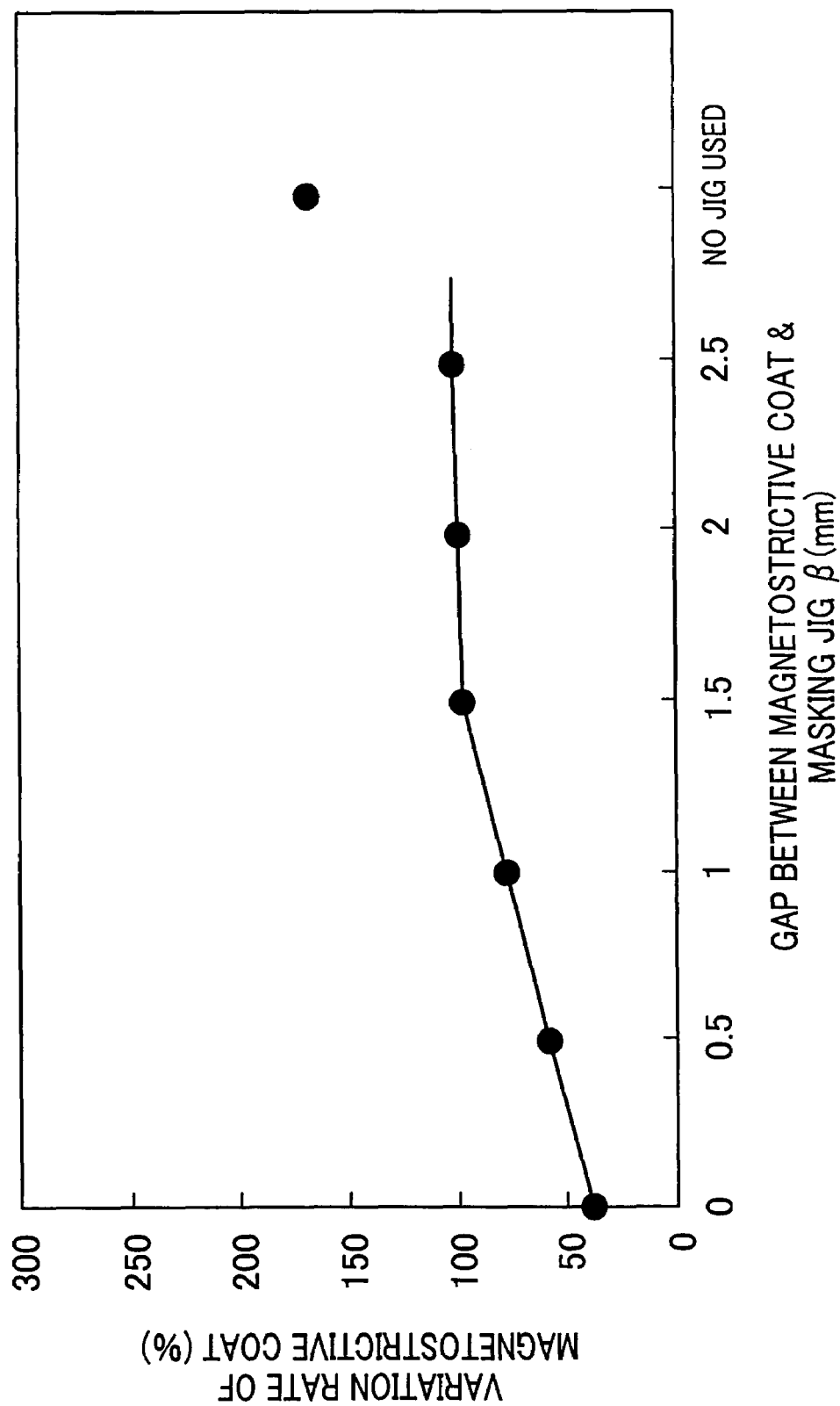

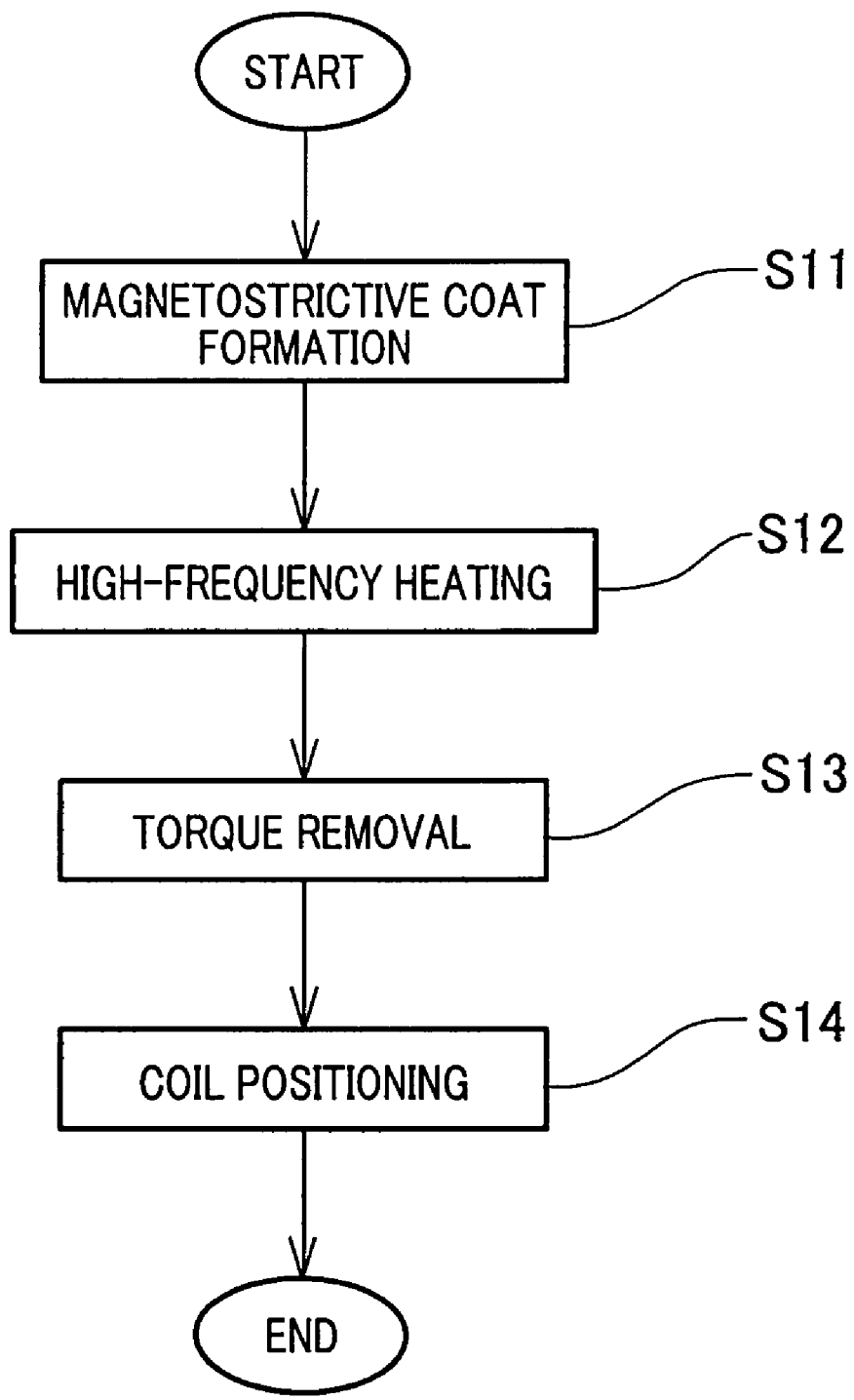

METHOD FOR MANUFACTURING A MAGNETOSTRICTIVE TORQUE SENSOR

CROSS-REFERENCE TO RELATED APPLICATIONS

This application is a Division of application Ser. No. 10/844,824, filed May 12, 2004, now U.S. Pat. No. 7,310,870 which application is incorporated herein by reference.

FIELD OF THE INVENTION

The present invention relates generally to a magnetostrictive torque sensor and, more particularly, to a magnetostrictive torque sensor for detecting a steering torque in an electric power steering apparatus for motor vehicles.

BACKGROUND OF THE INVENTION

As well known, the electric power steering apparatus are steering assisting apparatus which are designed to drive an electric motor as a human operator or driver manually operates a steering wheel, during driving of a motor vehicle, to thereby assist the driver's manual steering effort. In such electric power steering apparatus, the steering assisting motor, which provides a steering torque assist (or steering assist torque), is driven by a motor control device in accordance with a PWM (Pulse Width Modulation) scheme, using a steering torque signal generated by a steering torque detector section detecting steering torque that is produced on the steering shaft by driver's operation of the steering wheel and a vehicle velocity signal generated by a vehicle velocity detection section detecting a traveling velocity of the vehicle, so as to reduce manual steering force to be applied by the human driver.

FIG. 38 is a view showing an overall setup of a typical example of the conventional electric power steering apparatus. This electric power steering apparatus 100 includes a steering torque detector section (torque sensor) 102 for detecting steering torque applied by a human driver via a steering wheel 101, an electric steering assisting motor 103 for providing an steering torque assist to the steering by the driver, a power transmission device 104 for boosting the rotational torque of the motor 103, a control device 106 for controlling operation of the motor 103 on the basis of output signals from the torque detector section 102 and vehicle velocity detector section 105, and a rack and pinion mechanism 108 for varying a direction of steerable front road wheels 107.

The electric power steering apparatus 100 is constructed to provide the steering assist torque to an upper steering shaft 109a etc. connected to the steering wheel 101. The upper steering shaft 109a is also connected at its lower end to a lower steering shaft 109b via a universal joint 109c and connected at its upper end to the steering wheel 101. The lower steering shaft 109b is operatively connected at its lower end to a pinion gear 110 meshing with a rack gear 111a provided on a rack shaft 111. The pinion gear 110 and rack gear 111a together constitute a rack and pinion mechanism 108. Tie rods 112 are connected to axial opposite ends of the rack shaft 111, and the front road wheels 107 are connected to respective outer ends of the tie rods 112. The steering assisting motor 103 is operatively connected to the lower steering shaft 109b via the power transmission mechanism 104. The power transmission mechanism 104 comprises a worm gear 104a and worm wheel 104b. The motor 103 generates steering assist torque that is delivered via the power transmission mechanism 104 to the steering shafts 109b and 109a. The steering torque detector section (torque sensor) 102, which is provided on the lower steering shaft 109b, detects steering torque applied to the steering shafts 109a and 109b through driver's operation of the steering wheel 101. The vehicle velocity detector section 105 detects a traveling velocity of the vehicle, and the control device 106 is implemented by a computer. The control device 106 receives a steering torque signal T output from the torque detector section 102, vehicle velocity signal V output from the vehicle velocity detector section 105, etc., on the basis of which it generates a driving control signal SG1 for controlling the rotation of the steering assisting motor 103. The above-mentioned rack and pinion mechanism 108 etc. are accommodated in a gearbox 113 not shown in FIG. 38.

In short, the electric power steering apparatus 100 of FIG. 38 may be constructed by adding, to the construction of the traditional steering apparatus, the torque detector section 102, vehicle velocity detector section 105, control device 106, steering assisting motor 103 and power transmission device 104.

In the electric power steering apparatus 100, the steering assist torque, generated by the steering assisting motor 103 on the basis of the steering torque signal T, vehicle velocity signal V, etc., is boosted via the power transmission device 104 and delivered to a pinion shaft of the rack and pinion mechanism 108 so as to reduce steering torque to be manually applied by the driver. As the driver operates the steering wheel 101 to vary the traveling direction of the motor vehicle, a rotational force based on steering torque applied to the steering shafts 109a and 109b is converted into axial linear movement of the rack shaft 111, via the rack and pinion mechanism 108, to thereby vary the direction of the front road wheels 107 via the tie rods 112. During that time, the torque detector section 102, provided on the lower steering shaft 109b, detects the steering torque applied to the steering shaft 109b to generate an electric steering torque signal T, representative of the detected steering torque, that is supplied to the control device 106, and the vehicle velocity detector section 105 detects a traveling velocity of the vehicle steering to generate an electric vehicle velocity signal V that is supplied to the control device 106. Thus, on the basis of the steering torque signal T and vehicle velocity signal V, the control device 106 generates a motor current for driving the steering assisting motor 103, which in turn provides a steering assist force to the steering shafts 109b and 109a via the transmission mechanism 104. The motor 103 thus driven can reduce the steering force to be manually applied to the steering wheel 101 by the driver.

If the steering torque is represented by "TH" and a coefficient of a steering assist amount AH is assumed to be a constant value "kA", then AH=kA×TH.

Thus, if a load or pinion torque is represented by "TP", $$TP = TH + AH \qquad (1)$$
$$= TH + kA \times TH$$

Therefore, the steering torque TH can be expressed as $$TH = TP/(1+kA) \qquad (2)$$

Namely, the steering torque TH can be reduced to "pinion torque TP/(1+kA)", where kA is equal to or greater than zero.

FIG. 39 shows detailed organization of mechanical and electric components in the electric power steering apparatus 100, where part of left and right end portions of the rack shaft 111 are shown in section. The rack shaft 111 is accommodated in a cylindrical housing 131, disposed in a widthwise direction (left-and-right direction of FIG. 39) of the vehicle, for axial sliding movement therein. Ball joints 132 are secured via screws to opposite ends of the rack shaft 111 that project beyond the housing 131, and left and right tie rods 112 are connected to the ball joints 132. The housing 131 has brackets 133 via which the housing 131 is secured to the body of the vehicle, and stoppers 134 at its opposite ends. In FIG. 39, reference numeral 135 represents an ignition switch, 136 an on-vehicle battery, and 137 an A.C. generator annexed to an engine of the vehicle. The A.C. generator 137 is activated to generate power in response to operation of the vehicle engine. Necessary electric power is supplied to the control device 106 from the battery 136 or A.C. generator 137. Further, reference numeral 138 represents a rack end that abuts against one of the stoppers 134 during axial movement of the rack shaft 138, and 139 a dust-sealing boot for protecting the interior of the gearbox from water, mud, dust, etc.

FIG. 40 is a sectional view taken along the A-A lines of FIG. 39, which clearly shows a structure for supporting the lower steering shaft 109*b* and detailed organization of the steering torque detector section 102, transmission mechanism 104 and rack and pinion mechanism 108. The lower steering shaft 109*b* is rotatably supported, via four bearings 141*a*, 141*b*, 141*c* and 141*d*, within a housing 113*a* forming the gearbox 113. The transmission mechanism 104 and rack and pinion mechanism 108 are also accommodated within the housing 113*a*, and the torque detector section 102 is secured to an upper portion of the housing 113*a*. The steering torque detector section 102 includes magnetostrictive films or coats 102*b* and 102*c* that are provided on the outer circumferential surface of the lower steering shaft 109*b* and surrounded by coils 102*d*, 102*f*, 102*e* and 102*f* and yoke section 102*g*; that is, the lower steering shaft 109*b* are surrounded by the coils 102*d*, 102*f*, 102*e* and 102*f* and yoke section 102*g*. The housing 113*a* has an upper opening closed with a lid 143 bolted thereto. The pinion 110 provided on a lower end portion of the lower steering shaft 109*b* is positioned between the bearings 141*a* and 141*b*. The rack shaft 111 is guided along a rack guide 145 and pressed against the pinion 110 via a compression spring 146. The power transmission mechanism 104 includes the worm gear 104*a* connected via a transmission shaft 148 to an output shaft of the steering assisting motor 103, and the worm wheel 104*b* secured to the lower steering shaft 109*b*. Specifically, the torque detector section 102, which is secured to the lid 143 in the steering gearbox 113, detects steering torque acting on the lower steering shaft 109*b* and outputs a value of the detected steering torque (steering torque signal) to the control device 106, which in turn supplies a motor signal to cause the motor 103 to generate appropriate steering assist torque.

The steering torque detector section 102 of the electric power steering apparatus 100 comprises a magnetostrictive torque sensor designed to directly detect steering torque applied to the steering shaft 109*b*, as compared to the traditional torque sensor that detects an twist or torsional angle of a torsion bar, converts the detected torsional angle into axial displacement and detects the converted axial displacement to thereby indirectly detect steering torque.

As illustrated in FIG. 40, the lower steering shaft 109*b* connected to the steering wheel 101 is rotatably supported, via the bearings 141*c* and 141*d*, within the gearbox 113, and two magnetostrictive coats, each in the form of a nickel-iron plating or the like, are provided on two, upper and lower, portions 102*b* and 102*c* of the outer surface between the bearings 141*c* and 141*d*. The magnetostrictive coats, each having a predetermined thickness, are imparted with opposite magnetic anisotropies and reverse magnetostrictive characteristics, as will be later described in relation to FIG. 40.

FIG. 41 is a diagram showing positional relationship among an exciting coil, detecting coils and magnetostrictive coats in the magnetostrictive torque sensor 102. The magnetostrictive coats 102*b* and 102*c* are formed, with a predetermined axial interval therebetween, on the surface of the lower steering shaft 109*b*, and the exciting coil 102*f* is disposed near the magnetostrictive coats 102*b* and 102*c* with a slight air gap left between the coil 102*f* and coats 102*b* and 102*c*. The exciting coil 102*f* is connected to an exciting voltage supply source 102*h*. Further, the detecting coil 102*d* is disposed near the magnetostrictive coat 102*b* with a slight air gap therebetween, while the detecting coil 102*e* is disposed near the magnetostrictive coat 102*c* with a slight air gap therebetween. When torque acts on the lower steering shaft 109*b* in the magnetostrictive torque sensor 102, the torque also acts on the magnetostrictive coats 102*b* and 102*c*, and reverse magnetostrictive effects are produced in the coats 102*b* and 102*c* in accordance with the applied torque. Thus, as a high-frequency A.C. voltage (exciting voltage) is supplied from the exciting voltage supply source 102*h* to the exciting coil 102*f*, magnetic field variation due to the reverse magnetostrictive effects of the coats 102*b* and 102*c*, based on the input torque, can be detected as variation in impedance or induced voltage. Then, the torque applied to the steering shaft 109*b* can be detected on the basis of the detected impedance or induced voltage variation.

Example of such reverse magnetostrictive characteristics is shown in FIG. 42, where the horizontal axis represents the steering torque while the vertical axis represents the impedance or induced voltage detected via the detecting coils when an A.C. voltage is applied to the exciting coil. Curve C100 represents variation in the impedance or induced voltage detected via the detecting coil 102*d*, and a curve C101 represents variation in the impedance or induced voltage detected via the detecting coil 102*e*. As indicated by the curve C100 corresponding to the detection via the detecting coil 102*d*, the impedance or induced voltage increases as the steering torque changes from a negative value to a positive value, takes a peak value P1 when the steering torque reaches a positive value T1, and decreases after the steering torque gets greater than the value T1. As indicated by the curve C101 corresponding to the detection via the detecting coil 102*e*, the impedance or induced voltage increases as the steering torque changes from a positive value to a negative value, takes a peak value P1 when the steering torque reaches a negative value −T1, and decreases after the steering torque gets smaller than the value −T1. As shown, a steering-torque-vs.-impedance (induced voltage) characteristic obtained via the detecting coil 102*d* and a steering-torque-vs.-impedance (induced voltage) characteristic obtained via the detecting coil 102*e* present substantial mountain (upwardly-convex) curve shapes that are generally symmetrical with respect to the vertical axis, reflecting the opposite magnetic anisotropies of the upper and lower magnetostrictive coats 102*b* and 102*c*. Further, a straight line L100 represents a difference calculated by subtracting the characteristic curve C101, obtained via the detecting coil 102*e*, from the characteristic curve C100 obtained via the detecting coil 102d. The straight line L100 indicates that, ideally, the difference is zero when the steering torque is zero but varies linearly relative to variation in the steering torque within a steering torque range R. The magnetostrictive torque sensor uses particular regions or ranges of the characteristic curves C100 and C101 which present substantially constant gradients of sensitivity around a neutral torque point, so as to output detection signals corresponding to the direction and intensity of the input torque. Furthermore, using the characteristics of the straight line L100, the magnetostrictive torque sensor can detect the steering torque on the basis of the values detected via the detecting coils 102d and 102e.

From Japanese Patent Publication No. 3268089, there is known a magnetostrictive torque sensor for detecting steering torque input to the steering shaft (rotational shaft), where a magnetostrictive coat is formed by first masking the surface of the rotational shaft and then performing an electroless plating process on the masked surface. However, in the case where an annular magnetostrictive coat is formed on the rotational shaft by first wrapping a masking tape on part of the surface of the rotational shaft to thereby mask the surface and then plating the masked surface as taught in the No. 3268089 patent publication, the magnetostrictive coat would have a greater thickness at its opposite axial end portions than the remaining coat portion, which would unavoidably deteriorate the detection accuracy due to reasons to be described later.

Further, FIGS. 43A-43E show a manner in which the magnetostrictive coats 102b and 102c are imparted with magnetic anisotropies in the conventional magnetostrictive torque sensor, according to which the steering shaft 109b is subjected to a plating process to form the magnetostrictive coats 102b and 102c (see FIG. 43A; however, only the magnetostrictive coat 102b is shown with the other magnetostrictive coat 102c omitted for clarity). After completion of the plating, counterclockwise twisting torque Tq is applied to an upper portion of the steering shaft 109b while clockwise twisting torque Tq is applied to a lower portion of the steering shaft 109b, to thereby impart stress to the circumferential surface of the steering shaft 109b (FIG. 43B). Then, with the twisting torque Tq kept applied, the magnetostrictive coats 102b and 102c are heated in a thermostatic bath (FIG. 43C) and then cooled (FIG. 43D). After the cooling, the twisting torque Tq is removed from the surface of the steering shaft 109b (FIG. 43E), and necessary sensor output setting is performed to manufacture a substantially complete steering shaft 109b. For details of such a magnetostrictive torque sensor manufacturing method, see Japanese Patent Application Laid-Open Publication No. 2002-82000.

In FIGS. 43A-43E, each circle or oval D100 depicted alongside a drawing of the steering shaft 109b represents an enlarged drawing of a minute portion of the magnetostrictive coat 102b, and arrows F1 and F2 represent a tension load and compressing load, respectively. Note that the "minute portion" is a model portion of the magnetostrictive coat assumptively extracted for the purpose of showing typical physical changes occurring in the magnetostrictive coat. In the step of FIG. 43B, the minute portion D100 of the magnetostrictive coat 102b is simultaneously subjected to the tension load F1 and compressing load F2, so that it is deformed into an oval shape with its longitudinal axis extending upward and rightward (i.e., in a lower-left-to-upper-right direction of the figure). In the step of FIG. 43C, undesired creep is produced in the magnetostrictive coat 102b due to the heating, and the minute portion D100 assumes a near-circular oval shape. FIG. 43D shows the minute portion D100 having shrunk after the cooling but still generally keeping the near-circular oval shape of FIG. 43C. Further, FIG. 43E shows a state where torsional torque acting in an opposite direction to the twisting torque Tq has been applied to the magnetostrictive coat 102b due to removal of the twisting torque Tq, and where the minute portion D100 has assumed an oval shape with its longitudinal axis extending upward and leftward, i.e. in a lower-right-to-upper-left direction of the figure.

Specifically, in the conventional magnetostrictive torque sensor, the magnetostrictive coat 102b is formed into a thickness of 40 μm, and the steering shaft 109b is subjected to the twisting torque Tq of 70 Nm, and then heated at a temperature in a range of 150-550° C. for 10-20 minutes with the twisting torque Tq still kept applied thereto.

However, the above-discussed conventional magnetostrictive torque sensor 102 has several drawbacks, such as instable detected values of the steering torque, great hysteresis, a considerably long time for heating the steering shaft (magnetostrictive coats) and poor productivity. FIG. 44 is a graph showing an example of actual reverse magnetostrictive characteristics of the conventional magnetostrictive torque sensor 102, where the horizontal axis represents the input steering torque while the vertical axis represents the impedance or induced voltage detected by the detecting coils when an A.C. voltage has been supplied to the exciting coil. In FIG. 44, a curve C102 represents a difference, i.e. (A–B) value, calculated by subtracting an actual characteristic curve obtained via the detecting coil 102e (corresponding to the curve C101 of FIG. 42) from an actual characteristic curve obtained via the detecting coil 102d (corresponding to the curve C100 of FIG. 42), and the curve C102 corresponds to the straight line L100 of FIG. 42. From FIG. 44, it can be seen that the curve C102 presents occurrence of a hysteresis instead of actually presenting a zero "(A–B)" value when the steering torque is zero. Therefore, in the case where such a magnetostrictive torque sensor is employed in an electric power steering apparatus, the magnetostrictive torque sensor would deteriorate a steering feel and thus can not be suitably put to practical use.

Further, the conventional magnetostrictive torque sensor suffers from another problem that the reverse magnetostrictive characteristics are susceptible to influences of characteristics of the magnetostrictive coat formed by the plating performed prior to the heating process, as shown in FIGS. 45A-45D comparatively illustrating measurements of the reverse magnetostrictive characteristics before and after the heating process. Specifically, FIGS. 45A and 45B illustrate the reverse magnetostrictive characteristics of the magnetostrictive coats 102b and 102c before the heating, where curves C110 and C111 represent variation in the impedance detected when clockwise torque was applied while curves C112 and C113 represent variation in the impedance detected when counterclockwise torque was applied. It can be seen that the magnetostrictive coat 102b presents a greater hysteresis than the other magnetostrictive coat 102c. Further, FIGS. 45C and 45D illustrate the reverse magnetostrictive characteristics of the magnetostrictive coats 102b and 102c detected when the coats 102b and 102c were heated at 300° C. for one hour. In the figures, curves C114 and C115 represent variation in the impedance detected when clockwise torque was applied while curves C116 and C117 represent variation in the impedance detected when counterclockwise torque was applied. It can be seen that the magnetostrictive coat 102b presents a greater hysteresis than the other magnetostrictive coat 102c. Namely, it was found that the magnetostrictive coat (e.g., 102b) having a relatively great hysteresis before the heating would present a great hysteresis even after the heating while the magnetostrictive coat (e.g., 102c) having a relatively small hysteresis before the heating would present a small hysteresis even after the heating; this means that the reverse magnetostrictive characteristics after the heating would be significantly influenced by the reverse magnetostrictive characteristics before the heating. Therefore, there has been a demand for a more sophisticated manufacturing method which can provide a magnetostrictive torque sensor capable of constantly achieving satisfactory torque detection with a small hysteresis without being influenced by characteristics of the magnetostrictive coats present before the heating.

Further, the magnetostrictive torque sensor, made by the above-discussed conventional manufacturing method, has the problem that its zero torque point and sensitivity would vary if it has been exposed for a long time in an engine room heated to a high temperature in the order of 80-100° C. FIG. 46 is a diagram showing high-temperature durability characteristics of the magnetostrictive torque sensor made by the above-discussed conventional manufacturing method. In FIG. 46, a characteristic curve C120 represents variation in the values detected by the detecting coil 102d at the beginning of actual use or operation of the magnetostrictive torque sensor, while a characteristic curve C121 represents variation in the values detected by the detecting coil 102e at the beginning of use of the magnetostrictive torque sensor. Characteristic curve C130 represents variation in the values detected by the detecting coil 102d after exposure, to the high temperature, of the sensor, while a characteristic curve C131 represents variation in the values detected by the detecting coil 102e after exposure, to the high temperature, of the sensor.

The characteristic curves C130 and C131, obtained through detection after the exposure to the high temperature (e.g., after the sensor has been used 1,000 times), each present a greater peak value of the impedance and a peak value of the input torque shifted toward the neutral torque point. By comparison between the characteristic curve C120 at the beginning of the use and the characteristic curve C130 after the exposure to the high temperature, it can be seen that there are a change in the peak impedance value from 26.6Ω to 26.9Ω, and a change in the peak impedance value from 45.1 Nm to 42.8 Nm. Such changes are due to a creep of the plating (which would remove distortion from the plating), and the characteristics at the beginning of the use can not be restored because the characteristics after occurrence of the creep are retained even after the cooling.

The above-mentioned changes result in a change or shift in the zero point Z200 to a zero point Z210. If such a zero point change occurs, detection values of the detecting coils 102d and 102e would exceed a predetermined range when a failure check is performed to determine presence of any failure in the sensor by ascertaining whether a sum of the detection values of the detecting coils 102d and 102e falls within the predetermined range; as a result, the failure check can not be performed appropriately.

Furthermore, with the conventional technique, where the detected torque value is determined on the basis of the difference between the characteristic curves obtained via the detecting coils 102d and 102e, the sensitivity of the torque sensor would undesirably vary as a gradient of the difference varies in accordance with the above-mentioned changes. Because the sensitivity of the torque sensor is generally set, during manufacture of the torque sensor, so as to achieve an optimal control amount of the torque, variation from the thus-set sensitivity may often lead to an uncomfortable steering feel. Further, if the neutral torque point is erroneously set with a deviation from the optimal point during manufacture of the torque sensor, then the torque sensor would present greater variation in the zero torque point and sensitivity.

SUMMARY OF THE INVENTION

In view of the foregoing prior art problems, it is an object of the present invention to provide a technique for enhancing a torque detecting accuracy by uniformizing a magnetostrictive coat thickness of a magnetostrictive torque sensor.

It is another object of the present invention to provide a method of manufacturing a magnetostrictive torque sensor which presents a small hysteresis and can thereby improve a steering feel of an electric power steering apparatus, and also provide an improved electric power steering apparatus equipped with such a magnetostrictive torque sensor.

It is still another object of the present invention to provide a method of manufacturing a magnetostrictive torque sensor which can constantly achieve suitable detection output characteristics even when it has been exposed for a long time to a high-temperature atmosphere as in an engine room of a motor vehicle and can thereby constantly permit a good steering feel of an electric power steering apparatus, and an improved electric power steering apparatus equipped with the magnetostrictive torque sensor made by the manufacturing method.

In order to accomplish the above-mentioned objects, the present invention provides the following.

According one aspect of the present invention, there is provided a method for forming an annular magnetostrictive coat on an outer peripheral surface of a rotational shaft associated with a magnetostrictive torque sensor so that the torque sensor detects torque of the rotational shaft by detecting variation in magnetostrictive characteristic of the magnetostrictive coat as the rotational shaft is torsionally deformed, which comprises: a step of fitting a cylindrical masking jig over the outer peripheral surface of the rotational shaft and securing the masking jig to the outer peripheral surface; a step of placing the rotational shaft in a plating tank to thereby form the magnetostrictive coat on the outer peripheral surface of the rotational shaft; and a step of detaching the masking jig from the rotational shaft.

In this invention, the rotational shaft associated with the magnetostrictive torque sensor, which has the cylindrical masking jig secured to its outer peripheral surface, is placed or immersed in the plating tank to thereby form the magnetostrictive coat, and then the masking jig is detached from the rotational shaft. Namely, the magnetostrictive coat is formed, as by electro plating, on a portion of the outer peripheral surface of the rotational shaft which is not covered with the masking jig, and the thus-formed magnetostrictive coat can have a thickness that is uniform particularly in an axial direction of the rotational shaft. The magnetostrictive coat of the uniform thickness permits an improved toque detecting accuracy of the magnetostrictive torque sensor.

In one preferred implementation, the step of fitting includes a step of positioning the masking jig on the rotational shaft with respect to the axial direction of the rotational shaft, by fitting an annular ridge, formed on and along an inner peripheral surface of the masking jig, in an annular groove formed in and along the outer peripheral surface of the rotational shaft. Because the annular ridge of the masking jig is fitted in the annular groove of the rotational shaft prior to formation of the magnetostrictive coat, the present invention can accurately position the masking jig relative to the rotational shaft in the axial direction and thereby can control the position of the magnetostrictive coat with a high precision.

In one preferred embodiment, the magnetostrictive torque sensor detects steering torque for controlling an actuator of an electric power steering apparatus. In this case, the actuator of the electric power steering apparatus is controlled using the magnetostrictive torque sensor capable of high-accuracy torque detection owing to the magnetostrictive coat of a uniform thickness, with the result that the power steering apparatus can provide an improved steering feel.

According to another aspect of the present invention, there is provided a method for manufacturing a magnetostrictive torque sensor, which comprises: a magnetostrictive coat formation step of forming a magnetostrictive coat on a rotational shaft; a heating step of subjecting the magnetostrictive coat to a high-frequency heating process for a predetermined time with predetermined twisting torque kept applied to the rotational shaft; a torque removal step of removing the twisting torque from the rotational shaft to thereby impart a magnetic anisotropy to the magnetostrictive coat; and a coil positioning step of positioning a coiled coil around the magnetostrictive coat for detecting variation in magnetostrictive characteristic of the magnetostrictive coat.

With the arrangement that the magnetostrictive coat provided on the rotational shaft is subjected to the high-frequency heating (electromagnetic induction heating) for the predetermined time, the method can simultaneously impart the magnetostrictive coat with both greater residual tensile distortion and twisting distortion and thereby minimize a hysteresis of detected torque values. Further, because magnetostrictive characteristics of the magnetostrictive coat after the heating is not influenced by magnetostrictive characteristics present in the magnetostrictive coat before the heating, there can be achieved stable reverse magnetostrictive characteristics.

In one preferred implementation, the magnetostrictive coat contains an iron-nickel alloy material as its main component, and the predetermined twisting torque is in a range not smaller than 50 Nm but not greater than 100 Nm. Because of such arrangements, subjecting the magnetostrictive coat to the high-frequency heating (electromagnetic induction heating) for the predetermined time, e.g. ten seconds or less, the inventive method can simultaneously impart the magnetostrictive coat of the rotational shaft with both greater residual tensile distortion and twisting distortion within a short time and in a stable manner, with the result that it can significantly enhance the productivity as compared to the conventional technique where the magnetostrictive coat of the rotational shaft is heated in a thermostatic bath for several hours.

According to still another aspect of the present invention, there is provided a method for manufacturing a magnetostrictive torque sensor, which comprises: a step of providing a magnetostrictive coat on a rotational shaft; a step of subjecting the magnetostrictive coat to a heating process with predetermined twisting torque kept applied to the rotational shaft; a step of removing the twisting torque from the rotational shaft to thereby impart a magnetic anisotropy to the magnetostrictive coat; a reheating step of subjecting the rotational shaft to a reheating process; and a step of positioning a coiled coil around the magnetostrictive coat for detecting variation in magnetostrictive characteristic of the magnetostrictive coat.

The arrangement that the rotational shaft with the magnetostrictive coat is reheated after removal of the twisting torque, the inventive method can prevent the magnetostrictive coat from creeping by exposure to a high-temperature atmosphere during actual use or operation of the sensor, thereby avoiding undesired fluctuation in detected steering torque outputs and achieving stable torque detection. Because undesired fluctuation in detected steering torque outputs can be avoided, a reliable failure check can be performed on the magnetostrictive torque sensor by ascertaining whether or not a sum of the detected values falls within a predetermined range.

In one preferred implementation, a temperature at which the reheating step reheats the rotational shaft is greater than a normal use temperature at which the magnetostrictive torque sensor is actually used for torque detection. Because sensor output setting is performed after the magnetostrictive coat is previously caused to creep at a temperature higher than the normal use temperature of the magnetostrictive torque sensor, the inventive method can manufacture a magnetostrictive torque sensor capable of producing detected torque outputs with constant characteristics even when exposed for a long time to a high-temperature atmosphere as in the engine room.

According to still another aspect of the present invention, there is provided an electric power steering apparatus, which comprises: a motor for providing steering assist torque to a steering system; a steering torque sensor for detecting steering torque in the steering system; and a control section for controlling operation of the motor on the basis of at least a steering torque signal output from the steering torque sensor, and in which the steering torque sensor is a magnetostrictive torque sensor including a magnetostrictive coat provided on a rotational shaft, the magnetostrictive coat having a magnetic anisotropy imparted thereto by subjecting the magnetostrictive coat to a high-frequency heating process with predetermined twisting torque kept applied to the rotational shaft and then removing the twisting torque from the rotational shaft. With the magnetostrictive torque sensor including the magnetostrictive coat having a magnetic anisotropy, the electric power steering apparatus can provide an improved steering feel with good turning-back of the steering wheel.

According to yet another aspect of the present invention, there is provided an electric power steering apparatus, which comprises: a motor for providing steering assist torque to a steering system; a steering torque sensor for detecting steering torque in the steering system; and a control section for controlling operation of the motor on the basis of at least a steering torque signal output from the steering torque sensor, and in which the steering torque sensor is a magnetostrictive torque sensor including a magnetostrictive coat provided on a rotational shaft, the magnetostrictive coat having a magnetic anisotropy imparted thereto by subjecting the magnetostrictive coat to a heating process with predetermined twisting torque kept applied to the rotational shaft and then removing the twisting torque from the rotational shaft, the rotational shaft being then subjected to a reheating process at a temperature higher than a normal use temperature at which the magnetostrictive torque sensor is actually used for torque detection. With the magnetostrictive torque sensor capable of producing detected torque outputs with constant characteristics even when exposed for a long time to a high-temperature atmosphere in the engine room, the electric power steering apparatus can constantly provide an improved steering feel with constant sensitivity of the steering torque sensor.

BRIEF DESCRIPTION OF THE DRAWINGS

Certain preferred embodiments of the present invention will hereinafter be described in detail, by way of example only, with reference to the accompanying drawings, in which:

FIGS. 1A and 1B are views illustrating a steering shaft having magnetostrictive coats formed thereon;

FIG. 5 is a perspective view showing a shape of a first masking jig;

FIG. 12 is a graph showing how a variation rate of the thickness at one of the axial end portions of the magnetostrictive coats is influenced by the gap between the axial end of the coat and one of the masking jigs;

FIG. 17 is a flow chart explanatory of the method for manufacturing the magnetostrictive torque sensor of the present invention;

DETAILED DESCRIPTION OF THE PREFERRED EMBODIMENTS

Figure 2:
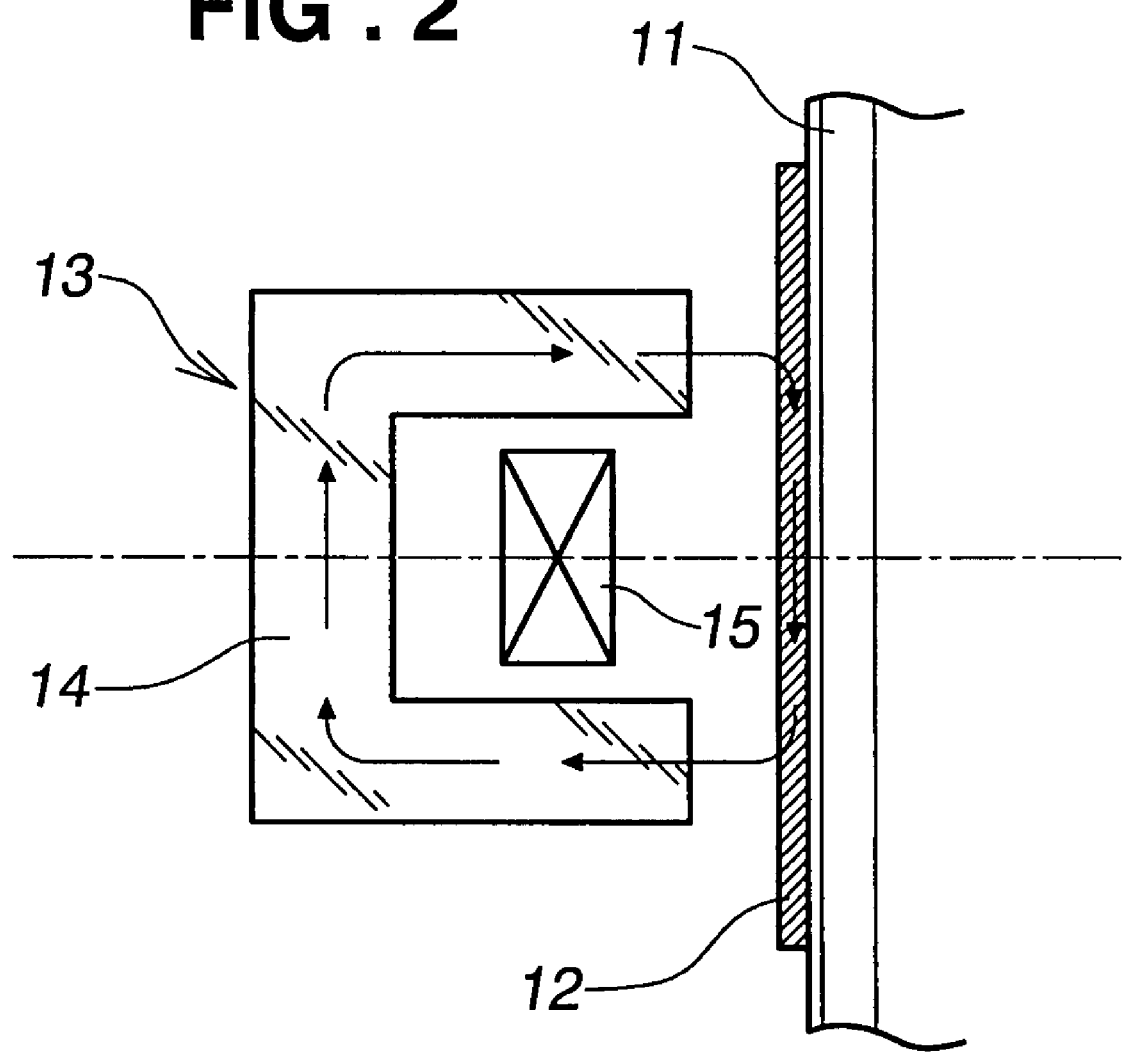
FIG. 2 is a view showing construction of a steering torque sensor.

First, a description will be given about a magnetostrictive-coat forming method in accordance with a first embodiment of the present invention.

FIG. 1A is a view illustrating a steering shaft having magnetostrictive coats formed thereon, and FIG. 1B is an enlarged view of a section depicted by reference character 11C in FIG. 1B. As seen in FIGS. 1A and 1B, two annular magnetostrictive coats 12, for example, in the form of Ni—Fe plating, are formed, at a predetermined interval, on the outer circumferential surface of the steering shaft 11 of an electric power steering apparatus. Annular grooves 11a or 11b are formed in and along the outer circumferential surface of the shaft 11 near axial opposite ends of each of the two magnetostrictive coats 12. In the illustrated example, the steering shaft 11 has a diameter D of 20 mm, each of the magnetostrictive coats 12 has a width (axial dimension) of 14 mm, the interval w between the magnetostrictive coats 12 is 8 mm, and a target thickness of each of the magnetostrictive coats 12 is several score μm.

Figure 3A:
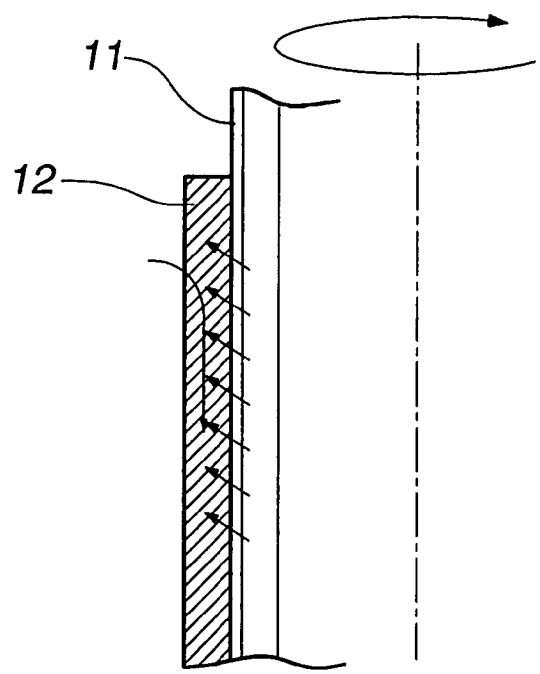
FIGS. 3A and 3B are views showing how uniformity of the magnetostrictive coats influence magnetic permeability.
Figure 3B:
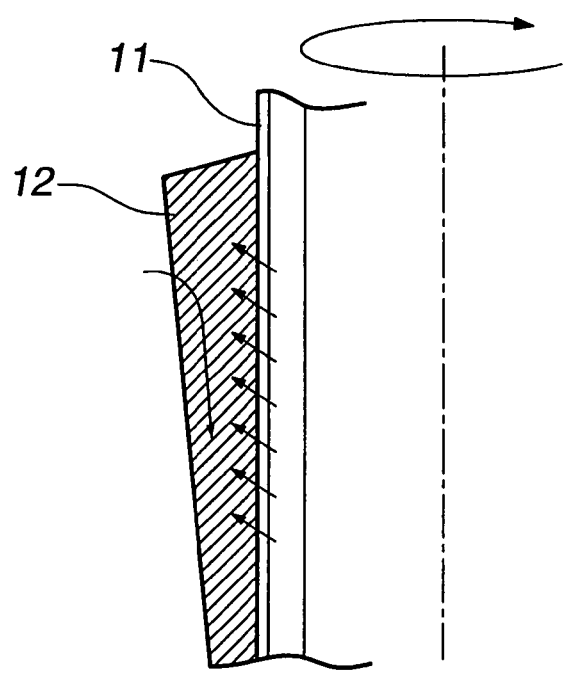
Figure 4A:
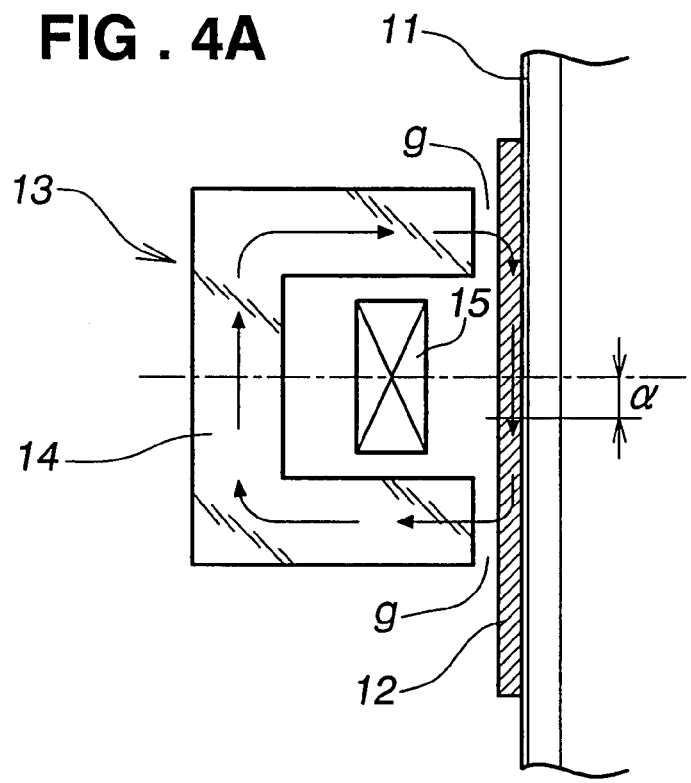
FIGS. 4A and 4B are views showing how air gaps are influenced by positional relationship between the steering shaft and the steering torque sensor.
Figure 4B:
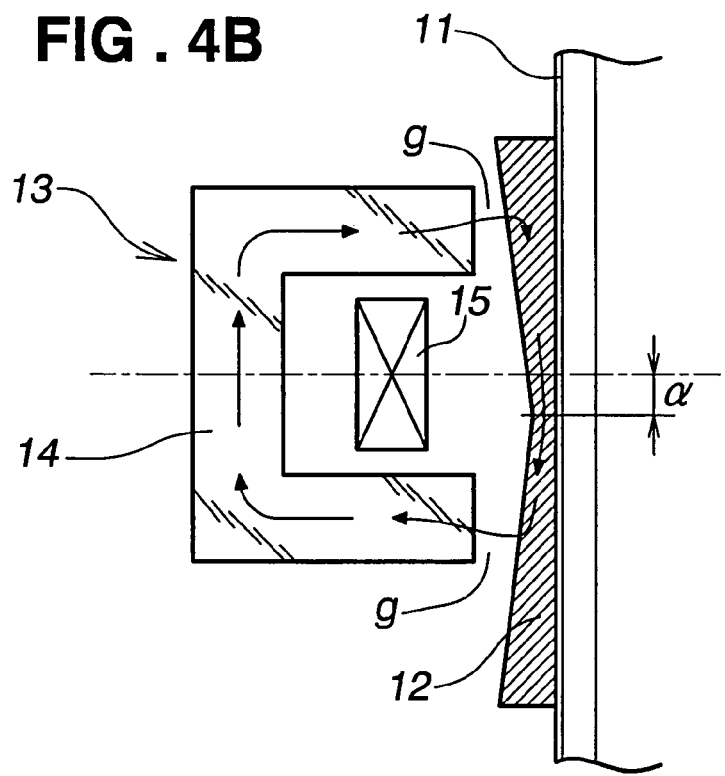

FIG. 2 is a view showing construction of a steering torque sensor, FIGS. 3A and 3B are views showing influences of uniformity of the magnetostrictive coats 12 on magnetic permeability, and FIGS. 4A and 4B are views showing how air gaps are influenced by positional relationship between the steering shaft 11 and the steering torque sensor. As illustrated in FIG. 2, the steering torque sensor 13, provided for detecting steering torque applied or input to the steering shaft 11 of the electric power steering apparatus, includes yokes 14 opposed to the respective magnetostrictive coats 12 (only one of the yokes 14 and one of the coats 12 are shown in FIG. 2 for simplicity) and a coil 15 wound on each of the yokes 14, so as to detect the input steering torque on the basis of variation in magnetic flux along a magnetic path formed by each set of the yoke 14 and coat 12.

Namely, as illustrated in FIG. 3A, as the steering shaft 11 is torsionally deformed along with the magnetostrictive coats 12 due to applied steering torque, the magnetic permeability of the coats 12 varies to cause variation in magnetic flux, so that the applied steering torque can be detected on the basis of the magnetic flux variation. As long as the magnetostrictive coats each have an uniform thickness throughout an axial length thereof, the detecting accuracy of the steering torque is not influenced even where an axial position of either one of the coats 12 relative to the corresponding yoke 14 and coil 15 is displaced by an amount a as illustrated in FIG. 4A.

However, if the thickness of the magnetostrictive coat 12 is not uniform in the axial direction as illustrated in FIG. 3B, then the magnetic permeability of the coat 12 becomes non-uniform in the axial direction, which would result in deterioration in the steering torque detecting accuracy. In this case, if the axial position of the coat 12 relative to the yoke 14 and coil 15 is displaced as illustrated in FIG. 4B, an air gap g between the yoke 14 and the coat 12 changes, which would also deteriorate the steering torque detecting accuracy.

Figure 13:
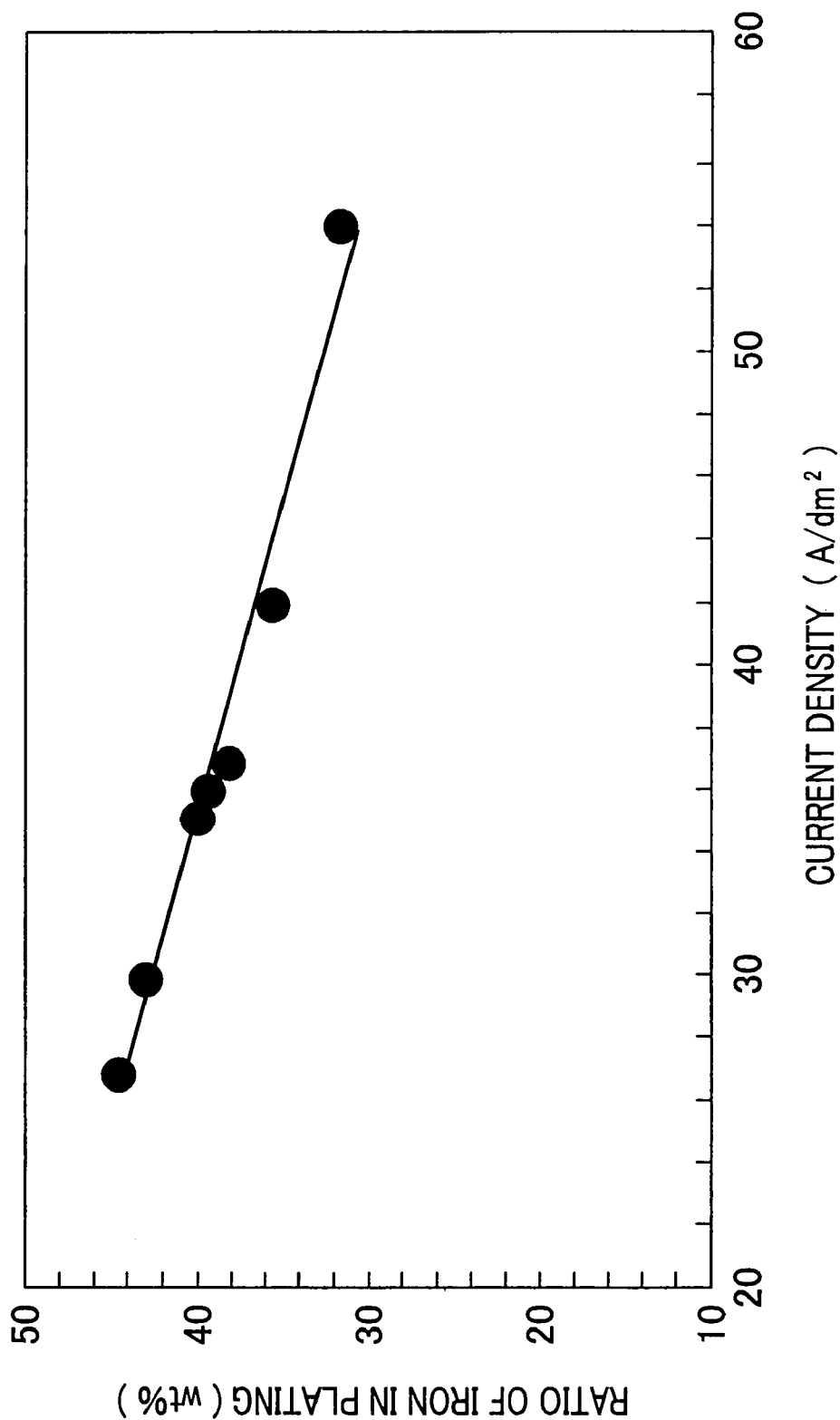
FIG. 13 is a graph showing how electric current density influences a ratio of an iron component in the plating.

Further, if electrical current distribution at the time of a plating process, to be later described, is not uniform, i.e. if the electrical current density is not uniform on the surface to be plated, a ratio of the iron component in the plating, i.e. magnetostrictive characteristics of the plating, becomes non-uniform as seen in FIG. 13 (that is a graph showing how the current density influences the ratio of the iron component in the plating). In this case too, axial positional displacement (misalignment) of the magnetostrictive coat 12 relative to the corresponding yoke 14 and coil 15 would also adversely influence the steering torque detecting accuracy. Therefore, in order to secure a desired detecting accuracy of the steering torque sensor 13, there is a need to uniformize the current density during the plating so as to achieve a uniform axial thickness of the magnetostrictive coats 12.

Thus, in the instant embodiment, two first masking jigs 16 and one second masking jig 17, each made of electrically-insulating resin, are used in forming the magnetostrictive coats 12 on the steering shaft 11 by means of electro plating, so as to uniformize axial thickness distribution of the coats 12.

FIG. 5 is a perspective view showing one of the two first masking jigs 16 constructed similarly. As shown, the first masking jig 16 is a cylindrical member fitted over and secured to the outer circumferential surface of the steering shaft 11 with no gap therebetween, and it is dividable, along a central dividing plane passing its axis, into first and second halves 18 and 19 for detachment and re-attachment from and to the steering shaft 11. Each of the first and second halves 18 and 19 has a semi-circular ridge 18a, 19a, formed on and along its inner peripheral surface, for fitting in the annular groove 11a of the steering shaft 11. The semi-circular ridges 18a and 19a of the two halves 18 and 19 together constitute a circular or annular ridge. The first half 18 of the first masking jig 16 has two recesses 18b, and two bolt holes 18c formed in its opposite ends to extend between the dividing plane and respective ends of the recesses 18b. The second half 19 has two bolt holes 19b formed in its opposite ends for communication with the bolt holes 18c of the first half 18.

Figure 6:
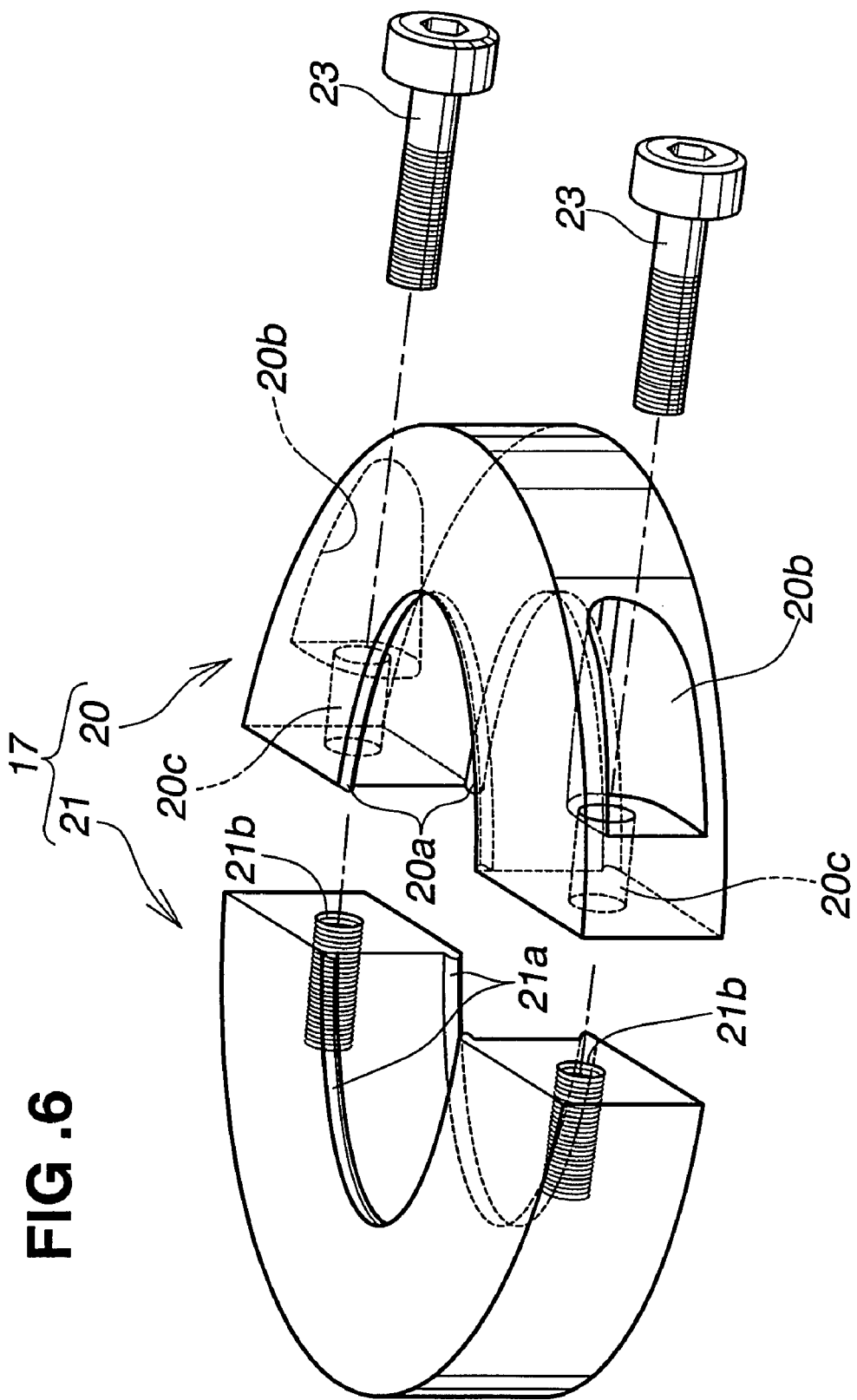
FIG. 6 is a perspective view showing a shape of a second masking jig.

FIG. 6 is a perspective view showing the second masking jig 17. As shown, the second masking jig 17 is a cylindrical member fitted over and secured to the outer circumferential surface of the steering shaft 11 with no gap therebetween, and it is also dividable, along a dividing plane passing its axis, into first and second halves 20 and 21 for detachment and re-attachment from and to the steering shaft 11. Each of the first and second halves 20 and 21 has a semi-circular ridge 20a, 21a, formed on and along its inner peripheral surface, for fitting in the annular groove 11b of the steering shaft 11. The semi-circular ridges 20a and 21a of the two halves 20 and 21 together constitute a circular or annular ridge. The first half 20 of the masking jig 17 has two recesses 20b, and two bolt holes 20c formed in its opposite ends to extend between the dividing plane and respective ends of the recesses 20b. The second half 21 has two bolt holes 21b formed in its opposite ends for communication with the bolt holes 20c of the first half 20.

Figure 7:
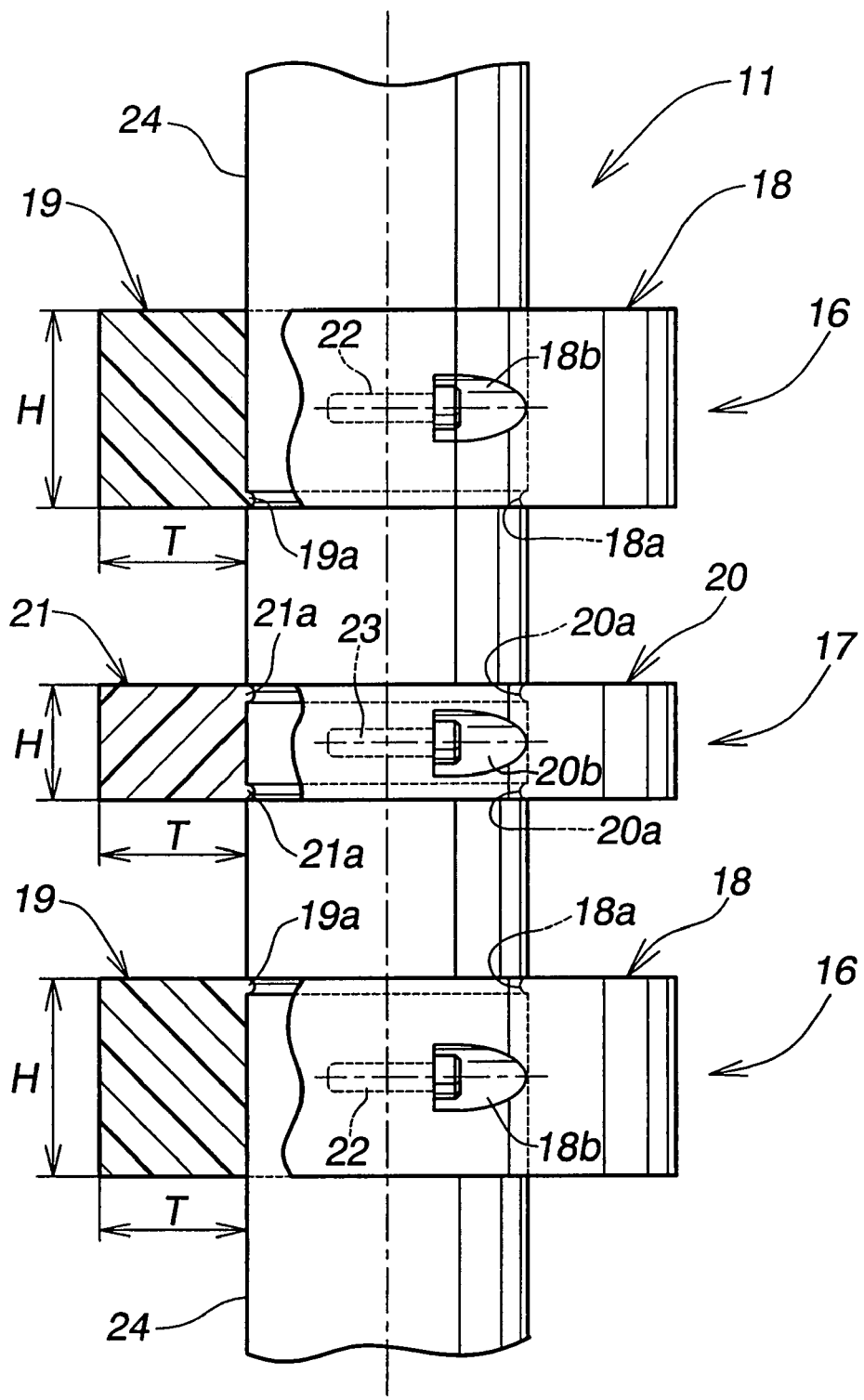
FIG. 7 is a view showing the first and second masking jigs attached to the steering shaft.

FIG. 7 is a view showing the first and second masking jigs 16 and 17 attached to the steering shaft 11. As shown, the first and second haves 18 and 19 of each of the first masking jigs 16 are attached to the steering shaft 11 in such a manner that their semi-circular ridges 18a and 19a are fitted in the substantial entire circumferential length of one (lowermost or uppermost one) of the annular grooves 11a of the steering shaft 11, and the first and second haves 18 and 19 are secured to the shaft 11 with two bolts 22 each screwed from one of the recess 18b, through the bolt hole 18c, into the corresponding bolt hole 19b of the second half 19. By the fitting engagement between the semi-circular ridges 18a and 19a and the annular groove 11a, each of the first masking jigs 16 can be positioned accurately on the steering shaft 11 with respect to the axial direction of the shaft 11.

Similarly, the first and second haves 20 and 21 of the second masking jig 17 are attached to the steering shaft 11 in such a manner that their semi-circular ridges 20a and 21a are fitted in the substantial entire circumferential length of the remaining two (i.e., intermediate) annular groove 11a of the steering shaft 11, and the first and second haves 20 and 21 are secured to the shaft 11 with two bolts 23 each screwed from one of the recess 20b, through the bolt hole 20c, into the corresponding bolt hole 21b of the second half 21. By the fitting engagement between the semi-circular ridges 20a and 21a and the annular groove 11b, the second masking jig 17 can also be positioned accurately on the steering shaft 11 with respect to the axial direction of the shaft 11.

Outer circumferential surface portions of the steering shaft 11 located upwardly and downwardly of the two first masking jigs 16 are masked by sticking thereto masking tapes 24.

Figure 8:
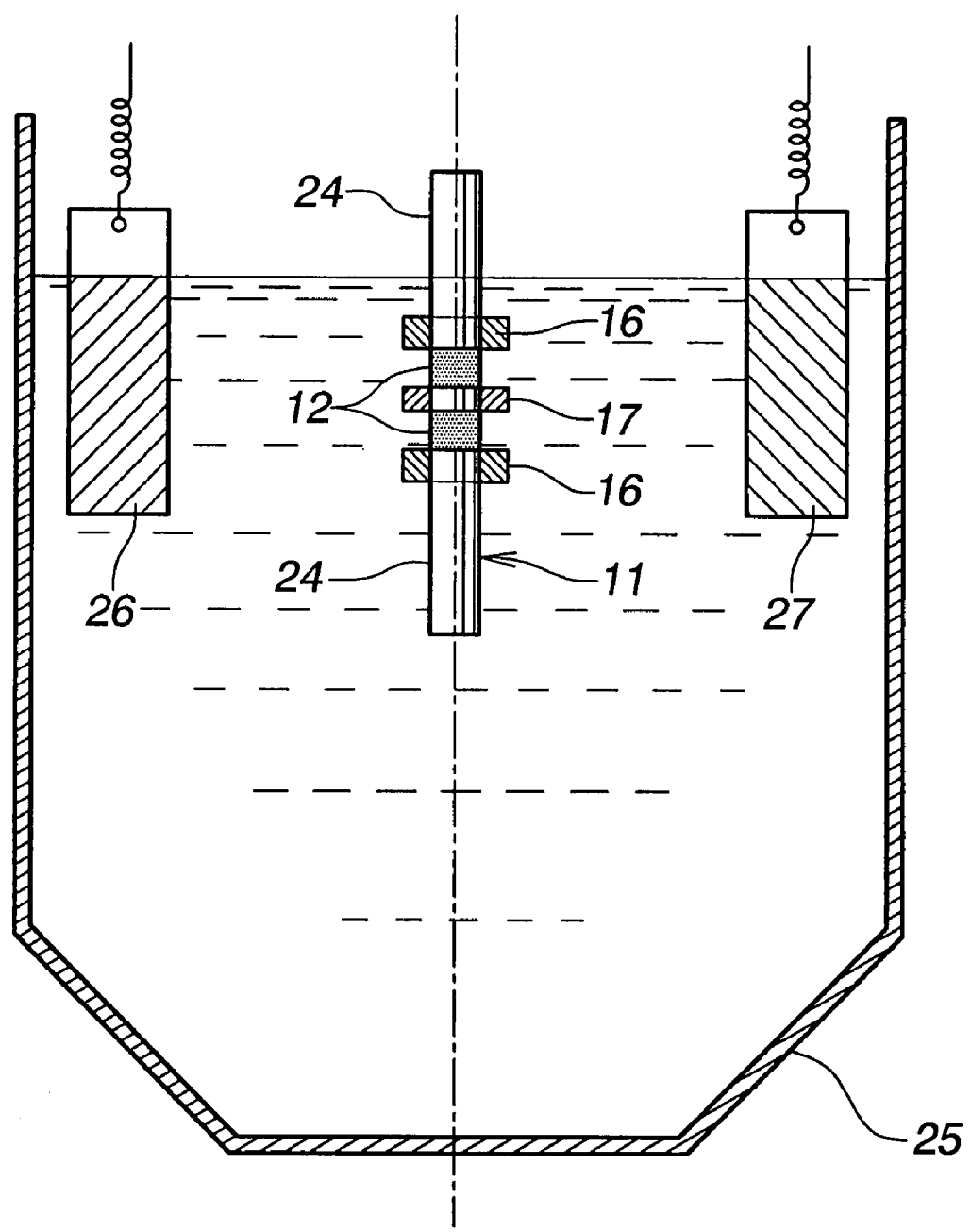
FIG. 8 is a view explanatory of a step of forming the magnetostrictive coats on the steering shaft by electroplating.

FIG. 8 is a view explanatory of a step of forming the magnetostrictive coats by electro plating. As shown, the steering shaft 11, having the two first masking jigs 16 and one second masking jig 17 securely attached thereto, is immersed in a plating tank 25, having electrolyte stored therein, and placed between a cathode 26 and an anode 27. Thus, outer circumferential surface portions of the steering shaft 11 which are not covered with the masking jigs 16, 17 and masking tape 24.

Figure 9:
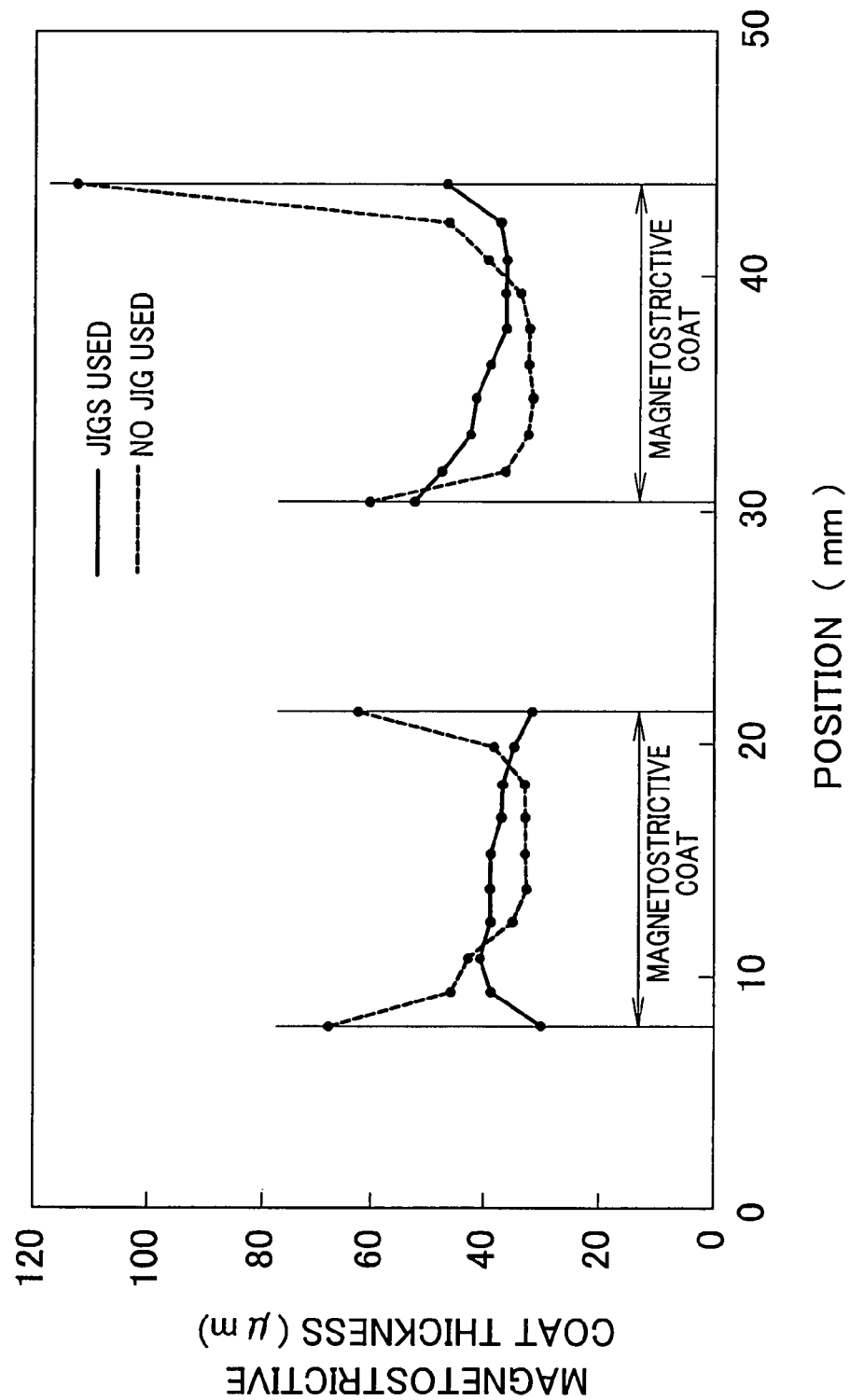
FIG. 9 is a graph showing axial thickness distribution of the magnetostrictive coats formed on the steering shaft.

FIG. 9 is a graph showing thickness distribution, in the axial direction, of the magnetostrictive coats 12 formed on the steering shaft 11. As indicated by solid lines, the magnetostrictive coats 12 present only slight thickness variation or unevenness in the axial direction in the case where the coats 12 are formed using the masking jigs 16 and 17 as well as the masking tapes. However, in the case where the magnetostrictive coats 12 are formed using the masking tapes alone, the coats 12 present sharp thickness increases at their axial opposite end portions contacting the masking tapes. Namely, the use of the first and second masking jigs 16 and 17 can minimize the thickness increases at the axial opposite end portions of the magnetostrictive coats 12, presumably because the electrical current can be prevented from concentrating at the axial opposite end portions of the coats 12 during the plating.

Figure 10:
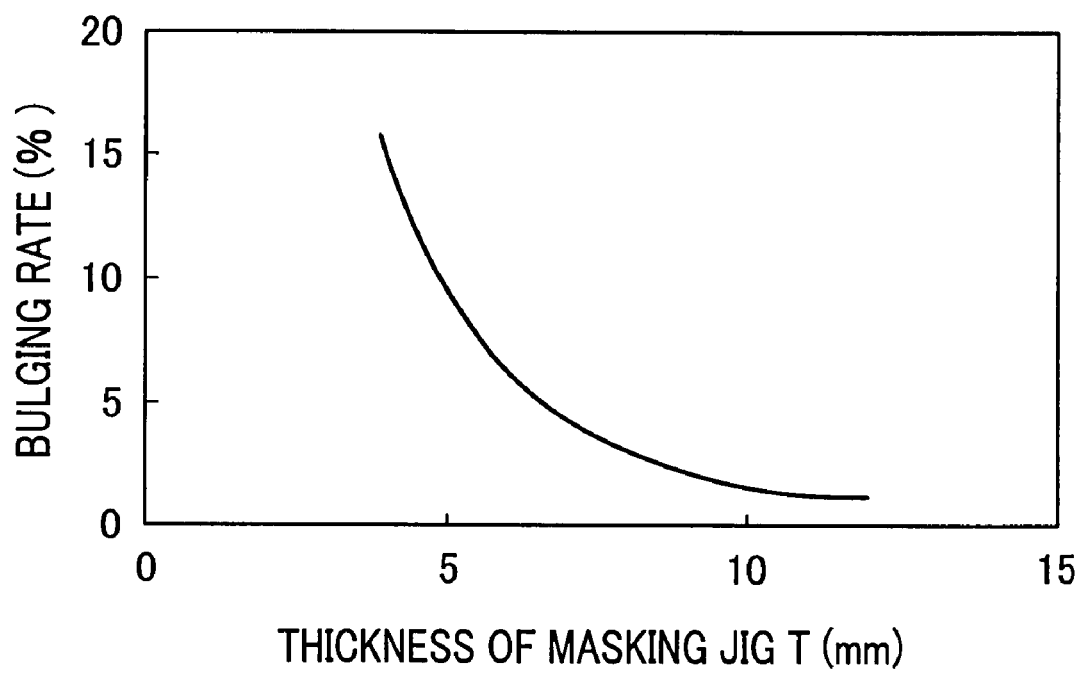
FIG. 10 is a graph showing relationship between a thickness of the masking jigs and a bulging rate at axial opposite end portions of the magnetostrictive coats.

FIG. 10 is a graph showing relationship between the thickness of the masking jigs and an average bulging rate at the axial opposite end portions of the magnetostrictive coats. If the thickness T (see FIG. 7) of the first and second masking jigs 16 and 17 is increased, the bulging rate at the axial opposite end portions of the magnetostrictive coats 12 decreases sharply, as seen from the graph. It may be seen that, if the thickness T of the first and second masking jigs 16 and 17 is set at 10 mm or more, the bulging rate of the coat thickness decreases to 1.9% or less so that there can be obtained a generally uniform thickness of the coats 12.

It is desirable that the axial ends of the first and second masking jigs 16 and 17 be positioned to conform to the axial ends of the magnetostrictive coats 12 to be formed. Because, if there are gaps between the axial ends of the first and second masking jigs 16 and 17 and the axial ends of the magnetostrictive coats 12, the coats 12 would present an increased bulging rate of the thickness at the axial end portions.

Figure 11A:
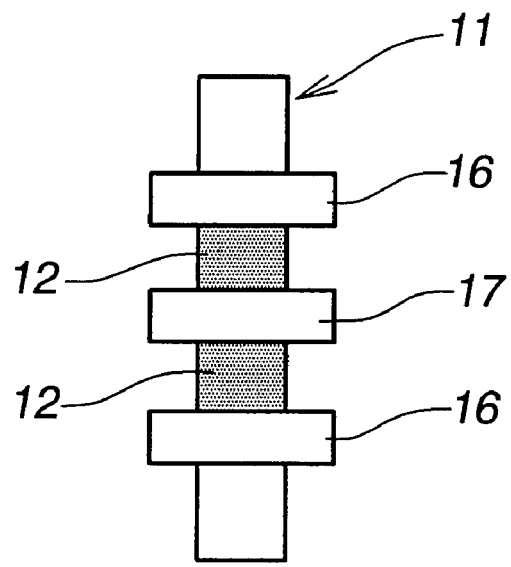
FIGS. 11A-11C are views showing gaps between the axial ends of the magnetostrictive coats and the first and second masking jigs.
Figure 11B:
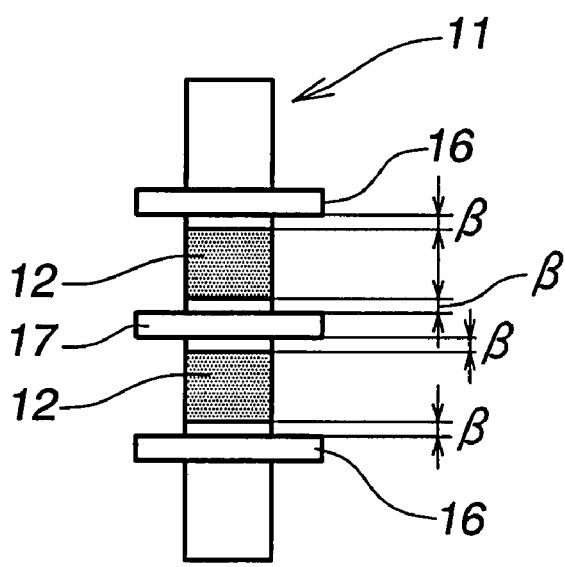
Figure 11C:
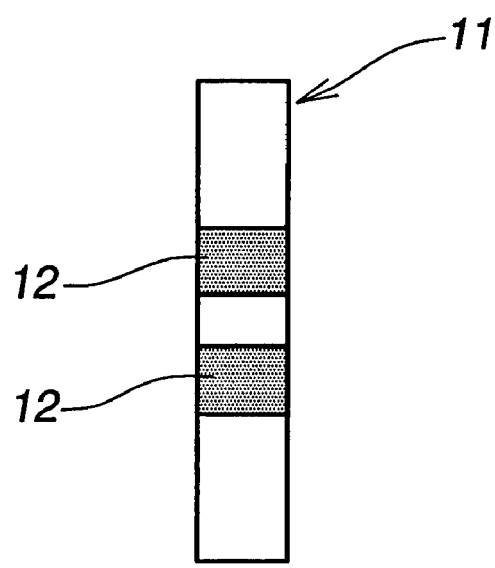

FIGS. 11A-11C are views showing the gaps between the axial ends of the magnetostrictive coats 12 and the first and second masking jigs 16 and 17, and FIG. 12 is a graph showing how a variation rate of the thickness at one of the axial end portions of the magnetostrictive coats 12 is influenced by the gap between the axial end of the coat 12 and one of the masking jigs 16 and 17. Let's assume a case where the first and second masking jigs 16 and 17 each have a smaller height H (see FIG. 7) and gaps β are formed between the axial ends of the magnetostrictive coats 12 to be formed and masking jigs 16 and 17 and where the plating process is performed with the gaps β covered with the making tapes. In FIG. 12, the horizontal axis represents the gap β, while the vertical axis represents the variation rate of the thickness at the axial end portion of the magnetostrictive coat 12. Left end point of a curve in the graph represents the thickness variation rate achievable with the instant embodiment of the invention (where the gap β is zero as illustrated in FIG. 11A), which is the minimum thickness variation rate. Further, a black dot separately depicted at a right end point in the graph represents a thickness variation rate achievable with the conventionally-known technique as discussed above (that does not employ the masking jigs 16 and 17 of FIG. 11C), which is the maximum thickness variation rate.

From the graph of FIG. 12, it can be seen that the approach of positioning the axial ends of the first and second masking jigs 16 and 17 to conform to the axial ends of the magnetostrictive coats 12 to be formed is most advantageous for uniformizing the thickness of the magnetostrictive coats 12.

Because a predetermined actuator of the electric power steering apparatus is controlled using the magnetostrictive steering torque sensor 13 that has the magnetostrictive coats 12 of the uniform thickness formed thereon and is thereby capable of high-accuracy steering torque detection, there can be provided an enhanced steering feel. However, it should be appreciated that the magnetostrictive torque sensor of the invention is applicable to any other desired applications than the steering torque detection in electric power steering apparatus.

Namely, according to the present invention set forth above, the cylindrical masking jigs are first fitted over and secured to the outer circumferential surface of the rotational shaft of the magnetostrictive torque sensor, then the rotational shaft of the magnetostrictive torque sensor is immersed in the plating tank and subjected to the plating process so that magnetostrictive coats are formed on the rotational shaft, and then the masking jigs are detached from the rotational shaft. With such arrangements, the present invention can reliably uniformize the thickness of the magnetostrictive coats formed on outer circumferential surface portions of the rotational shaft which are not covered with the masking jigs 16, 17.

Further, because the present invention is arranged in such a manner that the annular ridges of the masking jigs 16 and 17 are fitted in the annular grooves prior to the plating process, the present invention can accurately position the masking jigs 16 and 17 relative to the rotational shaft in the axial direction and thereby control the positions of the magnetostrictive coats with a high precision.

Furthermore, because the predetermined actuator of the electric power steering apparatus is controlled using the magnetostrictive torque sensor that has the magnetostrictive coats 12 of the uniform thickness formed thereon and is thereby capable of high-accuracy steering torque detection, the present invention can provide an enhanced steering feel via the electric power steering apparatus.

Next, a description will be given about the magnetostrictive torque sensor manufactured by the method of the present invention and the electric power steering apparatus equipped with such a magnetostrictive torque sensor, as a second embodiment of the present invention.

Figure 14:
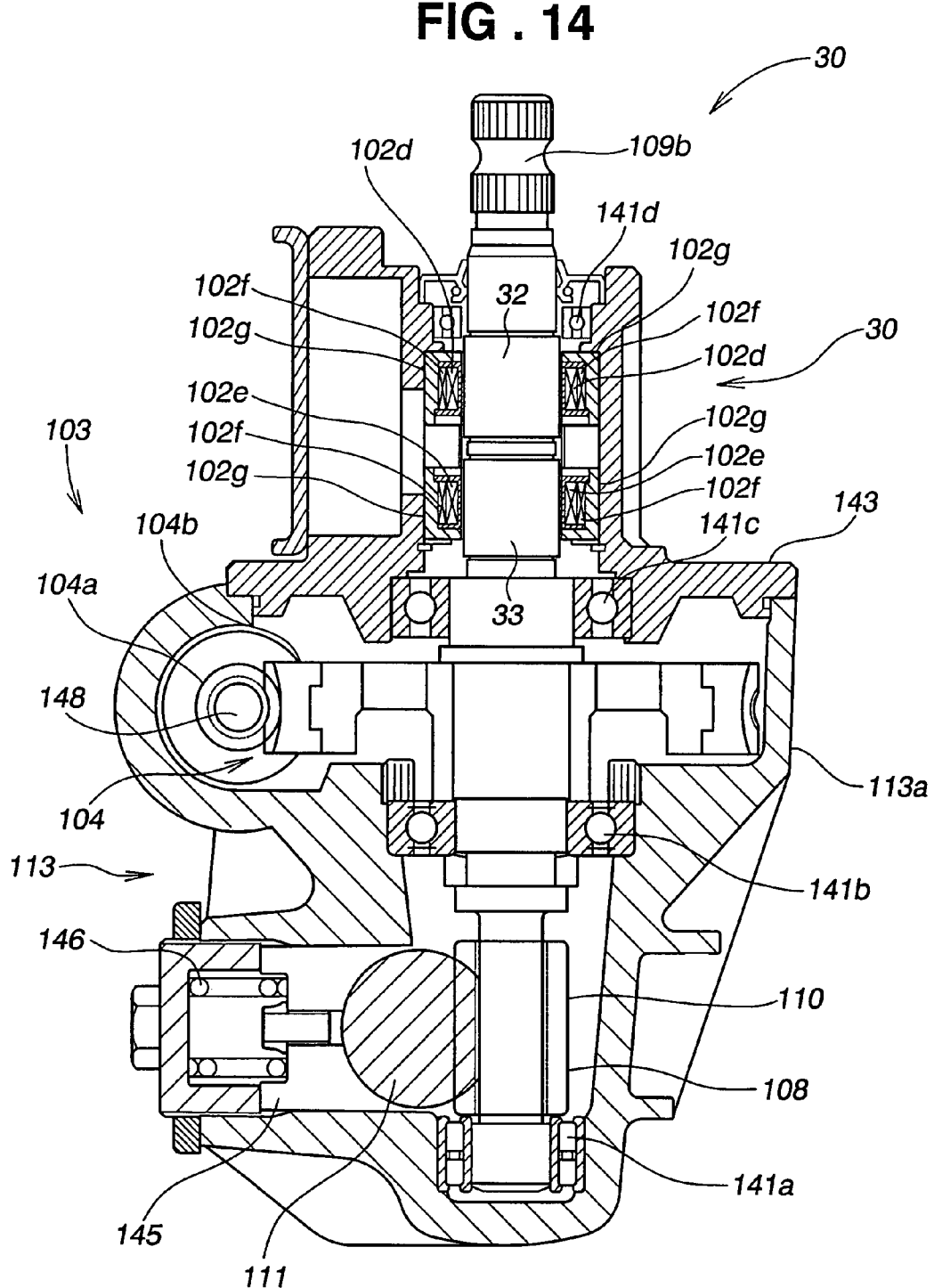
FIG. 14 is a view showing a magnetostrictive torque sensor manufactured by a method of the present invention and an electric power steering apparatus equipped with the magnetostrictive torque sensor.
Figure 40:
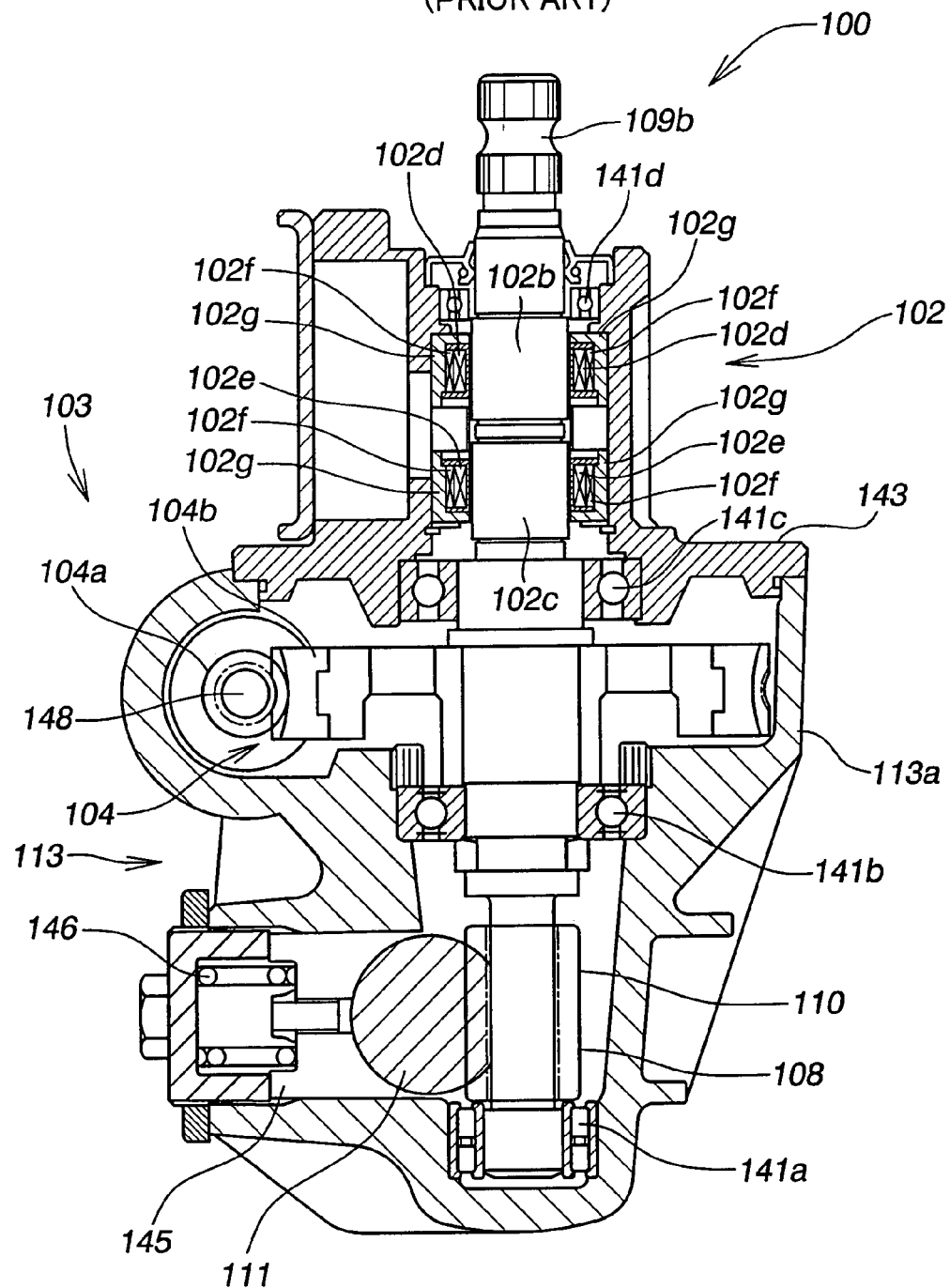
FIG. 40 is a sectional view taken along the A-A lines of FIG. 38.
Figure 41:
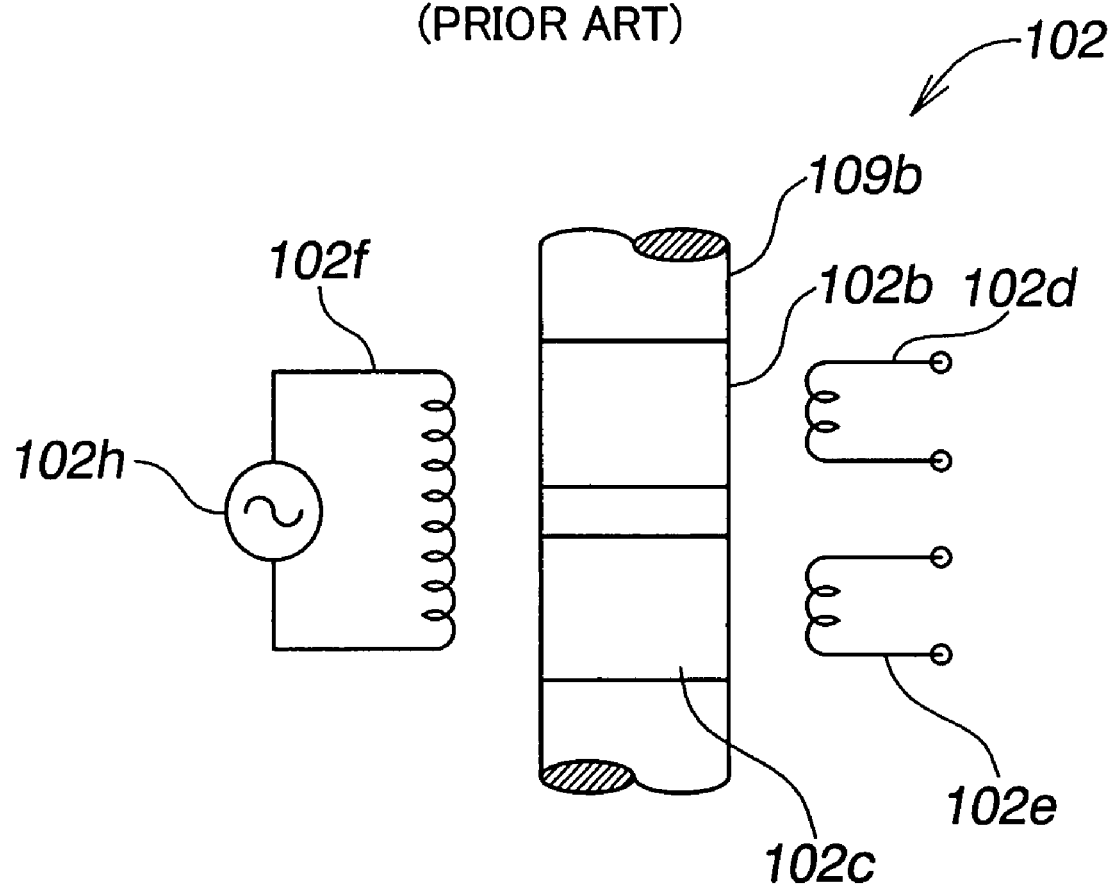
FIG. 41 is a diagram showing positional relationship among an exciting coil, detecting coils and magnetostrictive coats in a magnetostrictive torque detector section of the conventional electric power steering apparatus.
Figure 42:
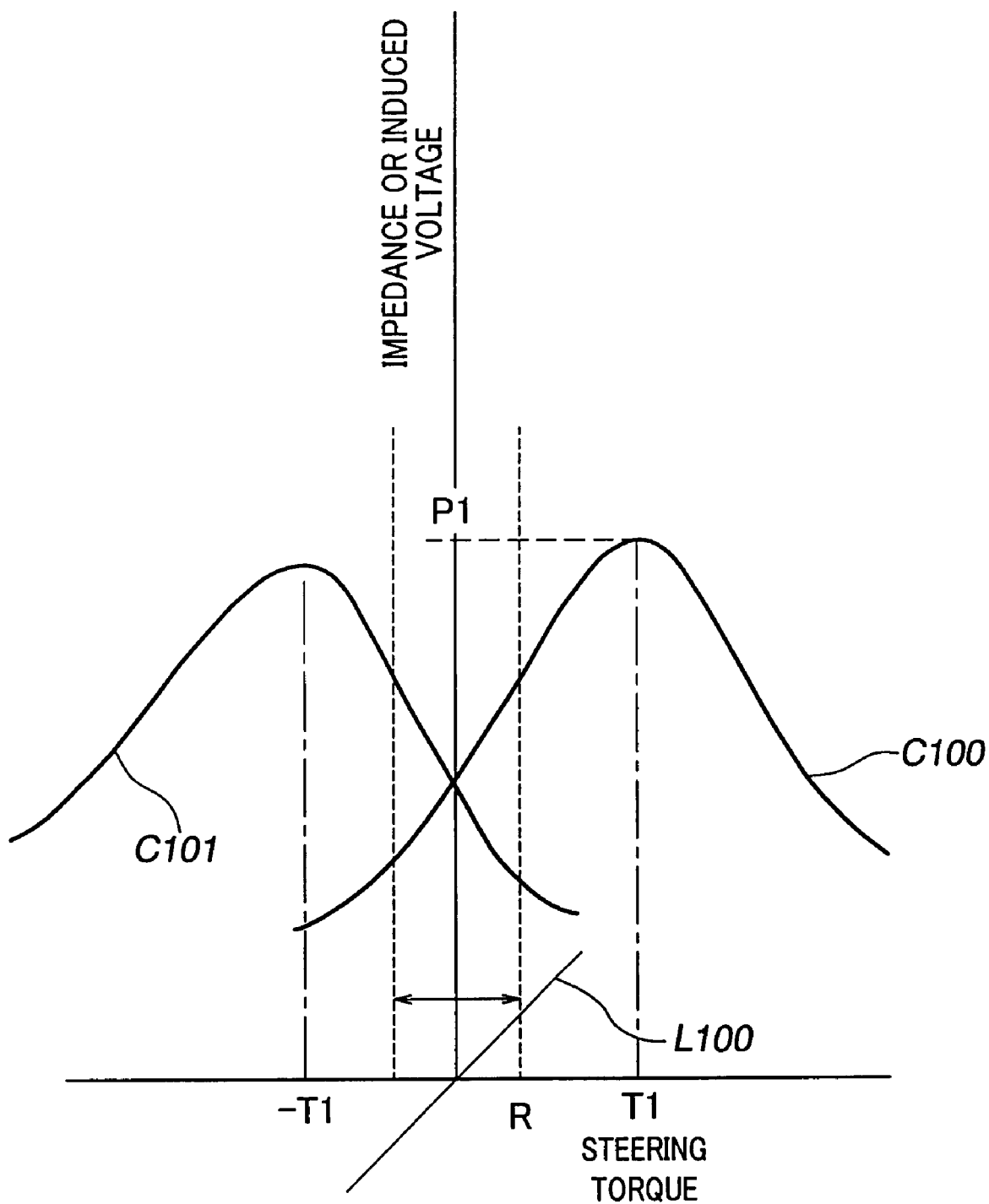
FIG. 42 is a graph showing ideal reverse magnetostrictive characteristics of the magnetostrictive torque detector section in the conventional electric power steering apparatus.

FIG. 14 is a view, similar to FIG. 40, which shows the magnetostrictive torque sensor manufactured by the method of the present invention and the electric power steering apparatus equipped with the magnetostrictive torque sensor. The electric power steering apparatus 30 shown in FIG. 14 is generally similar to the electric power steering apparatus 100 of FIG. 40 except for the manufacturing method of the magnetostrictive torque sensor 31, and thus the same components as those in FIG. 40 are represented by the same reference characters and will not be described here to avoid unnecessary duplication.

In the illustrated example of FIG. 14, the steering shaft (rotational shaft) 109b, connected to the steering wheel 101, is rotatably supported on a housing 101 via bearings 141a, 141b, 141c and 141d. Two separate, upper and lower, portions of the outer circumferential surface of the steering shaft (rotational shaft) 109b between the bearings 141c and 141d are coated with a magnetostrictive material, such as a nickel-iron plating material, having a positive magnetostrictive constant, as depicted at 32 and 33, so as to provide magnetostrictive coats each having a predetermined thickness, e.g. 30 μm or less. The thus-formed two magnetostrictive coats 32 and 33 are imparted with opposite magnetic anisotropies by applying predetermined twisting torque to the steering shaft 109b and hence the magnetostrictive coats 32 and 33, then subjecting the steering shaft 109b to high-frequency heating, next restoring the shaft 109b back to a room temperature and then removing the predetermined twisting torque from the steering shaft 109b. Even in a case where no twisting torque is applied to the magnetostrictive coats 32 and 33, tensile stress is constantly applied to the coats 32 and 33 via a later-described mechanism, so that the coats 32 and 33 present small hystereses of reverse magnetostrictive characteristics.

Figure 15:
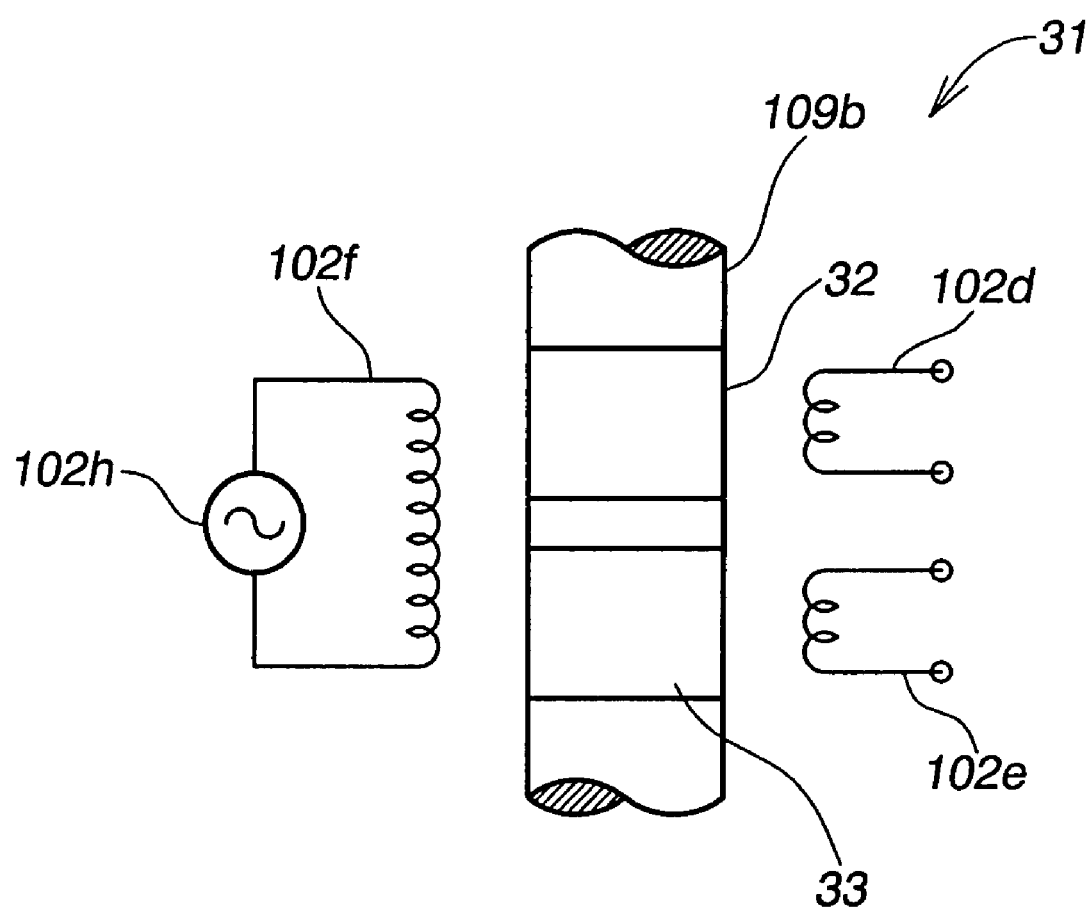
FIG. 15 is a diagram schematically showing positional relationship among an exciting coil, detecting coils and magnetostrictive coats in the magnetostrictive torque sensor of the invention.

FIG. 15 is a schematic diagram showing positional relationship among an exciting coil, detecting coils and magnetostrictive coats in the magnetostrictive torque sensor 31 as described above. The magnetostrictive coats 32 and 32 are formed, with a predetermined interval therebetween, on the surface of the steering shaft 109b through the high-frequency heating under the predetermined torque, and the exciting coil 102f is disposed near the magnetostrictive coats 102b and 102c with a slight air gap left between the coil 102f and coats 102b and 102c. The exciting coil 102f is connected to an exciting voltage supply source 102h and disposed near the magnetostrictive coats 32 and 32 with a slight gap therebetween. Further, the detecting coil 102d is disposed near the magnetostrictive coat 32 with a slight air gap therebetween, while the detecting coil 102e is disposed near the magnetostrictive coat 33 with a slight air gap therebetween.

When torque acts on the steering shaft 109b in the magnetostrictive torque sensor 31, the torque also acts on the magnetostrictive coats 32 and 33, and reverse magnetostrictive effects are produced in the coats 32 and 33 in accordance with the applied torque. Thus, as a high-frequency A.C. voltage (exciting voltage) is supplied from the exciting voltage supply source 102h to the exciting coil 102f, magnetic field variation due to the reverse magnetostrictive effects of the coats 32 and 33, based on the input torque, can be detected, via the detecting coils 102d and 102e, as variation in impedance or induced voltage. Because, during that time, tensile stress as well as the twisting torque is constantly applied to the magnetostrictive coats 32 and 33, there can be obtained characteristics of small hystereses, so that the torque applied to the steering shaft 109b can be detected accurately on the basis of the detected impedance or induced voltage variation.

Figure 16:
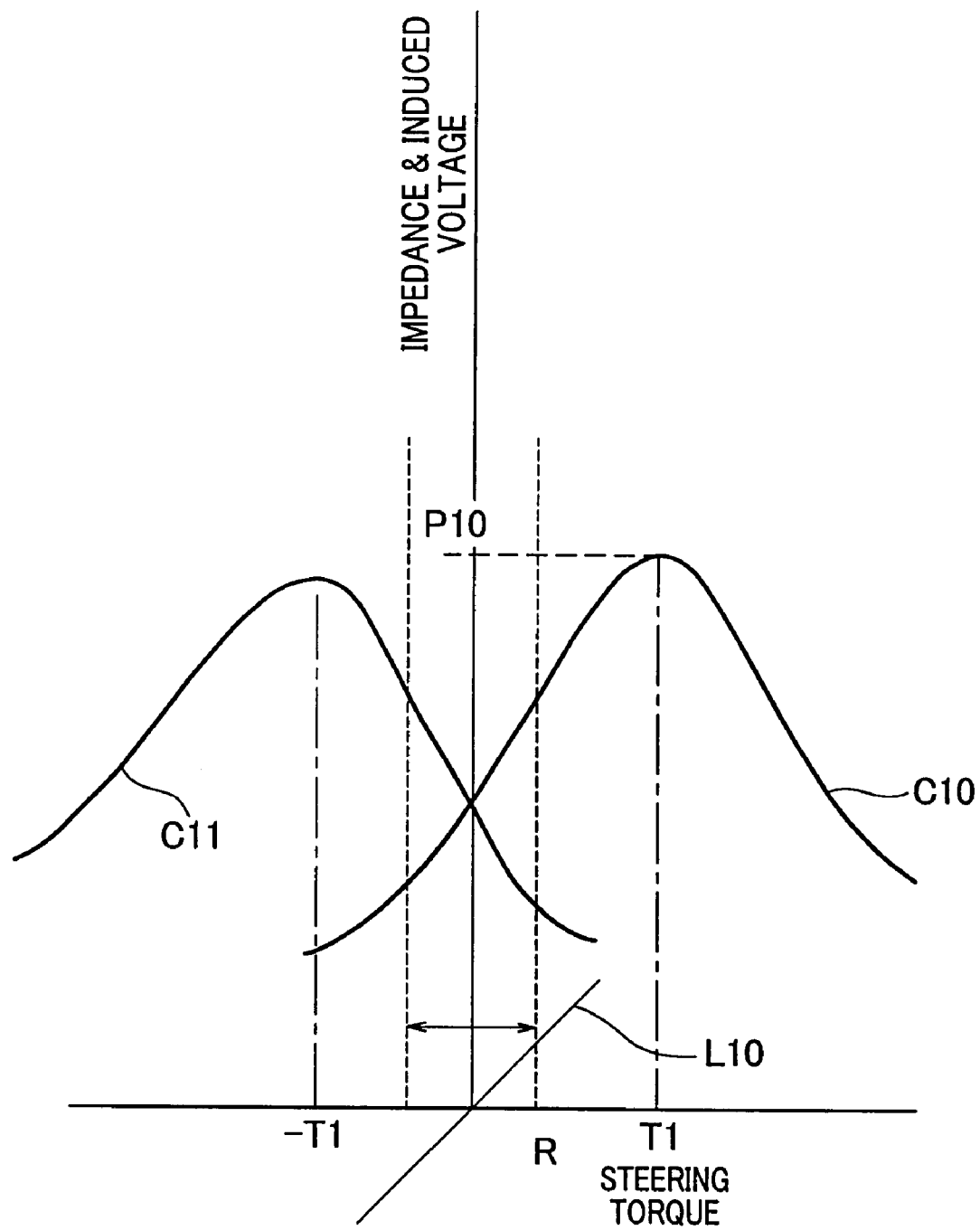
FIG. 16 is a graph showing reverse magnetostrictive characteristics of the magnetostrictive torque sensor of the invention.

Example of the reverse magnetostrictive characteristics of the inventive magnetostrictive torque sensor is shown in FIG. 16, where the horizontal axis represents the input steering torque while the vertical axis represents the impedance or induced voltage detected via the detecting coils 102d and 102e when an A.C. voltage is applied to the exciting coil 102f. Curve C10 represents variation in the impedance or induced voltage detected via the detecting coil 102d, and a curve C11 represents variation in the impedance or induced voltage detected via the detecting coil 102e. As indicated by the curve C10 corresponding to the detection via the detecting coil 102d, the impedance or induced voltage increases as the steering torque changes from the negative polarity to the positive polarity, takes a peak value P10 when the steering torque reaches a positive value T1, and decreases after the steering torque gets greater than the value T1. Even when the steering torque decreases from a relatively great value to zero, the magnetostrictive coats 32 and 33 can be kept in a stable magnetized state so that the coats 32 and 33 present stable magnetic characteristic variation responsive to the input steering torque, thus presenting small hystereses. This is because the tensile stress is still being applied to the magnetostrictive coats 32 and 33.

Further, as indicated by the curve C11 corresponding to the detection via the detecting coil 102e, the impedance or induced voltage increases as the steering torque changes from the positive polarity to the negative polarity, takes a peak value P10 when the steering torque reaches a negative value –T1, and decreases as the steering torque gets smaller than the value –T1. Whereas magnetic domains in the magnetostrictive coats vary in direction as the steering torque further decreases from a relatively great negative value, the magnetostrictive coats 32 and 33 can be kept in a stable magnetized state so that the coats 32 and 33 present stable magnetic characteristic variation responsive to the input steering torque, thus presenting small hystereses. This is because the tensile stress is still being applied to the magnetostrictive coats 32 and 33.

As also shown in FIG. 16, a steering-torque-vs.-impedance (induced voltage) characteristic obtained via the detecting coil 102d and a steering-torque-vs.-impedance (induced voltage) characteristic obtained via the detecting coil 102e present substantial mountain (upwardly-convex) curve shapes of small hystereses which are generally symmetrical with respect to the vertical axis, reflecting the opposite magnetic anisotropies of the upper and lower magnetostrictive coats 32 and 33. Further, a straight line L10 represents a difference calculated by subtracting the characteristic curve C11, obtained via the detecting coil 102e, from the characteristic curve C10 obtained via the detecting coil 102d. The straight line L10 indicates that the difference is zero when the steering torque is zero but varies almost linearly relative to variation in the steering torque within a steering torque range R. The magnetostrictive torque sensor uses particular portions or ranges of the characteristic curves C10 and C11 which may be considered to present a substantially constant gradient of the difference around a neutral torque point, so as to output detection signals corresponding to the direction and intensity of the input torque. Furthermore, using the characteristics of the straight line L10, the magnetostrictive torque sensor can detect the steering torque on the basis of the values detected via the detecting coils 102d and 102e. Because such a magnetostrictive torque sensor, having reverse magnetostrictive characteristics of small hystereses, is employed in the electric power steering apparatus for detecting torque produced in the steering system of the motor vehicle, the driver can be given an enhanced steering feel with good turning-back of the steering wheel.

The magnetostrictive torque sensor of the present invention is made in accordance with the manufacturing method to be described hereinbelow. Namely, after the magnetostrictive coats 32 and 33 are formed on the steering shaft (rotational shaft) 109b, the coats 32 and 33 are imparted with magnetic anisotropies of predetermined directions by being subjected to a heating process with predetermined twisting torque kept applied to the rotational shaft 109b. In a preferred implementation, the major component of the coats 32 and 33 is an iron-nickel alloy material, and the predetermined twisting torque is in a range not smaller than 50 Nm but not greater than 100 Nm.

FIG. 17 is a flow chart explanatory of the method for manufacturing the magnetostrictive torque sensor in accordance with the present invention. The manufacturing method comprises a magnetostrictive coat formation step (step S11), a high-frequency heating step (step S12), a torque removal step (step S13), and a coil positioning step (step S14).

The magnetostrictive coat formation step (step S11) forms the magnetostrictive coats 32 and 33 on the rotational shaft 109b by electro plating, and the high-frequency heating step (step S12) heats the rotational shaft 109b, having the magnetostrictive coats 32 and 33 formed thereon, with predetermined twisting torque kept applied to the rotational shaft 109b. Specifically, the heating step (step S12) heats the rotational shaft 109b for a predetermined time by passing a high-frequency electrical current through coils provided around the magnetostrictive coats 32 and 33. The torque removal step (step S13) removes the twisting torque from the rotational shaft 109b to impart magnetic anisotropies to the coats 32 and 33, after the rotational shaft 109b is cooled spontaneously. The coil positioning step (step S14) positions a coiled coil around each of the magnetostrictive coats 32 and 33 for detecting variation in magnetostrictive characteristics of the magnetostrictive coat. The following paragraphs details the steps with main focus on the high-frequency heating step that is the most important of the above-mentioned steps.

The rotational shaft 109b is preferably formed of chromium molybdenum steel (JIS-G-4105 represented by a mark "SCM"), and the magnetostrictive coats 32 and 33 are each formed of a Ni—Fe alloy and preferably have a thickness of 30 μm or less. Each of the magnetostrictive coats 32 and 33 formed of the Ni—Fe alloy tends to present a greater magnetostrictive constant and hence an enhanced magnetostrictive effect in cases where the magnetostrictive coat contains about 20 weight percent of Ni and where it contains about 50 weight percent of Ni; thus, it is desirable to use the Ni—Fe alloy having such a Ni content. In the instant embodiment, the Ni—Fe alloy to be used for forming the magnetostrictive coats 32 and 33 contains 50-60 weight percent of Ni with the remaining weight percent being Fe. Note that the magnetostrictive coats 32 and 33 only have to be coats of a ferromagnetic material, such as a permalloy (containing about 78 weight percent of Ni with the remaining weight percent being Fe) or supermalloy (containing about 78 weight percent of Ni and 5 weight percent of Mo (i.e., molybdenum) with the remaining weight percent being Fe).

Figure 18A:
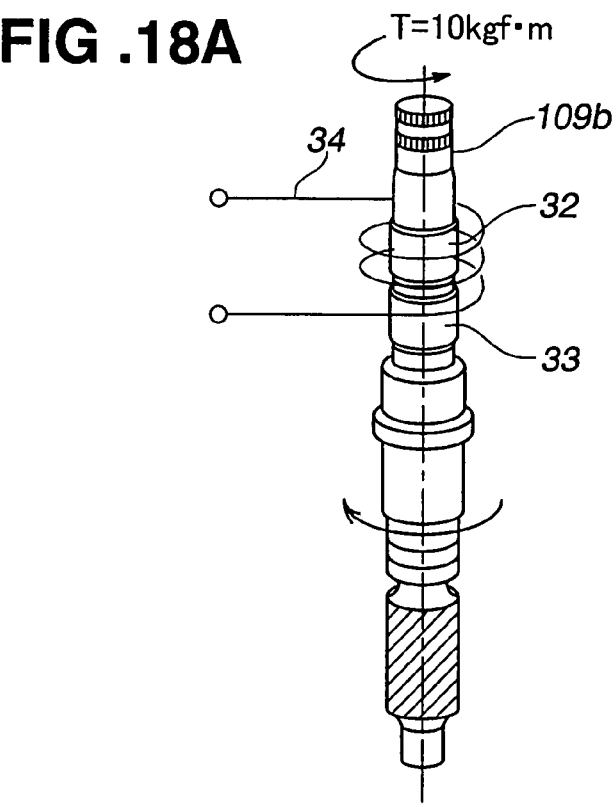
FIGS. 18A and 18B are views explanatory of how the magnetostrictive coats are heated in a heating step.
Figure 18B:
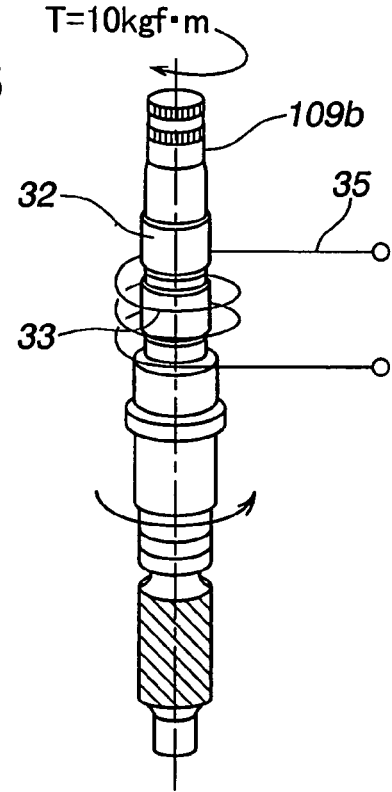

FIG. 18A is a view explanatory of how the magnetostrictive coat 32 is heated in the heating step (step S12), and FIG. 18B is a view explanatory of how the magnetostrictive coat 33 is heated in the heating step (step S12). Prior to the heating step, the rotational shaft 109b is plated with the Ni—Fe alloy material, to thereby form the magnetostrictive coats 32 and 33. Then, in the heating step, the magnetostrictive coats 32 and 33 on the rotational shaft 109b are heated by passing a high-frequency electrical current, in a frequency range of about 500 kHz-2 MHz through coils 34 and 35 for a predetermined time TU, in a 1-10 sec. range, while applying 100 Nm torque to the coats 32 and 33 as indicated by arrows.

Figure 19:
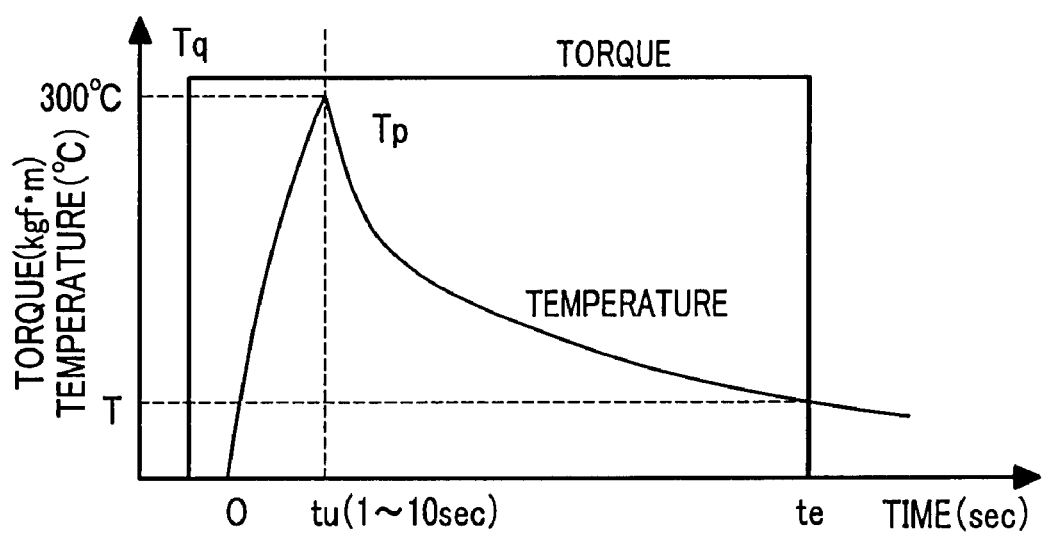
FIG. 19 is a graph showing variation over time in a heating time and torque application time.

FIG. 19 is a graph showing variation over time in the heating time and torque application time, where the horizontal axis represents the time while the vertical axis represents the applied torque and temperature. The twisting torque is applied to the rotational shaft 109b prior to application of the high-frequency electrical current. Then, the high-frequency electrical current is applied to the coils 34 and 35 for the predetermined time TU (1-10 sec.), so that the temperature of the magnetostrictive coats 32 and 33 increases up to a value Tp (300° C.) and then decreases progressively. Once the temperature of the magnetostrictive coats 32 and 33 has decreased to a value T, the application of the twisting torque is terminated.

Figure 20A:
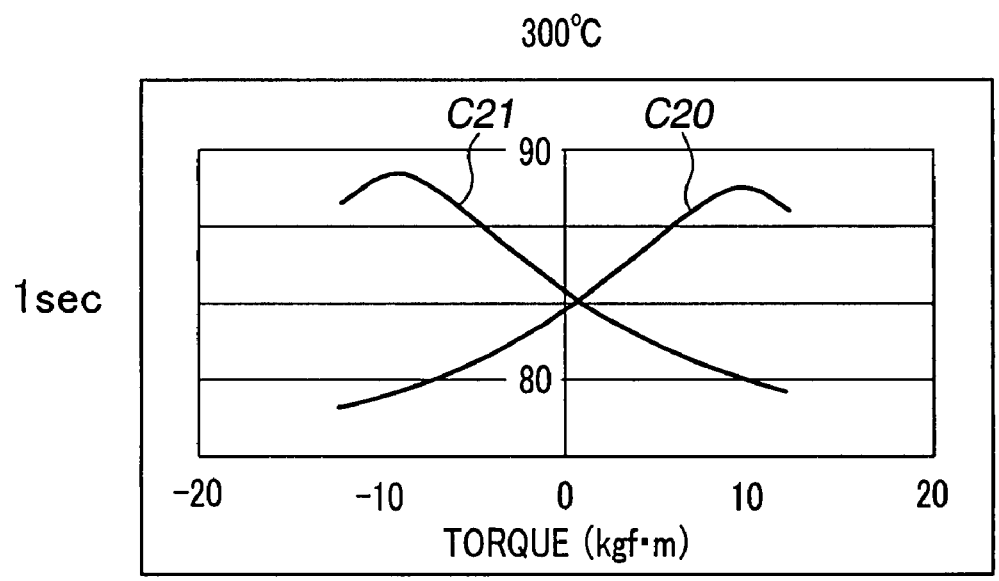
FIGS. 20A-20C are graphs showing variation curves of the reverse magnetostrictive characteristics of the torque sensor after completion of the heating process performed on the magnetostrictive coats.
Figure 20B:
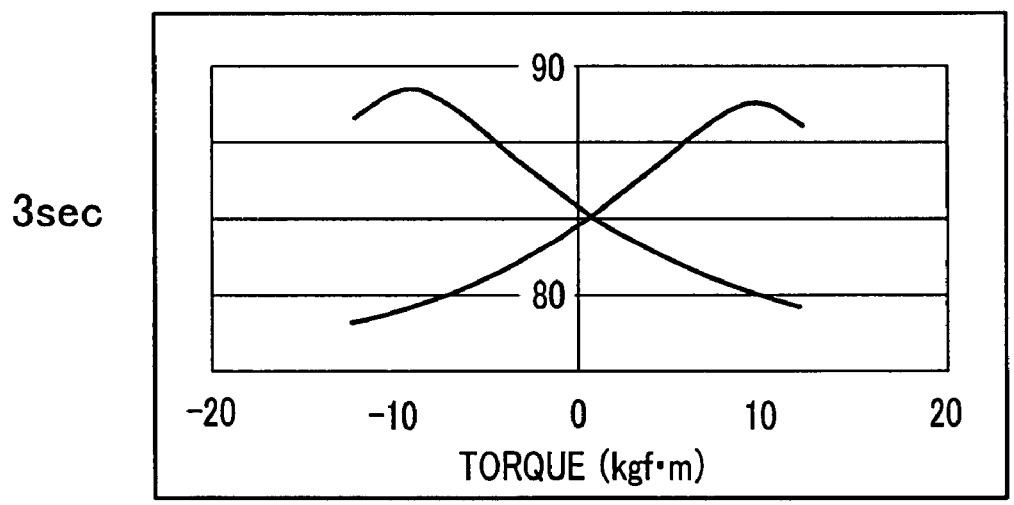
Figure 20C:
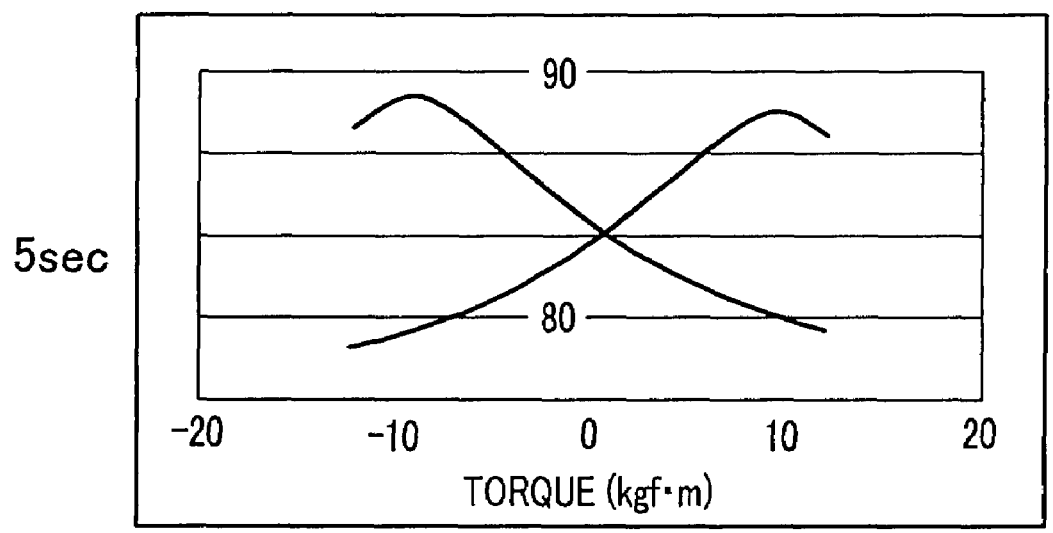

FIGS. 20A-20C are graphs showing variation curves of the reverse magnetostrictive characteristics of the torque sensor after completion of the high-frequency heating process performed on the magnetostrictive coats 32 and 33 in the above-described manner. Specifically, FIG. 20A shows variation curves of the reverse magnetostrictive characteristics after the high-frequency electrical current has been applied for one second, where the horizontal axis represents the applied torque while the vertical axis represents the impedance. Curve C20 represents variation in the output from the detecting coil 102d, and a curve C21 represents variation in the output from the detecting coil 102e. More specifically, the curve C20 shows that the impedance increases as the applied torque increases from a negative value to a positive value, then takes a peak value when the applied torque is about 10 kgf·m and then decreases as the applied torque increases above 10 kgf·m. On the other hand, the curve C21 shows that the impedance takes a peak value when the applied torque is about −10 kgf·m and then decreases as the applied torque increases above −10 kgf·m. Similar curves can be obtained when the applied torque is varied in opposite directions to the above-mentioned, presenting almost no hysteresis. Further, FIG. 20B shows variation curves of the reverse magnetostrictive characteristics after the high-frequency electrical current has been applied for three seconds, which are similar to those shown in FIG. 20A. FIG. 20C shows variation curves of the reverse magnetostrictive characteristics after the high-frequency electrical current has been applied for five seconds, which are also similar to those shown in FIG. 20A. From these graphs, it can be seen that stable magnetostrictive characteristics with a very small hysteresis can be achieved constantly irrespective of whether the exciting time (i.e., application time of the high-frequency electrical current) TU, intended to heat the coats 32 and 33 to the peak temperature Tp of 300° C., is one, three or five seconds.

Figure 21A:
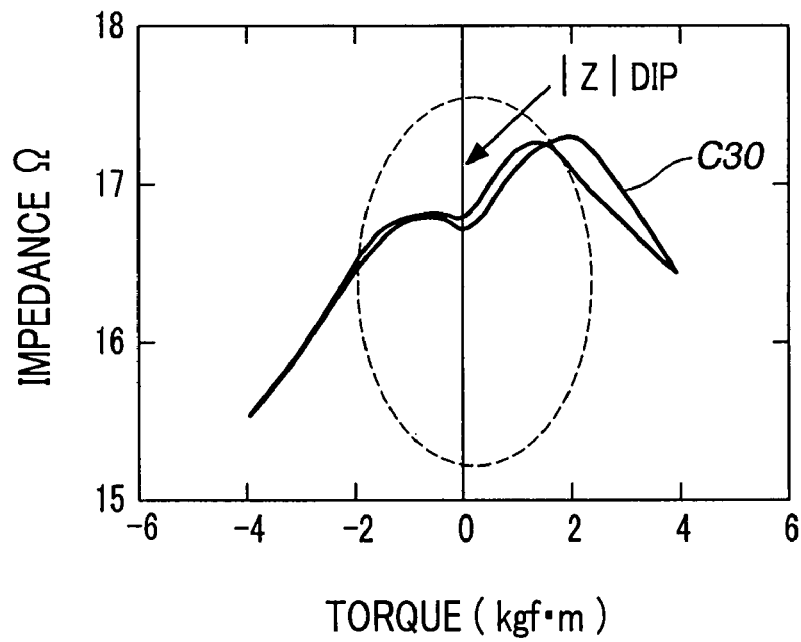
FIGS. 21A and 21B are graphs showing variation curves of the reverse magnetostrictive characteristics of the torque sensor before and after the high-frequency heating process.
Figure 21B:
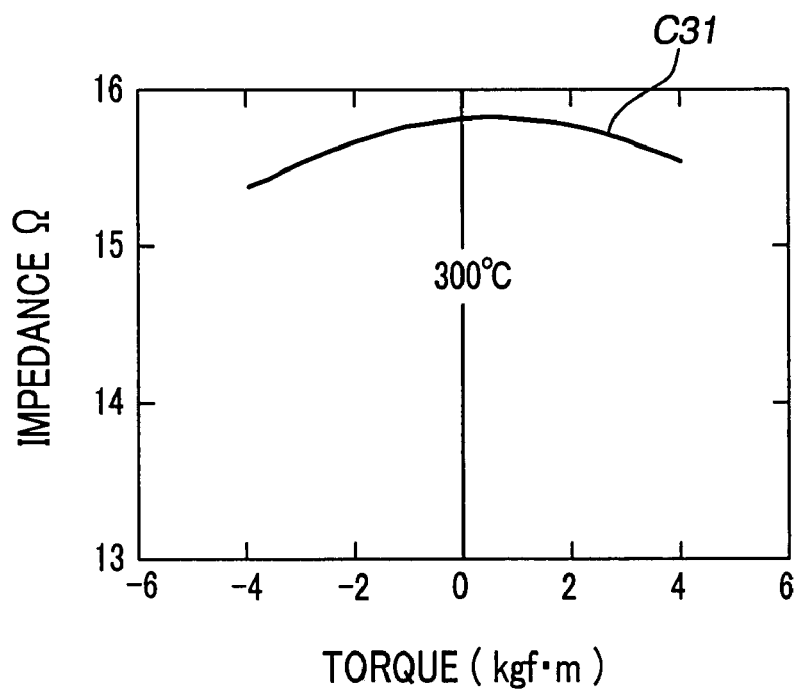

FIGS. 21A and 21B are graphs showing a variation curve of the reverse magnetostrictive characteristics of the torque sensor before and after the high-frequency heating process performed on the magnetostrictive coat. Specifically, FIG. 21A shows a variation curve of the reverse magnetostrictive characteristics before the high-frequency heating process is performed on the magnetostrictive coat. Curve C30 shows reverse magnetostrictive characteristic variation detected by increasing and decreasing the applied torque, which presents a hysteresis and also presents a dip when the applied torque is around zero. FIG. 21B shows a variation curve of the reverse magnetostrictive characteristics after the high-frequency heating process, where a curve C31 shows reverse magnetostrictive characteristic variation detected by first increasing and then decreasing the applied torque. From FIG. 21B, it can be seen that the high-frequency heating process can minimize the hysteresis and eliminate the dip around the zero torque although the impedance is reduced as compared to the one before the heating process. Namely, as seen from FIG. 21B, the high-frequency heating process (electromagnetic induction heating) can significantly reduce the hysteresis in the reverse magnetostrictive characteristics present in the magnetostrictive coat before the heating process, and it can be performed without being influenced by the reverse magneto-strictive characteristics present in the magnetostrictive coat before the heating process.

The following paragraphs discuss the reasons why the heating process performed in the instant embodiment can achieve the reverse magnetostrictive characteristics with a minimized hysteresis.

Figure 22:
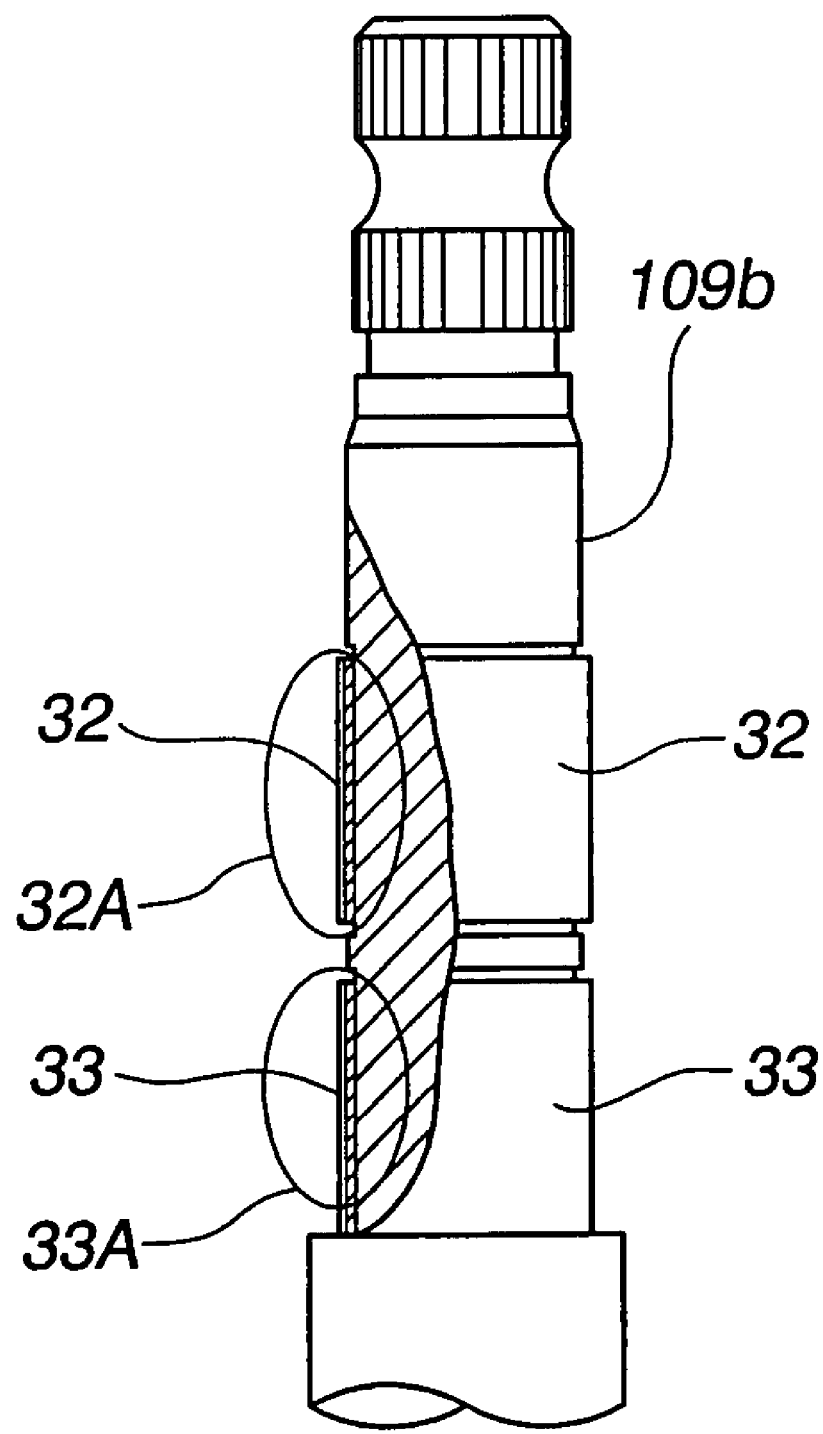
FIG. 22 is a view explanatory of portions of the magnetostrictive coats that are heated in the high-frequency heating process.

FIG. 22 is a view explanatory of portions of the magnetostrictive coats 32 and 33 that are heated in the high-frequency heating process after being formed on the steering shaft 109b by the plating. As the magnetostrictive coats 32 and 33 are heated by the high-frequency heating, eddy currents are induced in the portions subjected to the high frequency, thereby heating the portions. As illustrated in the figure, the portions 32A and 33A of the magnetostrictive coats 32 and 33 are heated with deep portions of the steering shaft 109b being hardly heated, so that great tensile distortion and distortion caused by the twisting torque is simultaneously caused to remain in the steering shaft 109b.

FIGS. 23A-23C, 24A-24C, 25A and 25B, and 26A and 26B are schematic views illustratively showing the heating of the magnetostrictive coats.

Figure 23A:
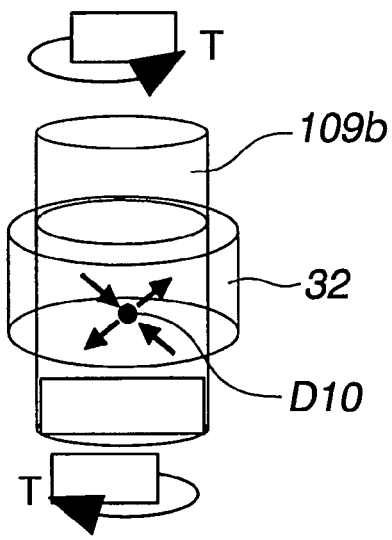
FIGS. 23A-23C are views illustrating deformation caused in a model portion, originally substantially-circular in shape, of one of the magnetostrictive coats when torque is applied to the rotational shaft.
Figure 23B:
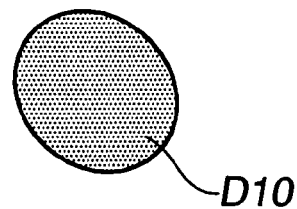
Figure 23C:
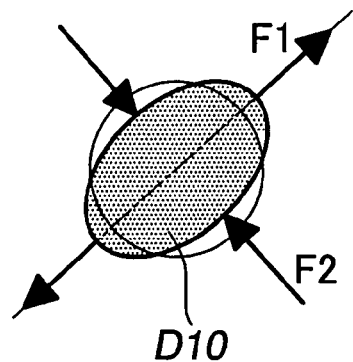

First, let's consider physical changes occurring where the magnetostrictive coats are heated by the conventionally-known heating, with reference to FIGS. 23A-23C, 24A-24C, 25A and 25B, and 26A and 26B. FIGS. 23A-23C illustrate deformation caused in a minute portion (model portion) D10, originally substantially-circular in shape, of each one of the magnetostrictive coats (only the magnetostrictive coat 32 is shown and discussed here for simplicity) when twisting torque T is applied to the rotational shaft 109b having the coat 32 formed thereon, of which FIGS. 23B and 23C illustrate the minute portion D10 in enlarged scale. Note that the "minute portion" is a model portion of the magnetostrictive coat assumptively extracted for the purpose of showing typical physical changes occurring in the magnetostrictive coat. When the rotational shaft 109b is twisted by application of twisting torque, e.g. 100 Nm twisting torque, the minute portion D10 of the magnetostrictive coat 32 is deformed from the substantially-circular shape, as illustrated in FIG. 23B, into an oval shape with its longitudinal axis extending upward and rightward (i.e., in the lower-left-to-upper-right direction) by being simultaneously subjected to a tensile load F1 and compressing load F2.

Figure 24A:
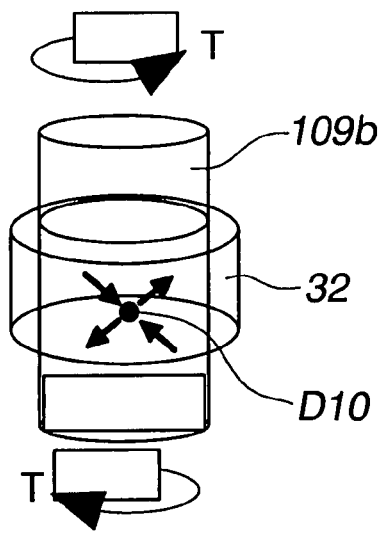
FIGS. 24A-24C are views illustrating deformation of the model portion caused by a conventional heating process.
Figure 24B:
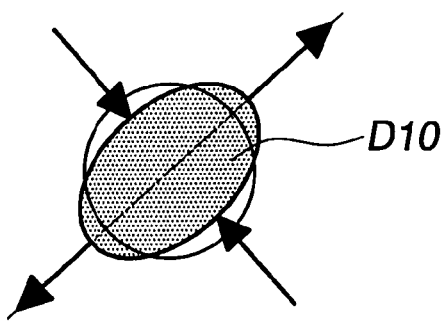
Figure 24C:
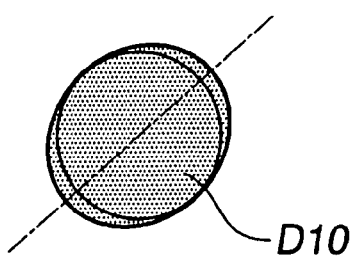
Figure 25A:
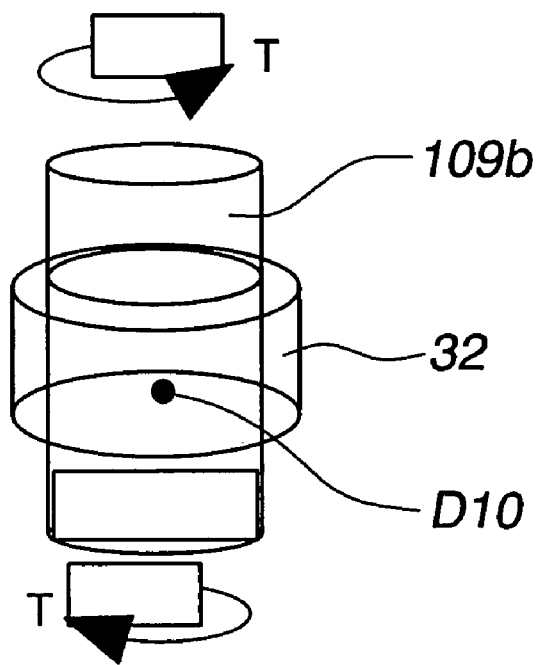
FIGS. 25A and 25B are views showing deformation of the model portion caused by the conventional heating process.
Figure 25B:
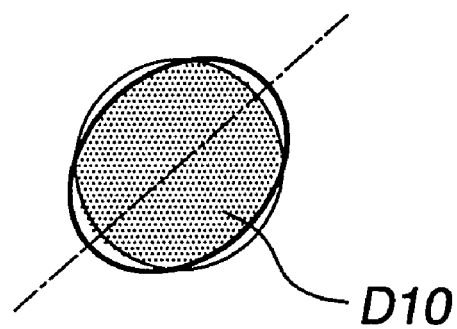
Figure 26A:
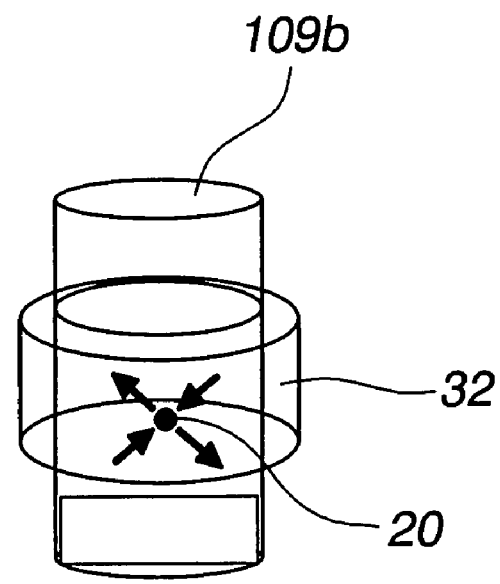
FIGS. 26A and 26B are views showing deformation of the model portion caused by the conventional heating process.
Figure 26B:
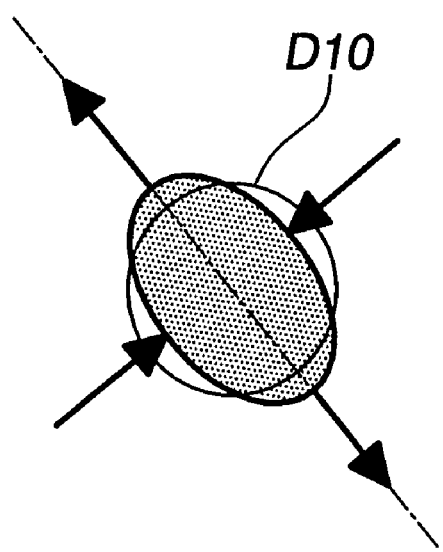

Then, the rotational shaft 109b, i.e. the entire magnetostrictive coat 32, is heated at 300° C. for one hour in a thermostatic bath. FIGS. 24A-24C illustrate deformation of the minute portion D10 caused by the heating in the thermostatic bath. By the heating in the thermostatic bath, the rotational shaft 109b and the entire magnetostrictive coat 32, deformed into the oval shape, expand as shown in FIG. 24B. Then, as the heating at 300° C. progresses, the deformation of the magnetostrictive coat 32 is almost eliminated as shown in FIG. 24C. FIGS. 25A and 25B are views showing deformation of the minute portion D10 when the rotational shaft 109b with the magnetostrictive coat 32 has been restored to the room temperature. Upon cooling down to the room temperature, the thermally-expanded rotational shaft 109b contracts together with the magnetostrictive coat 32, and the minute portion D10 assumes a state as illustrated in FIG. 25B. FIGS. 26A and 26B are views showing deformation of the minute portion D10 when the twisting torque T has been removed from the rotational shaft 109b. Namely, when the twisting torque T has been removed, the minute portion D10 assumes an oval shape with its longitudinal axis extending in an opposite direction to the above-mentioned oval shape, i.e. in the lower-right-to-upper-left direction. Namely, even after the rotational shaft 109b has been cooled down to the room temperature (FIG. 26A) and released from the twisting torque T (FIG. 26B), the minute portion D10 still remains deformed in an oval shape inclined in the opposite direction to the previous oval shape but having generally the same size (area) as the previous oval shape.

Next, let's consider physical changes occurring where the magnetostrictive coats are heated by the heating technique of the present invention. The twisting torque T is applied to the shaft 109b in the same manner as the conventional technique, and the minute portion D10 is also deformed by the application of the twisting torque T as illustrated in FIG. 23C. Namely, when the rotational shaft 109b is twisted by application of the twisting torque, e.g. 100 Nm twisting torque, the minute portion D10 of each of the magnetostrictive coats (only the magnetostrictive coat 32 is shown and discussed here for simplicity) is deformed from the substantially-circular shape of FIG. 23B into an oval shape with its longitudinal axis extending upward and rightward (i.e., in the lower-left-to-upper-right direction) by being simultaneously subjected to a tensile load F1 and compressing load F2.

Figure 27A:
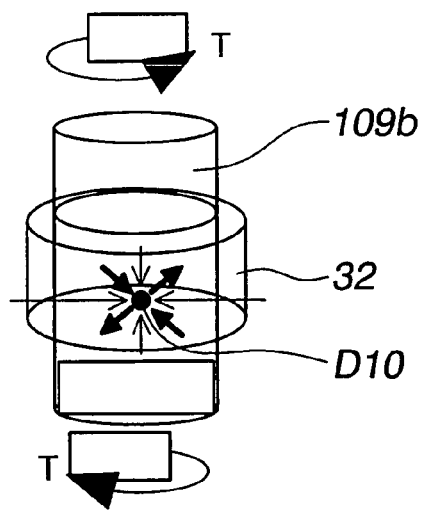
FIGS. 27A-27C are views illustrating how the model portion is deformed by a heating process of the present invention.
Figure 27B:
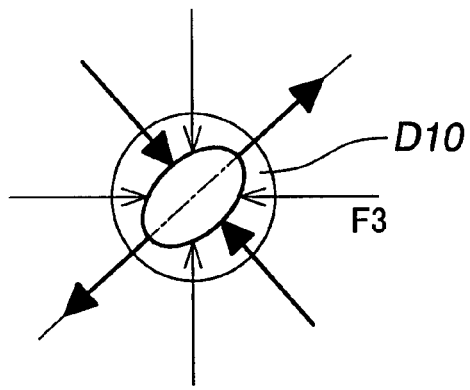
Figure 27C:
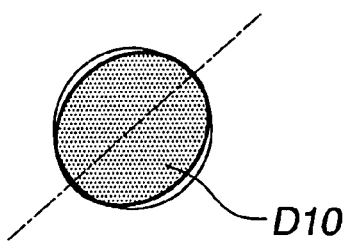
Figure 28A:
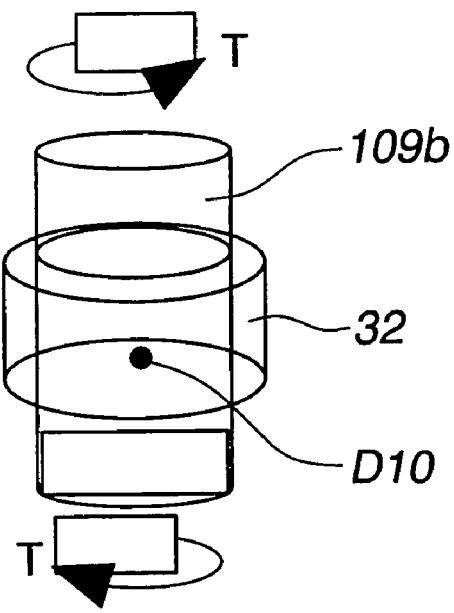
FIGS. 28A and 28B are views showing deformation of the model portion caused by the heating process of the present invention.
Figure 28B:
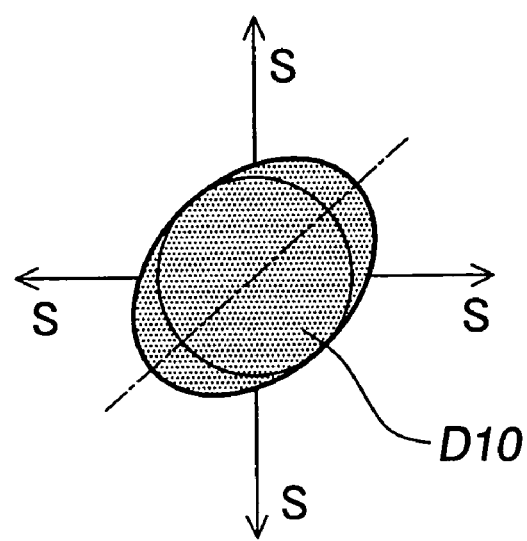

Next, the rotational shaft 109b, i.e. the entire magnetostrictive coat 32, is subjected to high-frequency heating (electromagnetic induction heating) via the coil 34 of FIG. 18A. FIGS. 27A-27C illustrate how the minute portion D10 is deformed by the electromagnetic induction heating. Whereas only the magnetostrictive coat 32 is heated instantaneously within several seconds, the rotational shaft 109b itself is not heated by the electromagnetic induction heating, and thus the magnetostrictive coat 32 can not expand in this case. Consequently, compressing stress F3 is applied to the entire minute portion D10 as shown in FIG. 27B, since the rotational shaft 109b itself does not expand due to the electromagnetic induction heating. Further, as the electromagnetic induction heating at 300° C. progresses, creep is caused in the magnetostrictive coat 32, so that the deformation of the magnetostrictive coat 32 is almost eliminated as shown in FIG. 27C. FIGS. 28A and 28B are views showing deformation of the minute portion D10 when the rotational shaft 109b with the magnetostrictive coat 32 has been restored to the room temperature. Upon cooling down to the room temperature, the magnetostrictive coat 32, from which the deformation has been removed by virtue of the heating, forms a bonding surface with the rotational shaft 109b. Although the cooling applies a contracting force to the magnetostrictive coat 32, the bonding surface allows tensile distortion S to remain in the entire coat 32, as representatively indicated by the minute portion D10 in FIG. 28B.

Figure 29A:
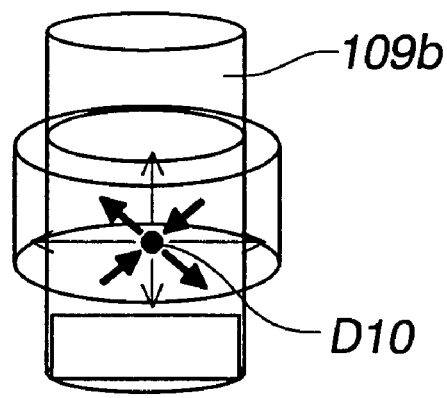
FIGS. 29A and 29B are views showing deformation of the model portion caused by the heating process of the present invention.
Figure 29B:
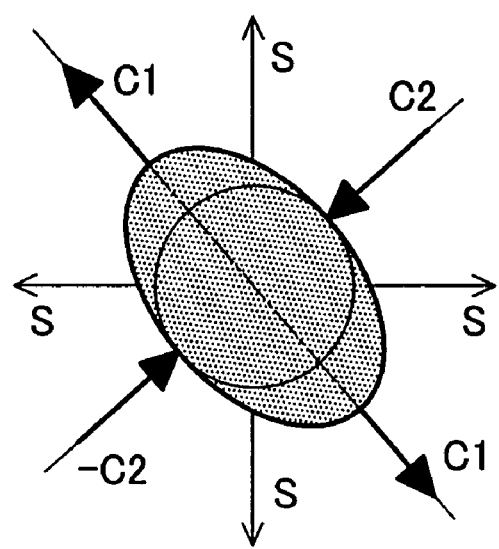

FIGS. 29A and 29B are views showing deformation of the minute portion D10 when the twisting torque T has been removed from the shaft 109b. Namely, upon removal of the twisting torque T as illustrated in FIG. 29A, the minute portion D10 assumes an oval shape inclined in the opposite direction to the previous oval shape, i.e. in the lower-right-to-upper-left direction, with the tensile distortion S and twisting distortion C1 and C2 still remaining in the minute portion D10 as illustrated in FIG. 29B.

Therefore, the instant embodiment of the present invention can simultaneously impart both the tensile distortion and the twisting distortion to the magnetostrictive coat 32, whereas the conventional technique can impart only the twisting distortion to the magnetostrictive coat.

In the instant embodiment where the tensile distortion acts in all directions when the magnetostrictive coat is excited via the exciting coil 102f in the axial direction of the rotational shaft 109b, the tensile distortion can be detected. Further, it is possible to detect only the tensile distortion as regards the axial direction of the rotational shaft 109b, and only the compressing distortion as regards a direction orthogonal to the axial direction. Such characteristics allow the minute portion D10 of the magnetostrictive coat to assume a state generally similar to the one illustrated in FIG. 28B, when the twisting torque has reached, for example, the value T1 or −T1 of FIG. 16. At that time, the conventional technique does not detect distortion because almost no distortion is produced as illustrated in FIG. 25B. Thus, the conventional technique tends to detect only initial distortion etc. of the magnetostrictive coat as illustrated in FIG. 45, resulting in instable detection. By contrast, the instant embodiment of the present invention, by which tensile distortion greater than the initial distortion of the magnetostrictive coat is allowed to remain in the coat, is capable of detecting the residual distortion and can achieve stable detection.

Further, when the twisting torque has first increased and then decreased, the conventional technique would cause an increased hysteresis because there occurs regions where no distortion is detected, whereas the technique of the present invention can achieve good reverse magnetostrictive characteristics with little hysteresis because the tensile distortion always remains in the magnetostrictive coat.

Furthermore, if the magnetostrictive torque sensor of the invention, capable of achieving a reduced hysteresis, is applied to an electric power steering apparatus, the torque sensor can directly detect steering torque applied to the steering wheel by a human driver; particularly, the magnetostrictive torque sensor of the invention can detect, with a minimized hysteresis, torque on the steering shaft when the driver has reduced the steering torque. As a result, the steering assisting motor is allowed to faithfully respond to driver's operation of the steering wheel, so that the steering wheel can be turned back with significantly-increased efficiency and reliability.

As may be clear from the foregoing description, the second embodiment of the invention can afford the following benefits.

Namely, the second embodiment is characterized by comprising: the magnetostrictive coat formation step of forming magnetostrictive coats 32 and 33 on the rotational shaft 109; the high-frequency heating step of performing high-frequency heating of the rotational shaft 109b for a predetermined time with predetermined twisting torque kept applied to the shaft 109b; the torque removal step of removing the twisting torque from the rotational shaft to thereby impart magnetic anisotropies to the coats 32 and 33; and the coil positioning step of positioning a coiled coil around each of the magnetostrictive coats 32 and 33 for detecting variation in magnetostrictive characteristics of the magnetostrictive coat. Particularly, by subjecting the magnetostrictive coats 32 and 33, formed on the rotational shaft 109, to high-frequency heating (electromagnetic induction heating) with the predetermined twisting torque kept applied to the shaft 109b, the second embodiment can simultaneously impart both tensile distortion and twisting distortion to the magnetostrictive coats 32 and 33 to thereby reduce a hysteresis of detected values. In addition, the reverse magnetostrictive characteristics of the magnetostrictive coats 32 and 33, having undergone the high-frequency heating, can remain stable, because they are not influenced by the reverse magnetostrictive characteristics that were present in the coats before the heating process.

Further, the second embodiment is characterized in that the magnetostrictive coats 32 and 33, each mainly comprising a nickel-iron (Ni—Fe) alloy, are integrally provided on the rotational shaft 109b and the magnetostrictive coats 32 and 33 are heated by electromagnetic induction heating for ten seconds or less with twisting torque, set to a value in the range not smaller than 50 Nm but not greater than 100 Nm, kept applied to the rotational shaft 109b. With such arrangements, the second embodiment can simultaneously impart the magnetostrictive coats 32 and 33 of the rotational shaft 109b with both greater residual tensile distortion and twisting distortion within a short time and in a stable manner, with the result that it can significantly enhance the productivity as compared to the conventional technique where the magnetostrictive coats of the rotational shaft are heated in a thermostatic bath for several hours.

Furthermore, according to the second embodiment, the magnetostrictive torque sensor, which includes the magnetostrictive coats 32 and 33 provided on the rotational shaft 109b and imparted with magnetic anisotropies by subjecting the coats 32 and 33 to high-frequency heating with twisting torque kept applied to the rotational shaft 109b and then removing the twisting torque after the heating, is applied, as a steering torque sensor, to the electric power steering apparatus of the type which includes the steering assisting motor and control device for controlling the operation of the steering assisting motor on the basis of at least a steering torque signal output from the steering torque sensor. Thus, the electric power steering apparatus can give a good steering feel with improved steering-wheel turning-back operation.

Figure 30:
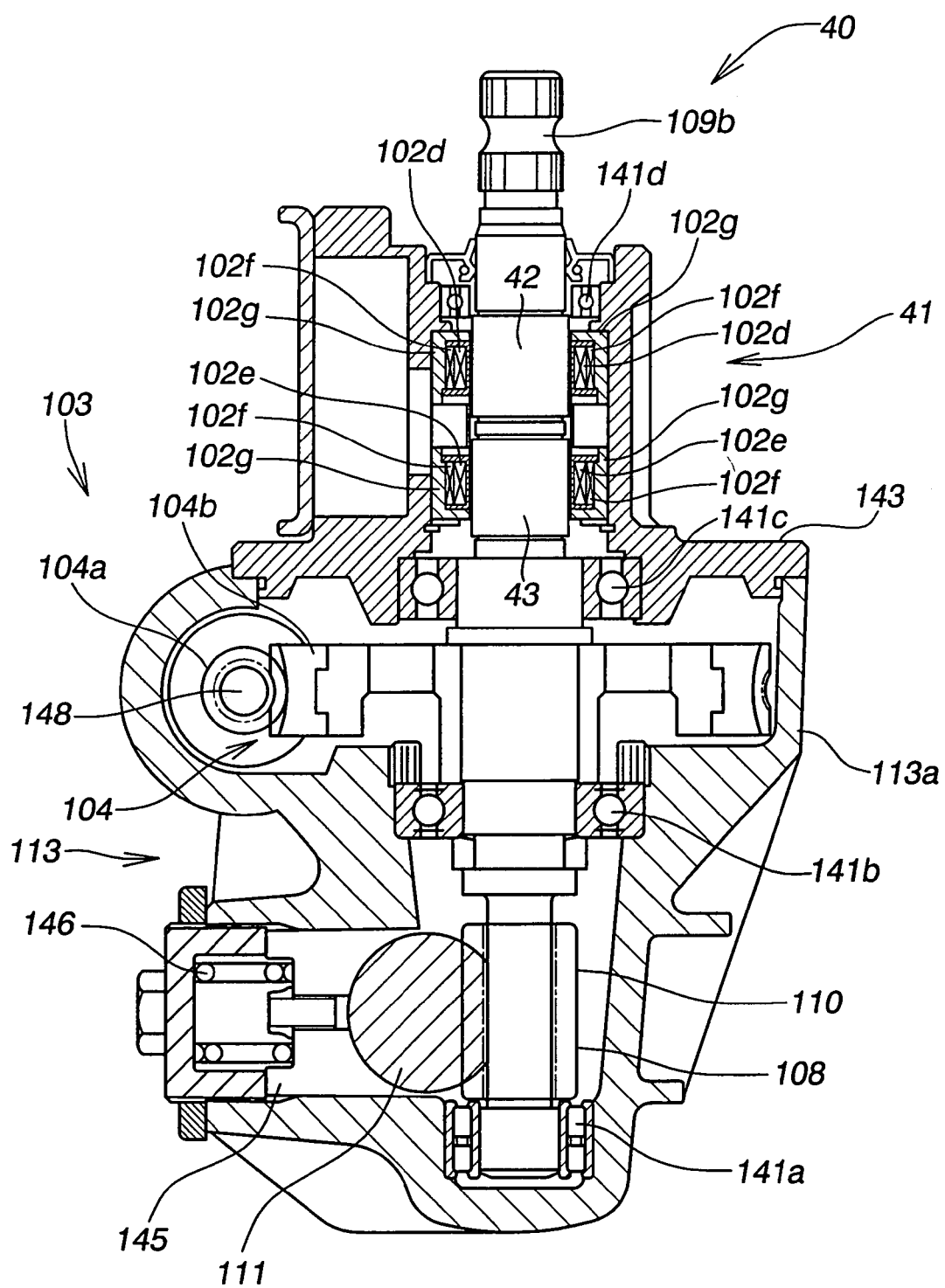
FIG. 30 is a sectional view showing part of a magnetostrictive torque sensor manufactured by a method of the present invention and an electric power steering apparatus equipped with the magnetostrictive torque sensor.

FIG. 30 is a view, similar to FIG. 40, which shows the magnetostrictive torque sensor manufactured by a third embodiment of the manufacturing method of the present invention and the electric power steering apparatus equipped with the magnetostrictive torque sensor. The electric power steering apparatus 40 shown in FIG. 30 is generally similar to the electric power steering apparatus 100 of FIG. 40 except for the manufacturing method of the magnetostrictive torque sensor 41, and thus the same components as those in FIG. 40 are represented by the same reference characters and will not be described here to avoid unnecessary duplication.

The steering torque detector section 41 employed in the electric power steering apparatus 40 includes the magnetostrictive torque sensor having magnetostrictive coats which are provided on upper and lower portions (42 and 43) of the outer circumferential surface of the steering shaft (rotational shaft) 109b by plating the upper end lower portions, for example, with a nickel-iron (Ni—Fe) alloy. Thus, the magnetostrictive coats 42 and 43 are spaced apart from each other at a predetermined axial interval so as to have opposite magnetic anisotropies. The steering torque detector section 41 detects reverse magnetostrictive characteristics produced when steering torque acts on the magnetostrictive coats 42 and 43, using, for example, A.C. resistances of the coils 102d and 102e disposed around the respective magnetostrictive coats 42 and 43. To detect steering torque, the steering torque detector section 41 is positioned on a portion of the steering shaft 109b within the engine room and thus is subjected to a high-temperature atmosphere while the engine is in operation.

In the electric power steering apparatus 40, the control device 106 drives the steering assisting motor 103 in accordance with the PWM (Pulse Width Modulation) scheme, using a steering torque signal T output from the steering torque detector section 41 and a vehicle velocity signal V output from the vehicle velocity detection section 105, so as to reduce manual steering force to be applied by the human driver. As the steering torque signal T from the steering torque detector section 41 varies, the behavior of the steering assisting motor 103, driven on the basis of the steering torque signal T, also varies, which would have an adverse influence on the steering feel.

With the steering torque detector section 102 of FIG. 40 employing the conventional magnetostrictive torque sensor, the magnetostrictive coats provided on the steering shaft 109b by plating would cause undesired creep due to exposure to the high-temperature atmosphere within the engine room, thereby causing unwanted fluctuation in the steering torque signal T. To avoid such unwanted fluctuation in the steering torque signal T, the magnetostrictive torque sensor of the steering torque detector section 40 employed in the electric power steering apparatus 40 of the invention is made using the following method.

Figure 31:
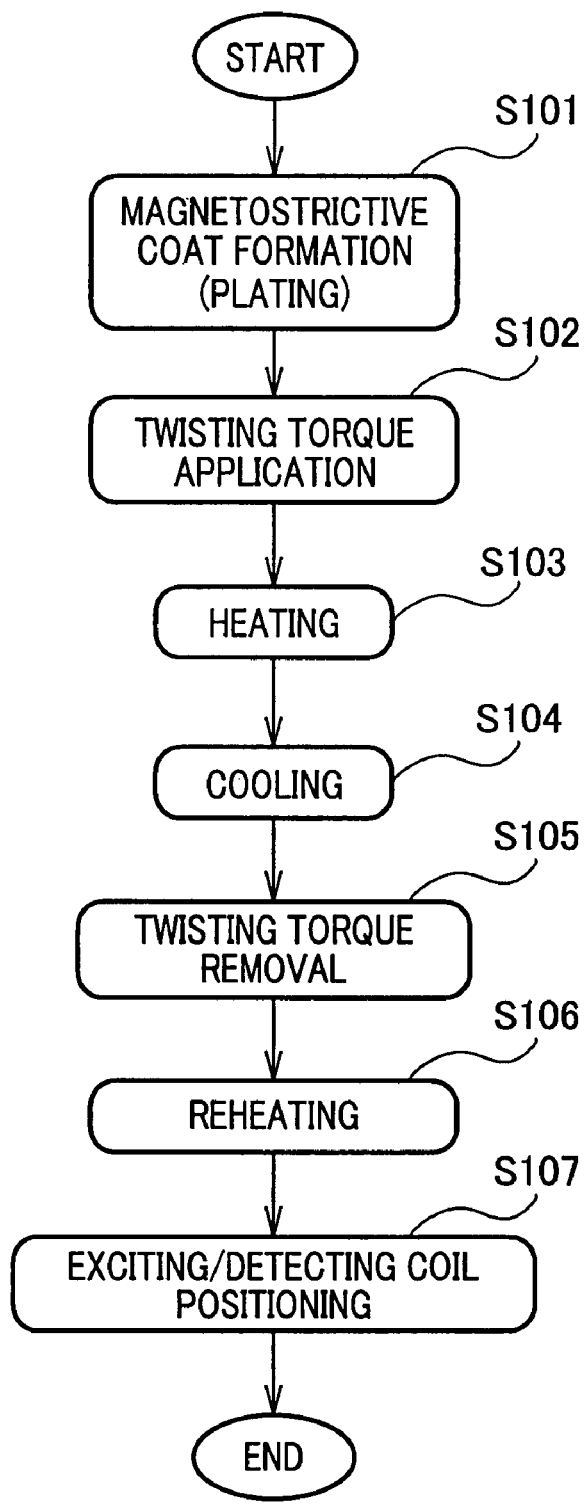
FIG. 31 is a flow chart showing an example step sequence of the magnetostrictive torque sensor manufacturing method.

The method for manufacturing the magnetostrictive torque sensor of the steering torque detector section 41 will be described below, with reference to FIGS. 31 and 32A-32F. Specifically, FIG. 31 is a flow chart showing an example step sequence of the magnetostrictive torque sensor manufacturing method, and 32A-32F are views explanatory of how the steering torque detector section 41 is made. Here, the manufacturing method will be described only in relation to one of the magnetostrictive coats 42 for simplicity, because generally the same description applies to the two magnetostrictive coats 42 and 43.

Figure 32A:
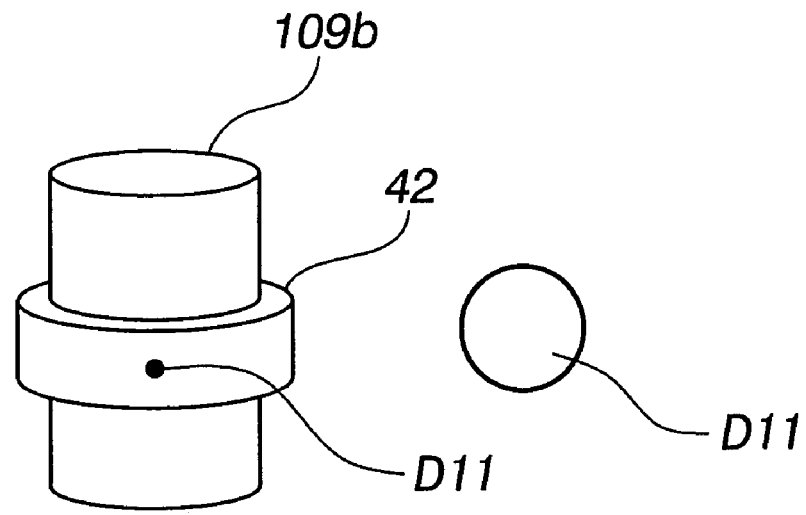
FIGS. 32A-32F are views explanatory of how the steering torque detector section is made.

At step S101 of FIG. 31, the steering shaft 109b is plated with the magnetostrictive material, such as a Ni—Fe alloy, to form the magnetostrictive coat 42 having a predetermined thickness, e.g. 30 μm (see FIG. 32A). After the plating, twisting torque Tq is applied, in step S102, to the steering shaft 109b (e.g., counterclockwise twisting torque Tq is applied to an upper portion of the steering shaft 109b while clockwise twisting torque Tq is applied to an upper portion of the steering shaft 109b), to thereby impart stress to the outer circumferential surface of the steering shaft 109b. The twisting torque Tq applied in the inventive manufacturing method is greater than the one applied in the conventional manufacturing method; for example, the twisting torque Tq applied in the inventive manufacturing method is 75 Nm, while the twisting torque Tq applied in the conventional manufacturing method is 70 Nm. With the twisting torque Tq kept applied to the steering shaft 109b, a high-frequency electric current is passed through an electric coil disposed around the magnetostrictive coat 42 to thereby heat the coat 42, in step S103 (see FIG. 32C). After completion of the high-frequency heating, the magnetostrictive coat 42 is cooled down spontaneously in step S104 (see FIG. 32D), and then the twisting torque Tq is removed from the shaft 109b in step S105 (see FIG. 32E). At this stage, preload torque (i.e., twisting torque remaining in the steering shaft 109b) is in the order of −60 Nm. After removal of the twisting torque Tq, the magnetostrictive coat 42 is again subjected to heating in step S106 (see FIG. 32F). Specifically, in the reheating step S106, the magnetostrictive coat 42 is heated for a time period, ranging from one hour to three hours, at a temperature, e.g. 180° C., higher than a temperature at which the steering torque detector section 41 is actually used (hereinafter called "normal use temperature"). At this stage, the preload torque is in the order of −55 Nm. After completion of the reheating, the exciting and detecting coils are placed at positions corresponding to the magnetostrictive coat 42, in step S107.

Figure 32B:
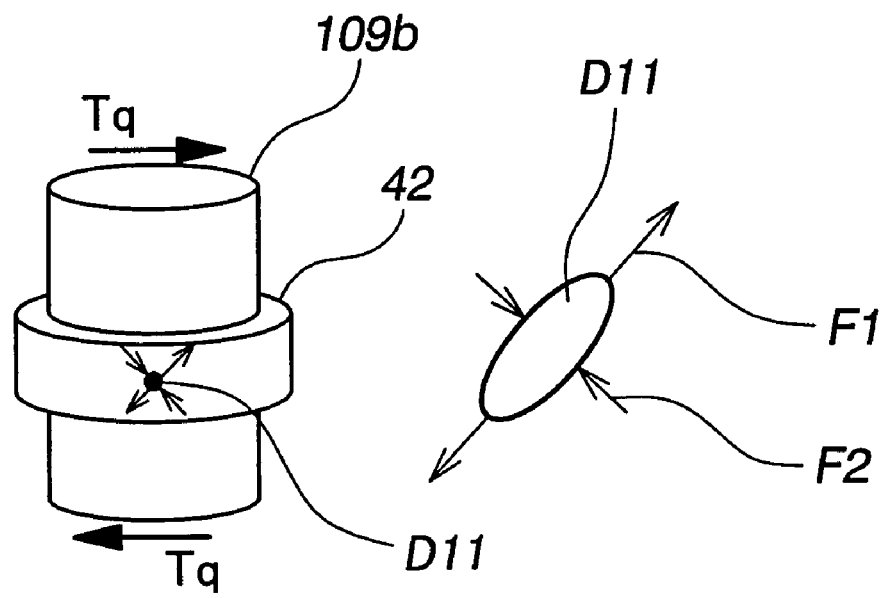
Figure 32C:
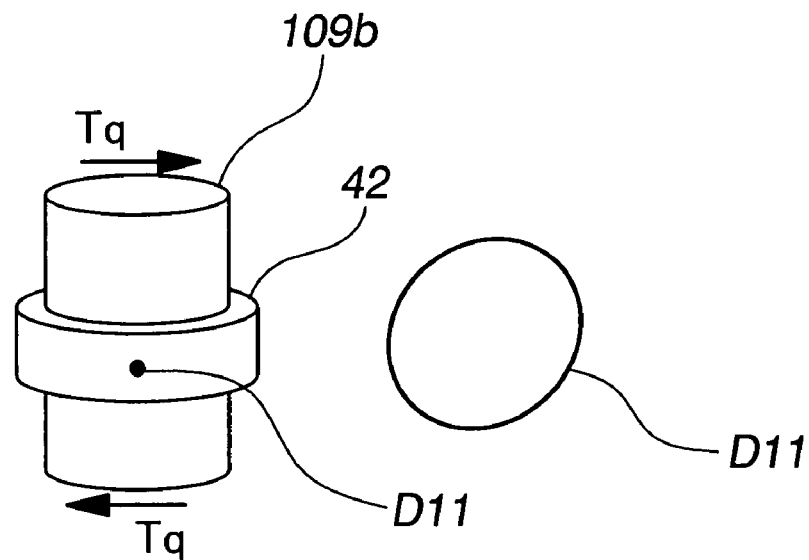
Figure 32D:
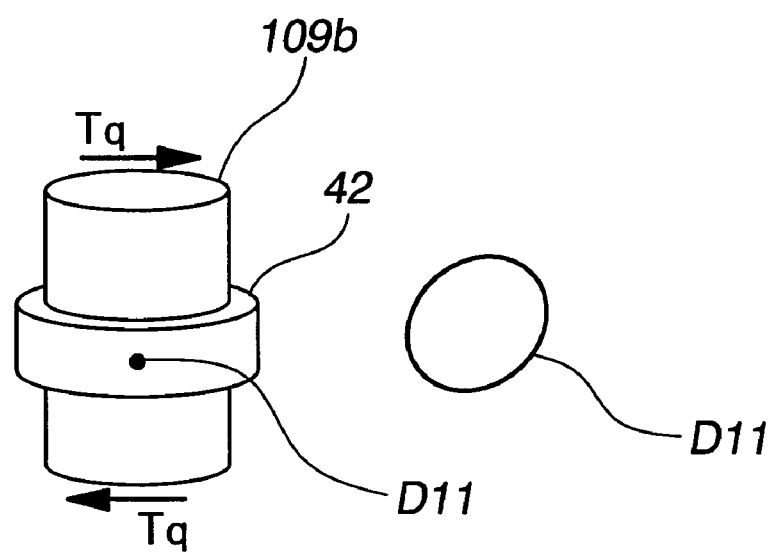
Figure 32E:
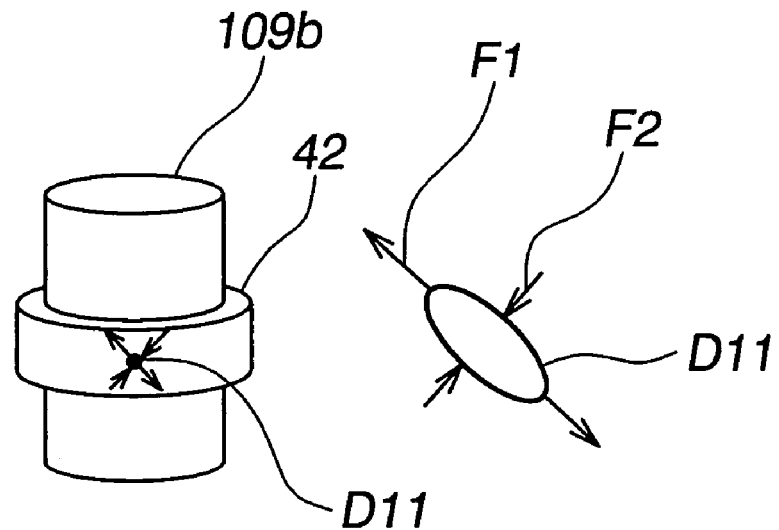
Figure 32F:
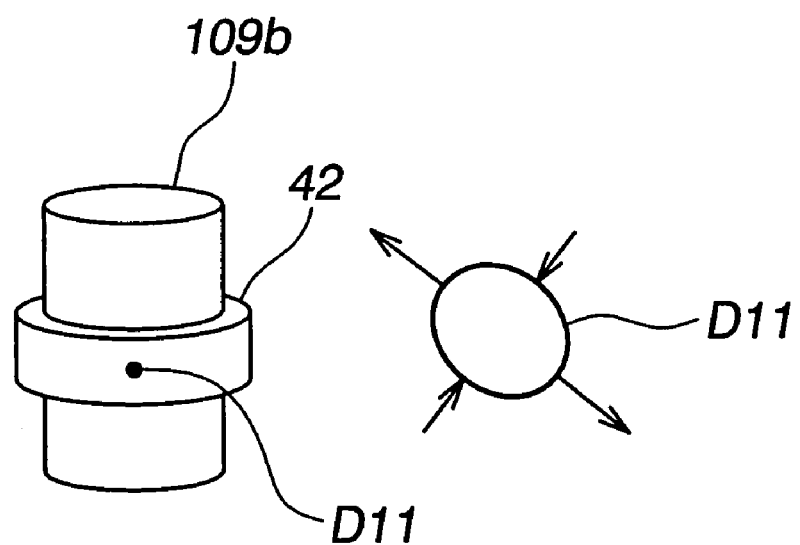
Figure 43A:
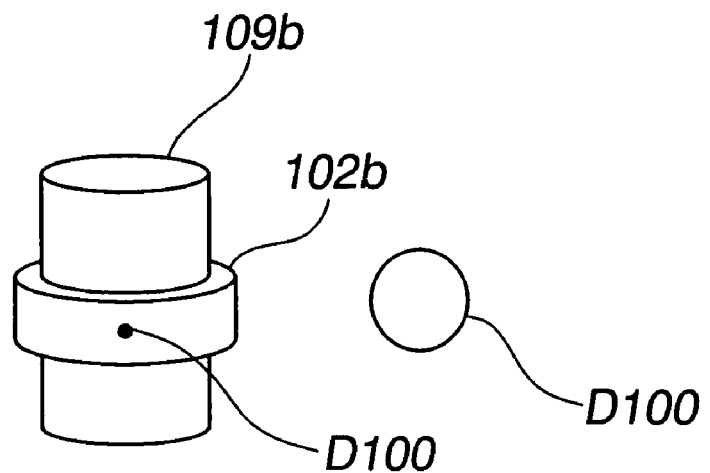
FIGS. 43A-43E are view explanatory of a method for manufacturing a conventional magnetostrictive torque sensor.
Figure 43B:
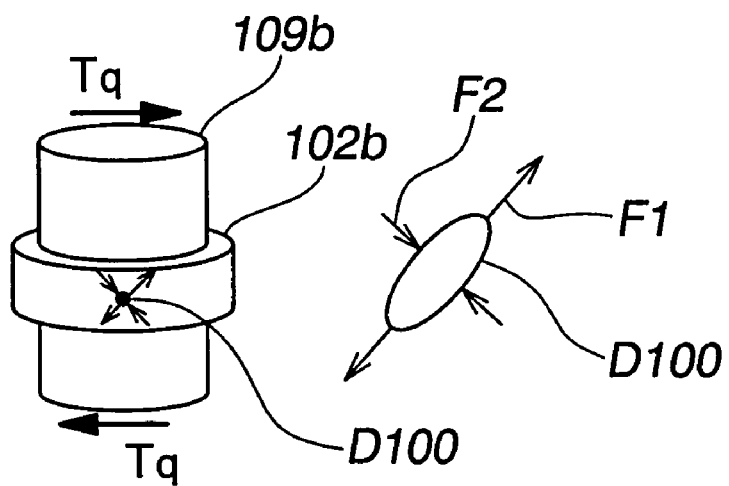
Figure 43C:
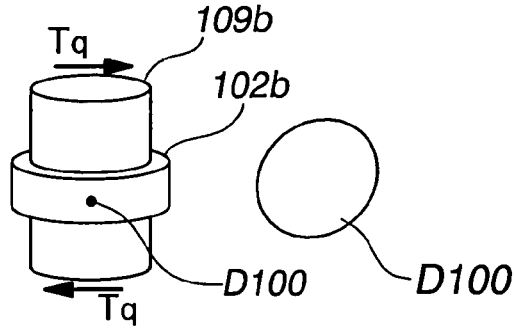
Figure 43D:
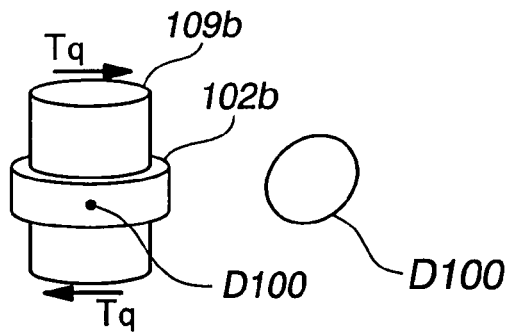
Figure 43E:
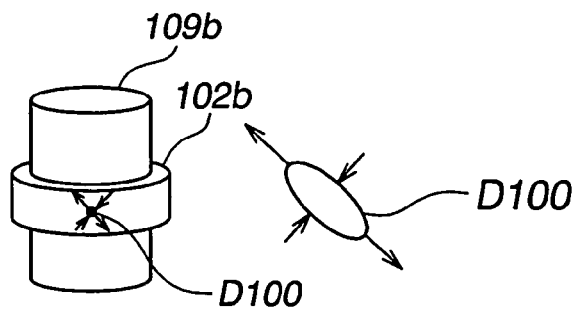
Figure 44:
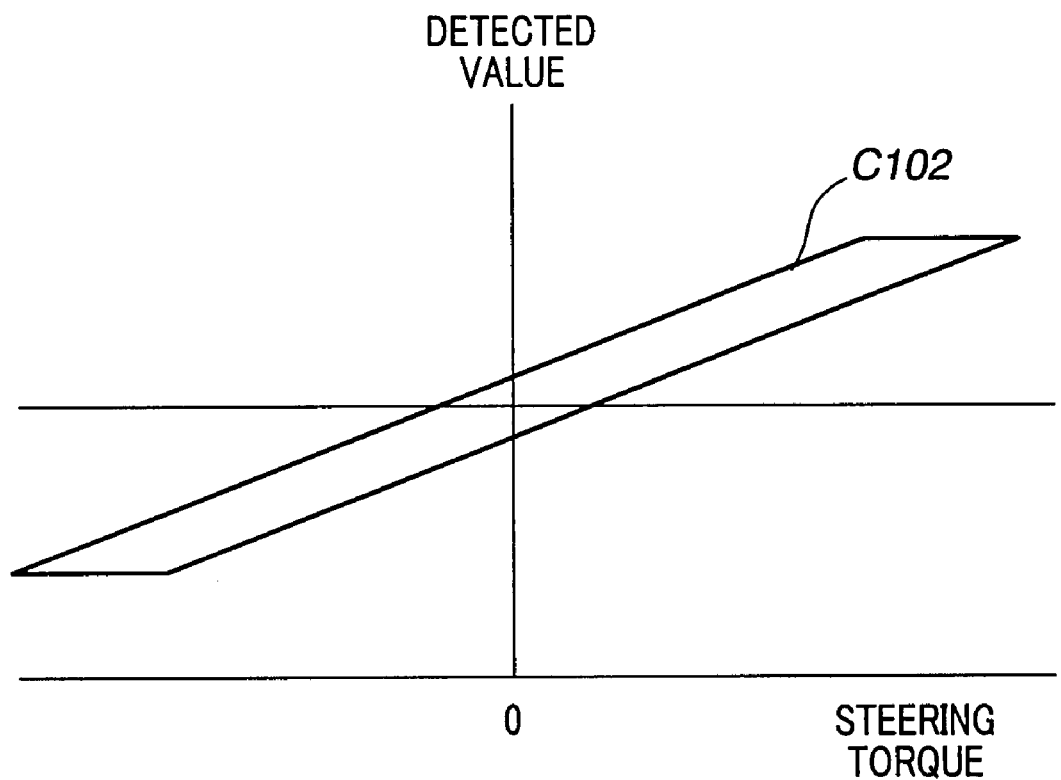
FIG. 44 is a graph showing an example of actual reverse magnetostrictive characteristics of the conventional magnetostrictive torque sensor.
Figure 45A:
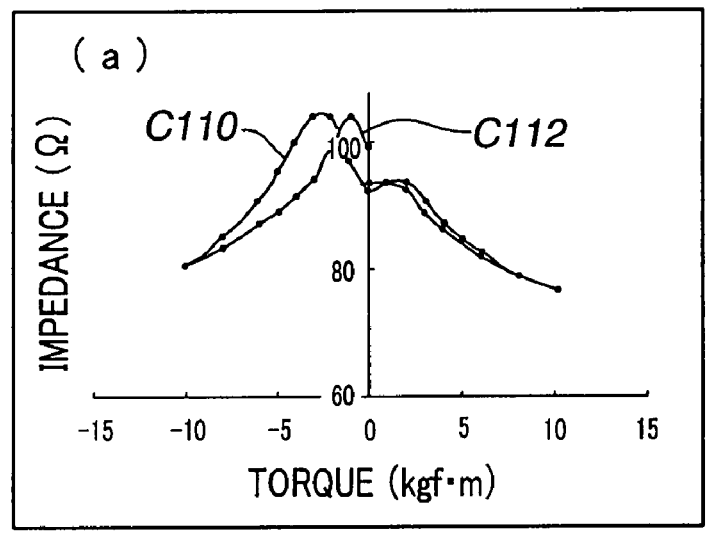
FIGS. 45A-45D are graphs illustrating measurements of the reverse magnetostrictive characteristics before and after a heating process performed in accordance with the conventional manufacturing method.
Figure 45B:
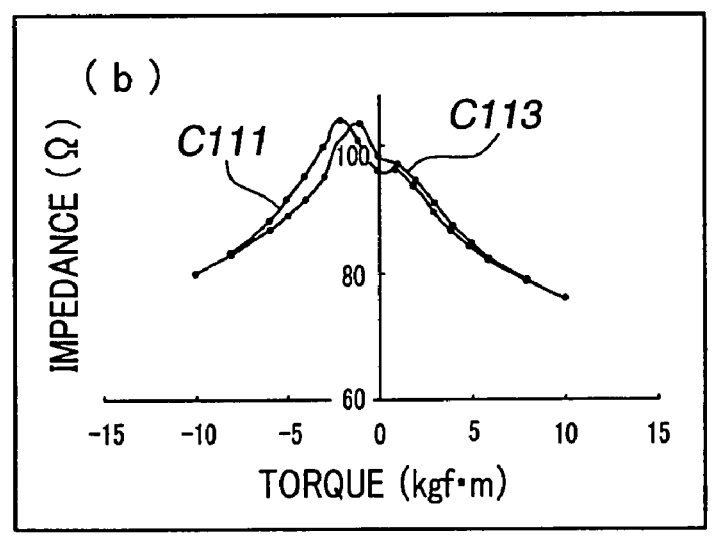
Figure 45C:
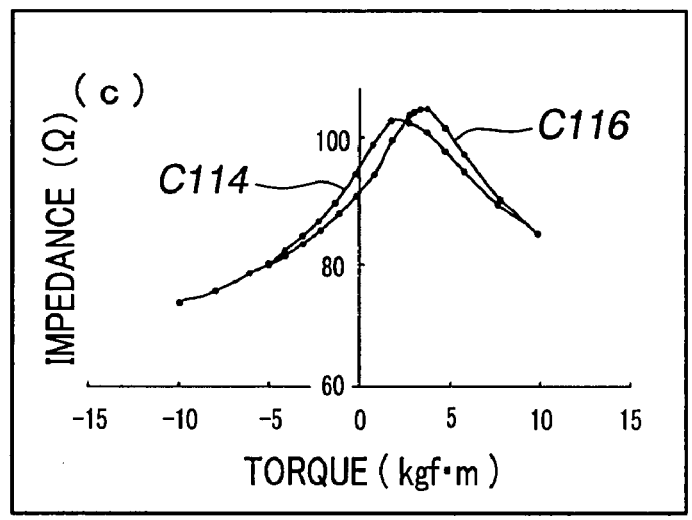
Figure 45D:
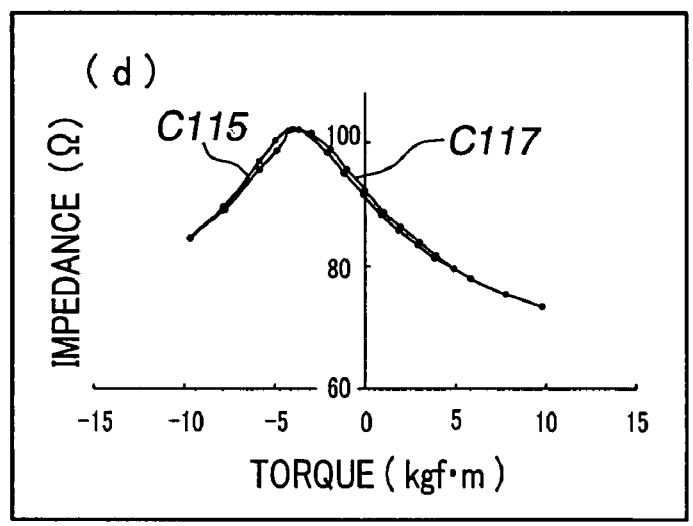
Figure 46:
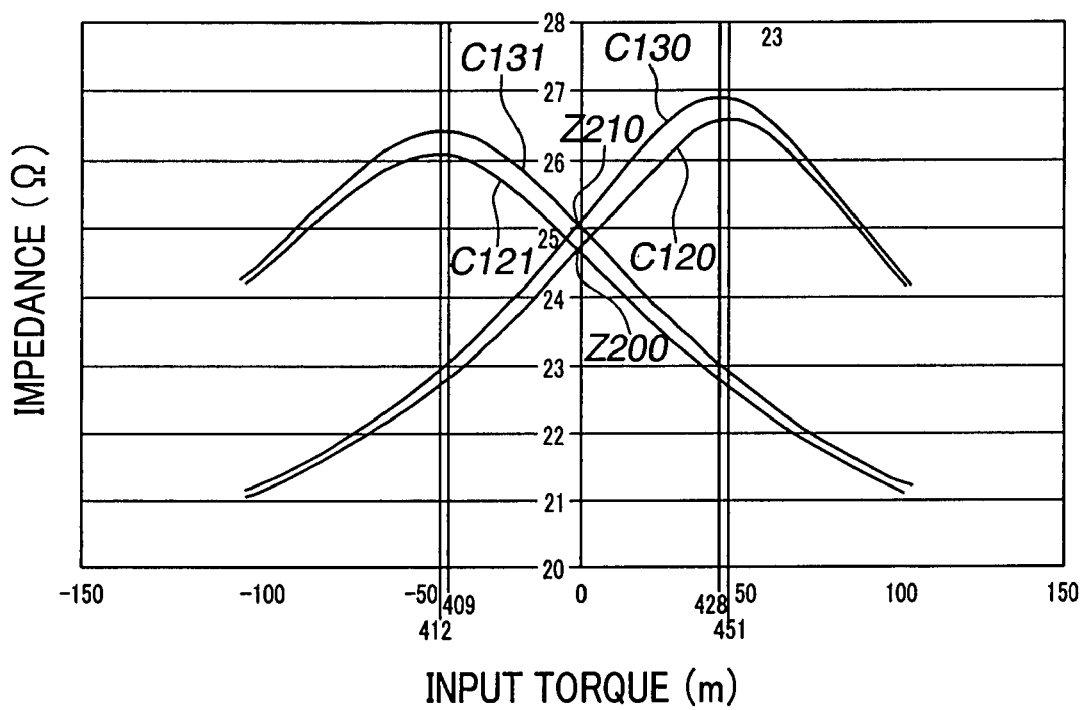
FIG. 46 is a diagram showing high-temperature durability characteristics of the magnetostrictive torque sensor made by the conventional manufacturing method.

In FIGS. 32A-32F, each circle or oval D11 depicted alongside a drawing of the steering shaft 109b represents an enlarged drawing of a minute portion of the magnetostrictive coat 42, and arrows F1 and F2 represent a tension load and compressing load, respectively. Note that the "minute portion" D11 is a model portion of the magnetostrictive coat assumptively extracted for the purpose of showing typical physical changes occurring in the magnetostrictive coat. In the step of FIG. 32B, the minute portion D11 of the magnetostrictive coat 42 is simultaneously subjected to the tension load F1 and compressing load F2 due to application of the twisting torque Tq, so that it is deformed into an oval shape with its longitudinal axis extending upward and rightward (i.e., in the lower-left-to-upper-right direction). In the step of FIG. 32C, undesired creep is produced due to the heating, and the minute portion D11 assumes a near-circular oval shape. FIG. 43D shows the minute portion D11 having shrunk after cooling-down but still keeping the near-circular oval shape of FIG. 32C. Further, FIG. 32E shows a state where torsional torque acting in an opposite direction to the twisting torque Tq has been applied to the magnetostrictive coat 42 due to removal of the twisting torque Tq, and where the minute portion D11 has assumed an oval shape with its longitudinal axis extending upward and leftward, i.e. in the lower-right-to-upper-left direction, due to the tension load F1 and compressing load F2. FIG. 32F shows a state where creep has been caused in the magnetostrictive coat 42 and the minute portion D11 has assumed a shape as illustrated. Whereas the magnetostrictive coat 42 has been described above as heated by passing a high-frequency electric current through the coil, it may be heated in a thermostatic tank as in the conventional method. Note that the other magnetostrictive coat 43 is processed in a manner similar to the magnetostrictive coat 42, except that the twisting torque is applied to the shaft 109b in an opposite direction to the one applied to the magnetostrictive coat 42.

Figure 33:
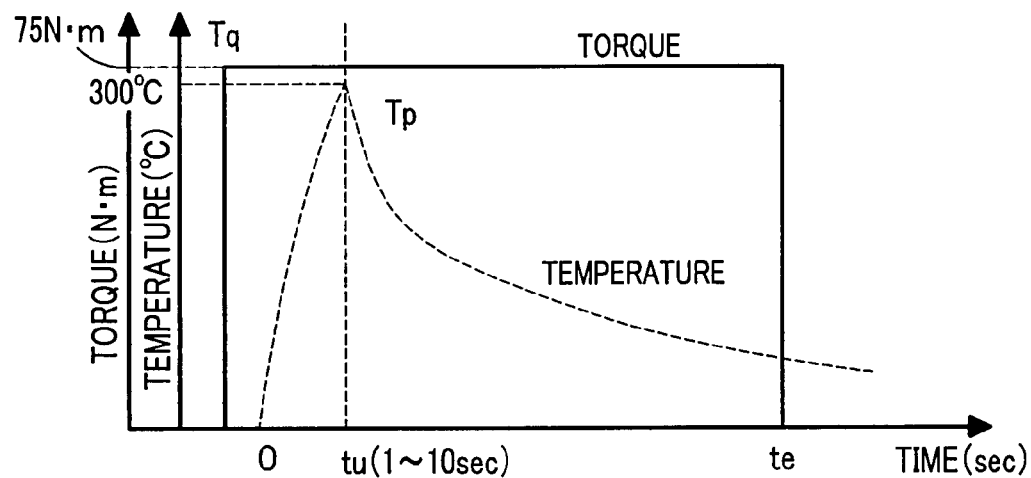
FIG. 33 is a graph showing variation in twisting torque to be applied to the rotational shaft during a time period from a twisting torque impartment step to a twisting torque removal step, and variation in temperature.
Figure 34:
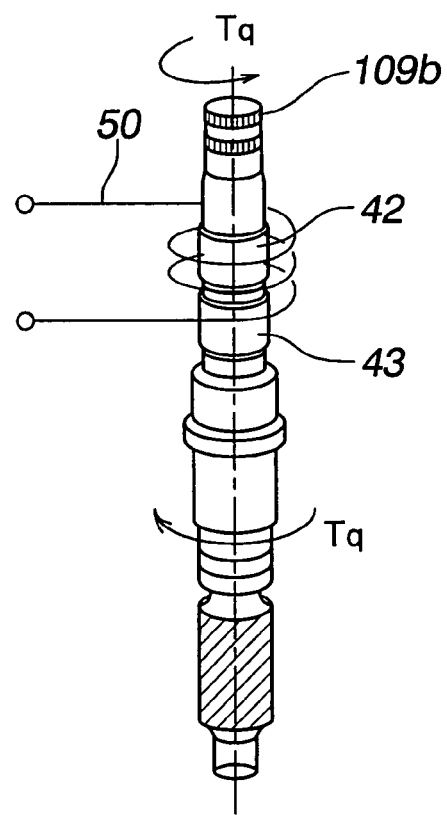
FIG. 34 is a view explanatory of a heating process performed in accordance with the method of the present invention.

FIG. 33 is a graph showing variation in the twisting torque Tq to be applied during a time period from the twisting torque impartment step (S102) to the twisting torque removal step (S105) and variation in temperature; namely, in the graph, the twisting torque variation is indicated by a solid line, while the temperature variation is indicated by a broken line. FIG. 34 is a view showing the steering shaft 109b in the heating step S103. In the heating step or process, the magnetostrictive coat 42 is heated by passing a high-frequency electric current through the coil with the twisting torque Tq of 75 Nm kept applied to the steering shaft 109b. Specifically, in the heating step or process, the coil 50 is positioned around the magnetostrictive coat 42 to be heated, and a high-frequency electric current, in a frequency range of 500 kHz-2 MHz, is passed through the coil 500 for a predetermined time tu ranging from 1 to 10 sec, so that the magnetostrictive coat 42 is heated up to 300° C. upon lapse of the predetermined time tu. Upon lapse of the predetermined time tu, the heating is terminated, i.e. the supply of the high-frequency electric current is discontinued, to cool down the magnetostrictive coat 42. Once the magnetostrictive coat 42 has cooled down to a predetermined temperature (e.g., in given seconds te), the twisting torque Tq is removed from the steering shaft 109b.

Figure 35:
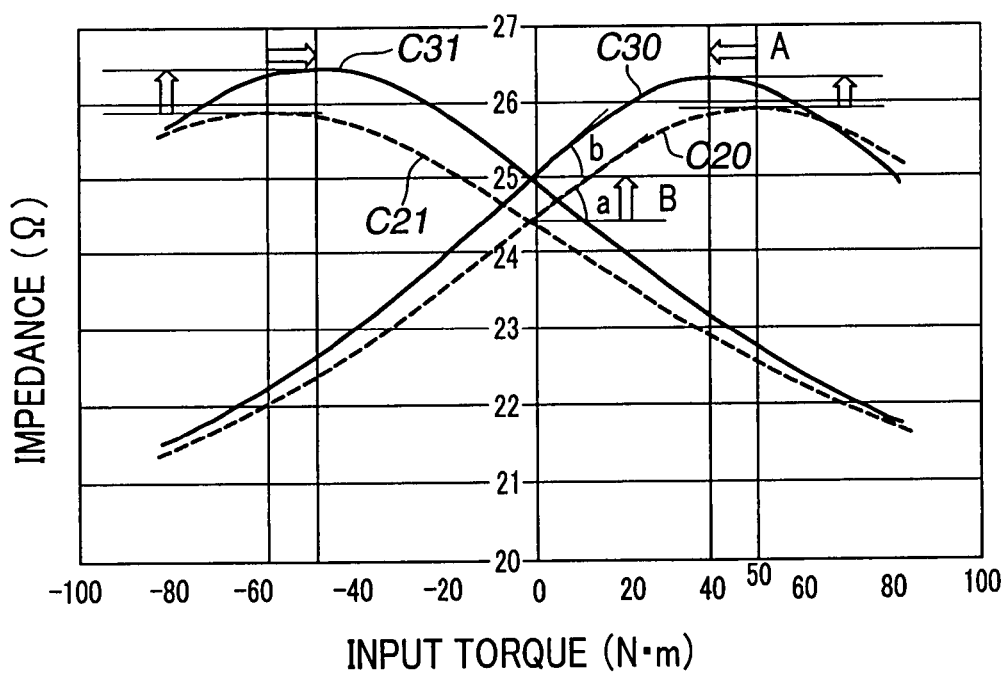
FIG. 35 is a graph showing impedance characteristics of the magnetostrictive torque sensor made by the manufacturing method of the present invention and impedance characteristics of the magnetostrictive torque sensor at a stage preceding a reheating step.

FIG. 35 is a graph showing impedance characteristics C30 and C31 (solid-line curves C30 and C31) of the magnetostrictive torque sensor made by the manufacturing method of the present invention and impedance characteristics C20 and C21 (broken-line curves C20 and C21) of the magnetostrictive torque sensor at a stage preceding the reheating step S106. The curves C20 and C30 correspond to the magnetostrictive coat 42, while the curves C21 and C31 correspond to the other magnetostrictive coat 43. Let it be assumed here that the magnetostrictive torque sensor made by the manufacturing method of the present invention was heated in the reheating process at 180° C. for three hours.

Namely, the reheating temperature in the heating process is higher than the environmental temperature of the engine room which is normally in the range of 80-100° C. The reheating process causes the magnetostrictive coats to creep previously, so that the impedance characteristics of the magnetostrictive coat 42, for example, present reduction in the preload torque from 50 Nm to 40 Nm as indicated by arrow A in FIG. 35. Further, by the reheating process, the zero torque point is raised as indicated by arrow B of FIG. 35 so that a gradient around the zero torque point changes from "a" to "b" (a<b), which will lead to an enhanced sensitivity. Namely, the reheating process causes the magnetostrictive coats to creep previously, so as to permit necessary setting of the magnetostrictive coats, as components of the torque sensor, under reduced preload torque condition.

Figure 36:
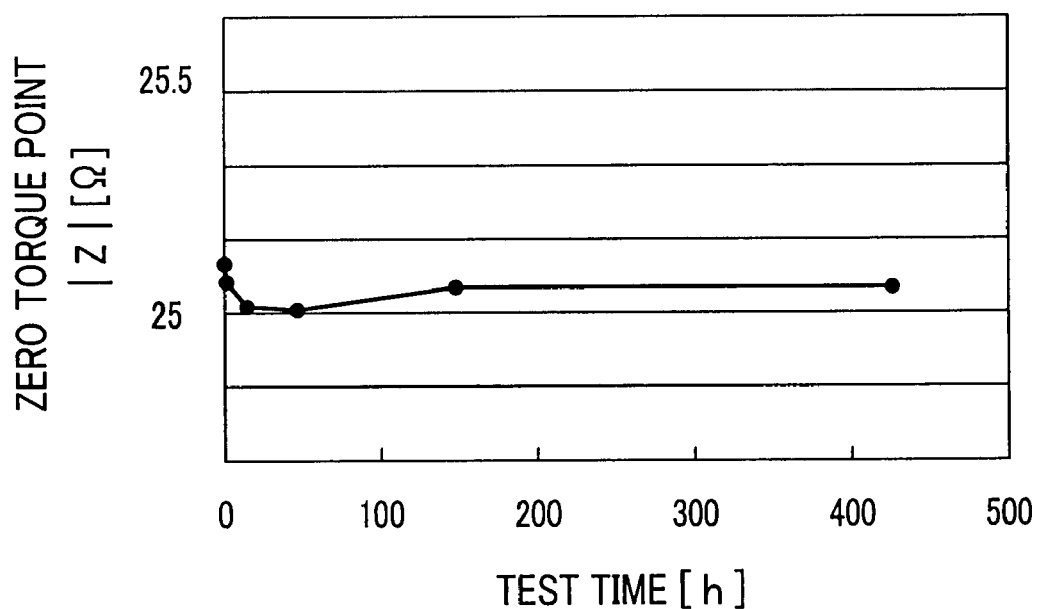
FIG. 36 is a graph showing test results pertaining to a zero torque point.
Figure 37:
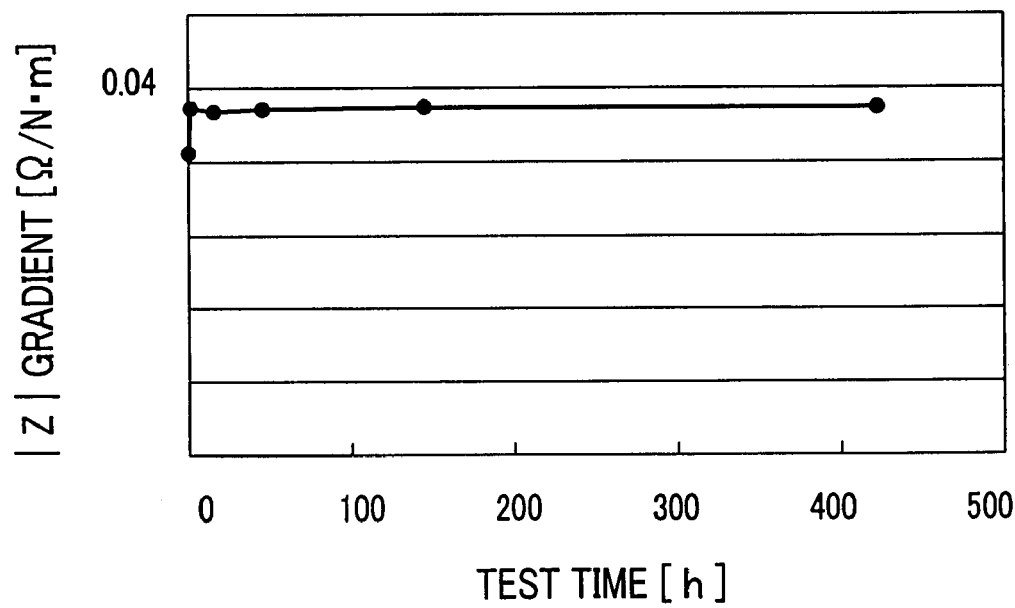
FIG. 37 is a graph showing test results pertaining to a gradient of sensitivity around a neutral torque point.
Figure 38:
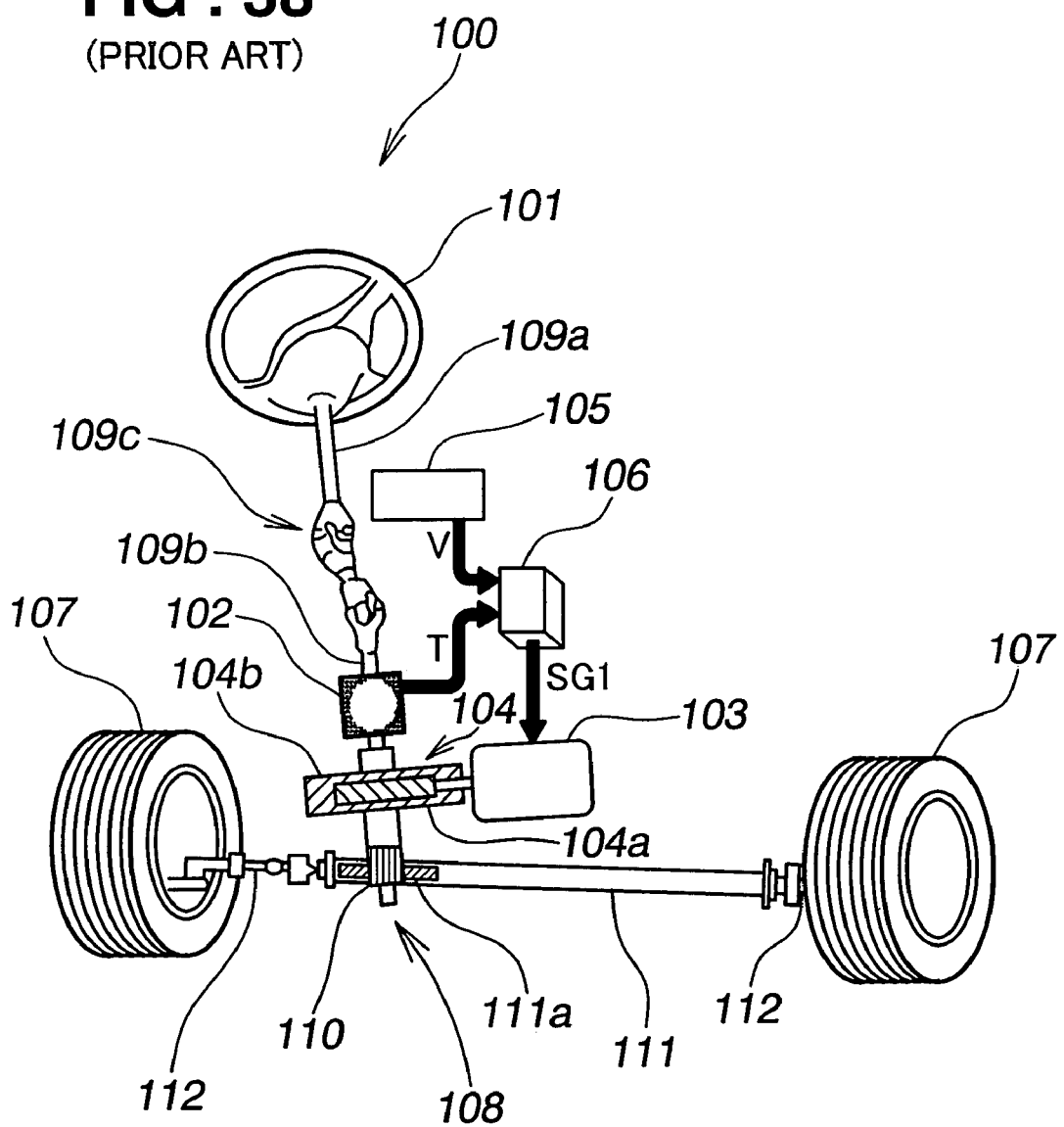
FIG. 38 is a view showing an overall setup of a conventional electric power steering apparatus.
Figure 39:
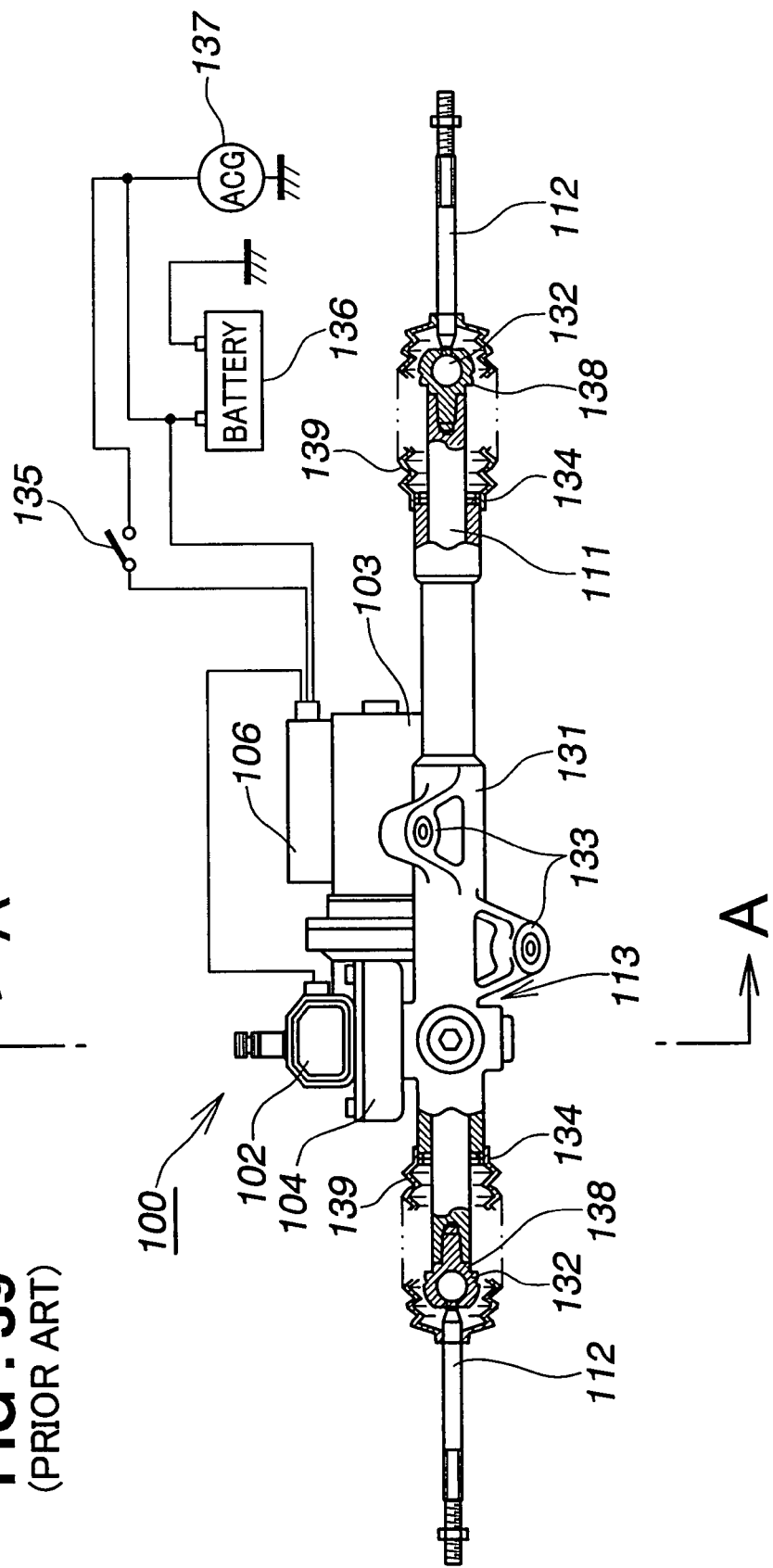
FIG. 39 is a view showing detailed organization of mechanical and electric components in the conventional electric power steering apparatus of FIG. 38.

FIGS. 36 and 37 are graphs showing results of a test that was conducted to ascertain the zero torque point of the magnetostrictive torque sensor made by the manufacturing method of the present invention and the gradient around the neutral torque point of the magnetostrictive torque sensor; in the test, the reheating was performed at 180° C. for one hour. Specifically, FIG. 36 shows the test results pertaining to the zero torque point, while FIG. 37 shows the test results pertaining to the gradient around the neutral torque point.

The magnetostrictive torque sensor made by the manufacturing method of the present invention, on which the reheating (annealing) process had been performed at 180° C. for one hour, was checked for the impedance at the zero torque point and gradient around the neutral torque point. Because the reheating (annealing) process had been performed previously at more than the normal use temperature, no creep occurs in the magnetostrictive torque sensor while the sensor is actually in operation at or around the normal use temperature. Thus, the magnetostrictive torque sensor made by the inventive manufacturing method presents good characteristics of little fluctuation in terms of both the zero torque point and the gradient of sensitivity. The electric power steering apparatus 40, employing such a magnetostrictive torque sensor as its steering torque sensor, can provide an improved steering feel without causing fluctuation in detected steering torque outputs. In addition, because undesired fluctuation in detected steering torque outputs can be avoided, presence/absence of a failure in the steering torque sensor can be determined reliably by ascertaining whether or not a sum of the detected values falls within a predetermined range.

With the aforementioned arrangement that the magnetostrictive coats 42 and 43 are previously caused to creep at a temperature (e.g., in the range of 180-200° C.) higher than the normal use temperature (in the range of 80-100° C.), the magnetostrictive coats 42 and 43 in the magnetostrictive torque sensor made by the manufacturing method can be prevented from creeping during the normal use or operation, so that the torque detecting performance of the sensor can remain stable without causing fluctuation even during use at high temperatures. Further, with the arrangement that the steering shaft 109b is heated at a temperature (e.g., in the range of 150-200° C.) higher than the normal use temperature (in the range of 80-100° C.), the present invention can previously cause the magnetostrictive coats 42 and 43 to creep. Thus, the steering shaft 109b may be subjected to the heating process after completion of assembly of the steering torque detector section 41, so that optimal sensor setting can be performed on the basis of visual examination of actual detection outputs from the steering torque detector section 41. Furthermore, with the arrangement of previously causing the magnetostrictive coats 42 and 43 to creep by heating the steering shaft 109b and magnetostrictive coats 42 and 43 at the temperature (e.g., in the range of 180-200° C.) higher than the normal use temperature (in the range of 80-100° C.), the entire steering shaft 109b may be subjected to the heating process after completion of the assembly of the steering torque detector section 41, so that enhanced productivity can be achieved. Also, optimal output setting can be performed on the basis of visual examination of actual detection outputs from the steering torque detector section 41. The electric power steering apparatus 40, employing such a steering torque detector section 41, can provide an improved steering feel without causing a significant difference in steering torque between clockwise turning and counterclockwise turning of the steering wheel.

As may be clear from the foregoing description, the second embodiment of the invention can afford the following benefits.

Namely, the third embodiment of the present invention is arranged to make the magnetostrictive torque sensor through the steps of forming magnetostrictive coats 42 and 43 on the rotational shaft 109b; heating the magnetostrictive coats 42 and 43 with predetermined twisting torque applied to the shaft 109b; removing the twisting torque from the rotational shaft 109b to thereby impart magnetic anisotropies to the coats 42 and 43; reheating the rotational shaft 109b; and positioning a coiled coil around each of the magnetostrictive coats 42 and 43 for detecting variation in magnetostrictive characteristics of the magnetostrictive coat. With such arrangements, the magnetostrictive torque sensor manufactured by the inventive method can prevent the magnetostrictive coats 42 and 43 from creeping by exposure to a high-temperature atmosphere during actual use or operation of the sensor, thereby avoiding undesired fluctuation in detected steering torque outputs. Therefore, the magnetostrictive torque sensor manufactured by the inventive method is capable of constantly detecting torque in a stable manner. Because undesired fluctuation in detected steering torque outputs can be avoided, a reliable failure check can be performed on the magnetostrictive torque sensor by ascertaining whether or not a sum of the detected values falls within a predetermined range. Furthermore, with the arrangement that the sensor output setting is performed after previously causing the magnetostrictive coats 42 and 43 to creep by performing the reheating process at a temperature higher than the normal use temperature (environmental temperature) within the engine room, the inventive method can manufacture a magnetostrictive torque sensor that will not vary in its detected torque output characteristics. Moreover, by providing the electric power steering apparatus with such a magnetostrictive torque sensor, the steering apparatus can constantly provide a good steering feel.

Obviously, various minor changes and modifications of the present invention are possible in the light of the above teaching. It is therefore to be understood that within the scope of the appended claims the invention may be practices otherwise than as specifically described.

What is claimed is:

1. A method for manufacturing a magnetostrictive torque sensor, said method comprising:
    a magnetostrictive coat formation step of forming a magnetostrictive coat on a rotational shaft;
    a heating step of subjecting said magnetostrictive coat to a high-frequency heating process for a predetermined time with predetermined twisting torque kept applied to said rotational shaft;
    a torque removal step of removing the twisting torque from said rotational shaft to thereby impart a magnetic anisotropy to said magnetostrictive coat; and
    a coil positioning step of positioning a coiled coil around said magnetostrictive coat for detecting variation in magnetostrictive characteristic of said magnetostrictive coat.

2. The method as claimed in claim 1 wherein said magnetostrictive coat contains an iron-nickel alloy material as a main component thereof, and the predetermined twisting torque is in a range not smaller than 50 Nm but not greater than 100 Nm.

3. A method for manufacturing a magnetostrictive torque sensor, said method comprising:
    a step of providing a magnetostrictive coat on a rotational shaft;
    a step of subjecting said magnetostrictive coat to a heating process with predetermined twisting torque kept applied to said rotational shaft;
    a step of removing the twisting torque from said rotational shaft to thereby impart a magnetic anisotropy to said magnetostrictive coat;
    a reheating step of subjecting said rotational shaft to a reheating process; and
    a step of positioning a coiled coil around said magnetostrictive coat for detecting variation in magnetostrictive characteristic of said magnetostrictive coat.

4. The method as claimed in claim 3 wherein a temperature at which said reheating step reheats said rotational shaft is greater than a normal use temperature at which said magnetostrictive torque sensor is actually used for torque detection.

* * * * *